US012768018B2

(12) United States Patent
Suetsuna et al.

(10) Patent No.: US 12,768,018 B2
(45) Date of Patent: Oct. 20, 2026

(54) PLURALITY OF FLAKY MAGNETIC METAL PARTICLES, PRESSED POWDER MATERIAL, AND ROTATING ELECTRIC MACHINE

(71) Applicant: Kabushiki Kaisha Toshiba, Tokyo (JP)

(72) Inventors: Tomohiro Suetsuna, Kawasaki (JP); Hiroaki Kinouchi, Shinagawa (JP); Takahiro Kawamoto, Kawasaki (JP); Naoyuki Sanada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 18/743,247

(22) Filed: Jun. 14, 2024

(65) Prior Publication Data

US 2024/0425955 A1 Dec. 26, 2024

Related U.S. Application Data

(62) Division of application No. 18/195,474, filed on May 10, 2023, now Pat. No. 12,049,686, which is a (Continued)

(30) Foreign Application Priority Data

Aug. 2, 2018 (JP) ................................ 2018-145893
May 14, 2019 (JP) ................................ 2019-091369

(51) Int. Cl.
*C22C 38/02* (2006.01)
*B22F 1/068* (2022.01)
(Continued)

(52) U.S. Cl.
CPC .............. *C22C 38/02* (2013.01); *B22F 1/068* (2022.01); *B22F 3/02* (2013.01); *C22C 38/10* (2013.01);
(Continued)

(58) Field of Classification Search
None
See application file for complete search history.

(56) References Cited

U.S. PATENT DOCUMENTS 8,840,800 B2 9/2014 Suetsuna et al.
9,362,033 B2 6/2016 Suetsuna et al.
(Continued)

FOREIGN PATENT DOCUMENTS

JP 4-78111 A 3/1992
JP 2000-144347 A 5/2000
(Continued)

OTHER PUBLICATIONS

N.C. Halder, et al., "Separation of particle size and lattice strain in integral breadth measurements", Acta. Cryst. (1966) 20, pp. 312-313.

*Primary Examiner* — Anthony M Liang
(74) *Attorney, Agent, or Firm* — Oblon, McClelland, Maier & Neustadt, L.L.P.

(57) ABSTRACT

Flaky magnetic metal particles of embodiments each have a flat surface and a magnetic metal phase containing iron (Fe), cobalt (Co), and silicon (Si). An amount of Co is from 0.001 at % to 80 at % with respect to the total amount of Fe and Co. An amount of Si is from 0.001 at % to 30 at % with respect to the total amount of the magnetic metal phase. The flaky magnetic metal particles have an average thickness of from 10 nm to 100 μm. An average value of the ratio of the average length in the flat surface with respect to a thickness in each of the flaky magnetic metal particles is from 5 to 10,000. The flaky magnetic metal particles have the difference in coercivity on the basis of direction within the flat surface.

7 Claims, 19 Drawing Sheets

Related U.S. Application Data division of application No. 16/526,637, filed on Jul. 30, 2019, now Pat. No. 11,692,250.

(51) Int. Cl.

| | |
|---|---|
| ***B22F 1/08*** | (2022.01) |
| ***B22F 3/02*** | (2006.01) |
| ***C22C 38/10*** | (2006.01) |
| ***H01F 1/147*** | (2006.01) |
| ***H01F 1/24*** | (2006.01) |

(52) U.S. Cl.

CPC ........... *H01F 1/14741* (2013.01); *H01F 1/24* (2013.01); *B22F 1/08* (2022.01); *B22F 2207/11* (2013.01); *B22F 2207/20* (2013.01); *B22F 2304/00* (2013.01); *B22F 2304/05* (2013.01)

(56) References Cited

U.S. PATENT DOCUMENTS

| | | | | |
|---|---|---|---|---|
| 10,090,088 | B2 | 10/2018 | Suetsuna et al. | |
| 12,015,306 | B2 * | 6/2024 | Suetsuna | B22F 1/068 |
| 2013/0228716 | A1 | 9/2013 | Suetsuna et al. | |
| 2014/0319406 | A1 | 10/2014 | Suetsuna et al. | |
| 2017/0076845 | A1 | 3/2017 | Suetsuna et al. | |
| 2017/0209924 | A1 * | 7/2017 | Suetsuna | B22F 1/0551 |
| 2018/0258513 | A1 | 9/2018 | Suetsuna et al. | |
| 2023/0290548 | A1 | 9/2023 | Suetsuna et al. | |

FOREIGN PATENT DOCUMENTS

| | | | | | |
|---|---|---|---|---|---|
| JP | 2009-059752 | A | | 3/2009 | |
| JP | 2013-65844 | A | | 4/2013 | |
| JP | 2014-103267 | A | | 6/2014 | |
| JP | 2014-131054 | A | | 7/2014 | |
| JP | 5710562 | B2 | | 4/2015 | |
| JP | 2017-28087 | A | | 2/2017 | |
| JP | 2017-59816 | A | | 3/2017 | |
| JP | 2017059816 | A | * | 3/2017 | H01F 1/14741 |
| JP | 6143683 | B2 | | 6/2017 | |
| JP | 2017-120924 | A | | 7/2017 | |
| JP | 2017-135358 | | | 8/2017 | |
| JP | 2018-152449 | | | 9/2018 | |
| JP | 2018-152449 | A | | 9/2018 | |
| JP | 6430556 | B2 | | 11/2018 | |
| JP | 2019-58014 | | | 4/2019 | |
| JP | 2019-161183 | | | 9/2019 | |
| JP | 2020-43268 | | | 3/2020 | |
| JP | 2020-155525 | | | 9/2020 | |
| JP | 2021-48238 | | | 3/2021 | |
| JP | 2021-147651 | | | 9/2021 | |
| JP | 2022-43455 | | | 3/2022 | |
| JP | 2022-49889 | | | 3/2022 | |
| JP | 2022-146029 | | | 10/2022 | |
| JP | 2023-134350 | A | | 9/2023 | |
| WO | WO 2008/018179 | A1 | | 2/2008 | |
| WO | WO 2017/171013 | A1 | | 10/2017 | |
| WO | WO 2018/052108 | | | 3/2018 | |

* cited by examiner

DIAGRAM AS VIEWED FROM SIDEWAYS
(CROSS-SECTION OF FLAKY MAGNETIC METAL PARTICLE)

IN CASE IN WHICH TEN SITES ARE SELECTED (EXCLUDING ENDS) AT EQUAL INTERVAL FROM END TOWARD ANOTHER END IN DIRECTION WITHIN FLAT SURFACE, AND THICKNESS AT EACH SITE IS DESIGNATED AS $t_1, t_2, \cdots,$ or $t_{10}$, THICKNESS OF FLAKY MAGNETIC METAL PARTICLE = $(t_1 + t_2 + \cdots + t_{10})/10$

DIAGRAM AS VIEWED FROM TOP (FLAT SURFACE OF FLAKY MAGNETIC METAL PARTICLES)

DIAGRAM AS VIEWED FROM TOP (FLAT SURFACES OF FLAKY MAGNETIC METAL PARTICLES)

DIAGRAM AS VIEWED FROM TOP (FLAT SURFACES OF FLAKY MAGNETIC METAL PARTICLES)

EXEMPLARY CONCEPTUAL CROSS-SECTIONAL VIEW OF STATOR

EXEMPLARY CONCEPTUAL
CROSS-SECTIONAL VIEW DIAGRAM OF ROTOR

PLURALITY OF FLAKY MAGNETIC METAL PARTICLES, PRESSED POWDER MATERIAL, AND ROTATING ELECTRIC MACHINE

CROSS-REFERENCE TO RELATED APPLICATION

This application is a division of and claims the benefit of priority under 35 U.S.C. § 120 from U.S. application Ser. No. 18/195,474 filed May 10, 2023, which is a divisional of U.S. application Ser. No. 16/526,637 filed Jul. 30, 2019 (now U.S. Pat. No. 11,692,250 issued Jul. 4, 2023), and claims the benefit of priority under 35 U.S.C. § 119 from Japanese Patent Application No. 2018-145893 filed Aug. 2, 2018 and Japanese Patent Application No. 2019-091369 filed May 14, 2019, the entire contents of each of which are incorporated herein by reference.

FIELD

Embodiments described herein relate generally to a plurality of flaky magnetic metal particles, a pressed powder material, and a rotating electric machine.

BACKGROUND

Currently, soft magnetic materials are applied to the component parts of various systems and devices, such as rotating electric machines (for example, motors and generators), potential transformers, inductors, transformers, magnetic inks, and antenna devices. Thus, soft magnetic materials are regarded as very important materials. In these component parts, the real part of the magnetic permeability (real part of the relative magnetic permeability), μ', of a soft magnetic material is utilized, and therefore, in the case of actual use, it is preferable to control μ' in accordance with the working frequency band. Furthermore, in order to realize a highly efficient system, it is preferable to use a material having a loss that is as low as possible. That is, it is preferable to make the imaginary part of the magnetic permeability (imaginary part of the relative magnetic permeability), μ" (corresponding to a loss) as low as possible. In regard to the loss, the loss factor, tan δ ($=\mu''/\mu'\times100(\%)$) serves as a criterion, and as μ" becomes smaller relative to μ', the loss factor tan δ becomes smaller, which is preferable. In order to attain such conditions, it is preferable to make the core loss for the conditions of actual operation small, that is, it is preferable to make the eddy current loss, hysteresis loss, ferromagnetic resonance loss, and residual loss (other losses) as small as possible. In order to make the eddy current loss small, it is effective to increase the electrical resistance, or decrease the sizes of metal parts, or finely divide the magnetic domain structure. In order to make the hysteresis loss small, it is effective to reduce coercivity or increase the saturation magnetization. In order to make the ferromagnetic resonance loss small, it is effective to make the ferromagnetic resonance frequency higher by increasing the anisotropic magnetic field of the material. Furthermore, in recent years, since there is an increasing demand for handling of high electric power, it is required that losses are small, particularly under the operation conditions in which the effective magnetic field applied to the material is large, such as high current and high voltage. To attain this end, it is preferable that the saturation magnetization of a soft magnetic material is as large as possible so as not to bring about magnetic saturation. Furthermore, in recent years, since size reduction of equipment is enabled by utilization of high frequency, increase of the working frequency bands in systems and device equipment is underway, and there is an urgent need for the development of a magnetic material having high magnetic permeability and low losses at high frequency and having excellent characteristics.

Furthermore, in recent years, due to the heightened awareness of the issues on energy saving and environmental issues, there is a demand to increase the efficiency of systems as high as possible. Particularly, since motor systems are responsible for a major portion of electric power consumption in the world, efficiency enhancement of motors is very important. Above all, a core and the like that constitute a motor are formed from soft magnetic materials, and it is requested to increase the magnetic permeability or saturation magnetization of soft magnetic materials as high as possible, or to make the losses as low as possible. Furthermore, in regard to magnetic wedges that are used in some motors, there is a demand for minimizing losses as far as possible. There is the same demand also for systems that use transformers. In motors, transformers and the like, the demand for size reduction is also high, along with efficiency enhancement. In order to realize size reduction, it is essential to maximize the magnetic permeability and saturation magnetization of the soft magnetic materials as far as possible. Furthermore, in order to also prevent magnetic saturation, it is important to make saturation magnetization as high as possible. Moreover, the need for increasing the operation frequency of systems is also high, and thus, there is a demand to develop a material having low losses in high frequency bands.

Soft magnetic materials having high magnetic permeability and low losses are also used in inductance elements, antenna devices and the like, and particularly above all, in recent years, attention has been paid to the application of soft magnetic materials in power inductance elements that are used in power semiconductor devices. In recent years, the importance of energy saving and environmental protection has been actively advocated, and reduction of the amount of $CO_2$ emission and reduction of the dependency on fossil fuels have been required. As the result, development of electric cars or hybrid cars that substitute gasoline cars is in active progress. Furthermore, technologies for utilizing natural energy such as solar power generation and wind power generation are regarded as key technologies for an energy saving society, and many developed countries are actively pushing ahead with the development of technologies for utilizing natural energy. Furthermore, the importance of establishment of home energy management systems (HEMS) and building and energy management systems (BEMS), which control the electric power generated by solar power generation, wind power generation or the like by a smart grid and supply the electric power to homes, offices and plants with high efficiency, as environment-friendly power saving systems, has been actively advocated. In such a movement of energy saving, power semiconductor devices play a key role. Power semiconductor devices are semiconductor devices that control high electric power or energy with high efficiency, and examples thereof include individual power semiconductor devices such as an insulated gate bipolar transistor (IGBT), a metal oxide semiconductor field effect transistor (MOSFET), a power bipolar transistor, and a power diode; power supply circuits such as a linear regulator and a switching regulator; and a large-scale integration (LSI) logic circuit for power management to control the above-mentioned devices. Power semiconductor devices are widely used in all sorts of equipment including home electrical appliances, computers, automobiles and railways, and since expansion of the supply of these applied apparatuses, and an increase in the mounting ratio of power semiconductor devices in these apparatuses can be expected, a rapid growth in the market for power semiconductor devices in the future is anticipated. For example, inverters that are installed in many home electrical appliances use power semiconductor devices nearly in all parts, and thereby extensive energy saving is made possible. Currently, silicon (Si) occupies a major part in power semiconductor devices; however, for a further increase in efficiency or further size reduction of equipment, utilizing silicon carbide (SiC) and gallium nitride (GaN) is considered effective. Since SiC and GaN have larger band gaps and larger breakdown fields than Si, and the breakdown voltage can be made higher, elements can be made thinner. Therefore, the on-resistance of semiconductor devices can be lowered, and it is effective for loss reduction and efficiency enhancement. Furthermore, since SiC or GaN has high carrier mobility, the switching frequency can be made higher, and this is effective for size reduction of elements. Furthermore, since SiC in particular has higher thermal conductivity than Si, the heat dissipation ability is higher, and operation at high temperature is enabled. Thus, cooling mechanisms can be simplified, and this is effective for size reduction. From the viewpoints described above, development of SiC and GaN power semiconductor devices is actively in progress. However, in order to realize the development, development of power inductor elements that are used together with power semiconductor devices, that is, development of soft magnetic materials having high magnetic permeability (high magnetic permeability and low losses), is indispensable. Regarding the characteristics required for magnetic materials in this case, high magnetic permeability and low magnetic loss in the driving frequency bands, as well as high saturation magnetization that can cope with a large electric current are preferable. In a case in which saturation magnetization is high, it is difficult to induce magnetic saturation even if a high magnetic field is applied, and a decrease in the effective inductance value can be suppressed. As a result, the direct current superimposition characteristics of the device are enhanced, and the efficiency of the system is increased.

Furthermore, a magnetic material having high magnetic permeability and low losses at high frequency is expected to be applied to high frequency communication equipment devices such as antenna devices. As a method for achieving size reduction and power saving of antennas, there is a method of using an insulated substrate having high magnetic permeability (high magnetic permeability and low losses) as an antenna substrate, and performing transmission and reception of electric waves by dragging the electric waves that should reach an electronic component or a substrate inside a communication apparatus from antennas into the antenna substrate, without allowing the electric waves to reach the electronic component or substrate. As a result, size reduction of antennas and power saving are made possible, and at the same time, the resonance frequency band of the antennas can also be broadened, which is preferable.

Furthermore, examples of other characteristics that are required when magnetic materials are incorporated into the various systems and devices described above include high thermal stability, high strength, and high toughness. Also, in order for the magnetic materials to be applied to complex shapes, a pressed powder body is more preferable than materials having a sheet shape or a ribbon shape. However, generally, when a pressed powder body is used, it is known that characteristics such as saturation magnetization, magnetic permeability, losses, strength, toughness, and hardness are deteriorated. Thus, enhancement of characteristics is preferable.

Next, in regard to existing soft magnetic materials, the types of the soft magnetic materials and their problems will be described.

Examples of an existing soft magnetic material for systems of 10 kH or less include a silicon steel sheet (FeSi). A silicon steel sheet is a material that is employed in most of rotating electric machines that have been used for a long time and handle large power, and the core materials of transformers. Highly characterized materials ranging from non-directional silicon steel sheets to directional silicon steel sheets can be obtained, and compared to the early stage of discovery, a progress has been made; however, in recent years, it is considered that characteristics improvement has reached an endpoint. Regarding the characteristics, it is particularly critical to simultaneously satisfy high saturation magnetization, high magnetic permeability, and low losses. Studies on materials that surpass silicon steel sheets are actively conducted globally, mainly based on the compositions of amorphous materials and nanocrystalline materials; however, a material composition that surpasses silicon steel sheets in all aspects has not yet been found. Furthermore, studies also have been conducted on pressed powder bodies that are applicable to complex shapes; however, pressed powder bodies have a defect that they have poor characteristics compared to sheets or ribbons.

Examples of existing soft magnetic materials for systems of 10 kHz to 100 kHz include Sendust (Fe—Si—Al), nanocrystalline FINEMET (Fe—Si—B—Cu—Nb), ribbons or pressed powder bodies of Fe-based or Co-based amorphous glass, and MnZn-based ferrite materials. However, all of these materials do not completely satisfy characteristics such as high magnetic permeability, low losses, high saturation magnetization, high thermal stability, high strength, high toughness, and high hardness, and the materials are insufficient.

Examples of existing soft magnetic materials of 100 kHz or higher (MHz frequency band or higher) include NiZn-based ferrites and hexagonal ferrites; however, these materials have insufficient magnetic characteristics at high frequency.

From the circumstances described above, development of a magnetic material having high saturation magnetization, high magnetic permeability, low losses, high thermal stability, and excellent mechanical characteristics is preferable.

DETAILED DESCRIPTION

Figure 1:
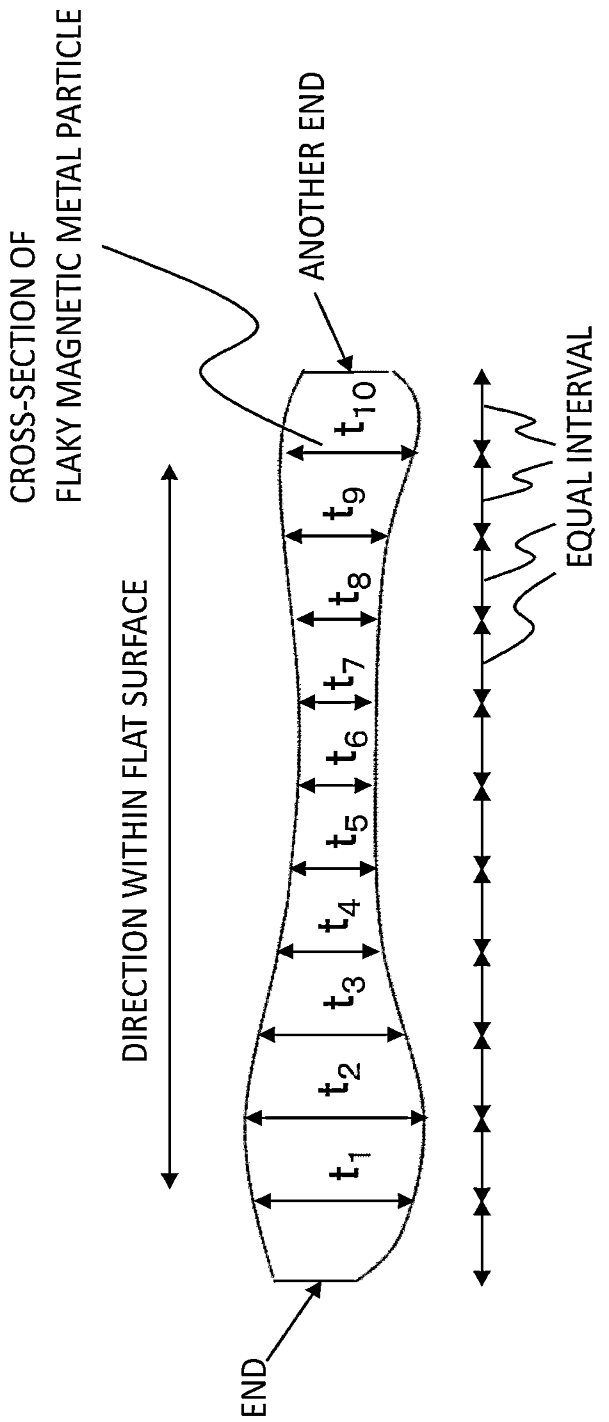
FIG. 1 is a conceptual diagram illustrating an example of a method for determining the thickness of a flaky magnetic metal particle according to a first embodiment.

In the following description, embodiments will be described using the attached drawings. In the diagrams, identical or similar reference numerals will be assigned to identical or similar sites.

First Embodiment

A plurality of flaky magnetic metal particles of the present embodiment is a plurality of flaky magnetic metal particles, each flaky magnetic metal particle comprising: a flat surface; and a magnetic metal phase containing iron (Fe), cobalt (Co), and silicon (Si), the magnetic metal phase containing Co in an amount of from 0.001 at % to 80 at % with respect to the total amount of Fe and Co and containing Si in an amount of from 0.001 at % to 30 at % with respect to the total amount of the magnetic metal phase, the flaky magnetic metal particles having an average thickness of from 10 nm to 100 μm, the average value of the ratio of the average length in the flat surface to a thickness in each of the flaky magnetic metal particles being from 5 to 10,000, and the flaky magnetic metal particles having the difference in coercivity on the basis of direction within the flat surface.

The plurality of flaky magnetic metal particles of the present embodiment is a plurality of flaky magnetic metal particles, each flaky magnetic metal particle comprising: a flat surface; and a magnetic metal phase including at least one first element selected from the group consisting of iron (Fe), cobalt (Co), and nickel (Ni), and additive elements, the additive elements including boron (B) and hafnium (Hf) and being incorporated in the magnetic metal phase in a total amount of from 0.002 at % to 80 at % with respect to the total amount of the magnetic metal phase, the flaky magnetic metal particles having an average thickness of from 10 nm to 100 μm, the average value of the ratio of the average length in the flat surface to a thickness in each of the flaky magnetic metal particles being from 5 to 10,000, and the flaky magnetic metal particles having the difference in coercivity on the basis of direction within the flat surface.

Flaky magnetic metal particles are flaky particles (or flattened particles) having a flaky shape (or a flattened shape).

A thickness means an average thickness of a single flaky magnetic metal particle. Regarding the method for determining the thickness, the method is not limited as long as it is a method capable of determining the average thickness of one flaky magnetic metal particle. For example, a method of observing a cross-section perpendicular to the flat surface of a flaky magnetic metal particle by transmission electron microscopy (TEM), scanning electron microscopy (SEM), or optical microscopy, selecting any arbitrary ten or more sites in the in-plane direction of the flat surface in a cross-section of the flaky magnetic metal particle thus observed, measuring the thicknesses at the various selected sites, and employing the average value of the thicknesses, may be used. Furthermore, a method of selecting ten or more sites in a cross-section of the observed flaky magnetic metal particle from an end toward the other end at an equal interval in a direction within the flat surface (at this time, since the end and the other end are special places, it is preferable not to select the end parts), measuring the thickness at each of the sites thus selected, and employing the average value of the thicknesses, may also be used. FIG. 1 is a conceptual diagram illustrating an example of a method for determining the thickness of a flaky magnetic metal particle according to the first embodiment. In FIG. 1, the method for determining the thickness in this case is specifically illustrated. All of the methods are preferable because when measurement is made at sites as many as possible, average information can be obtained. Meanwhile, in a case in which the contour lines of the cross-section has intense irregularities, or the surface has a rough contour line, and it is difficult to determine the average thickness in an intact state, it is preferable that the contour line is smoothened into an average straight line or curve appropriately according to the circumstance, and then the above-described method is carried out.

Furthermore, the average thickness refers to the average value of the thickness of a plurality of flaky magnetic metal particles, and the average thickness is distinguished from the simple "thickness" described above. When the average thickness is to be determined, it is preferable to employ an average value calculated for twenty or more flaky magnetic metal particles. Furthermore, it is preferable to determine the average thickness for as many flaky magnetic metal particles as possible as the objects of measurement, because average information can be obtained. Furthermore, in a case in which an observation of twenty or more flaky magnetic metal particles cannot be made, it is preferable that an observation of as many flaky magnetic metal particles as possible is made, and an average value calculated for those particles is employed. The average thickness of the flaky magnetic metal particles is preferably from 10 nm to 100 μm, more preferably from 10 nm to 1 μm, and even more preferably from 10 nm to 100 nm. Furthermore, it is preferable that the flaky magnetic metal particles include particles having a thickness of from 10 nm to 100 μm, more preferably from 10 nm to 1 μm, and even more preferably from 10 nm to 100 nm. As a result, when a magnetic field is applied in a direction parallel to the flat surface, the eddy current loss can be made sufficiently small, which is preferable. Furthermore, a smaller thickness is preferred because the magnetic moment is confined in a direction parallel to the flat surface, and magnetization is likely to proceed by rotation magnetization. In a case in which magnetization proceeds by rotation magnetization, since magnetization is likely to proceed reversibly, coercivity is decreased, and the hysteresis loss can be reduced thereby, which is preferable.

Figures 2A, 2B, 2C:
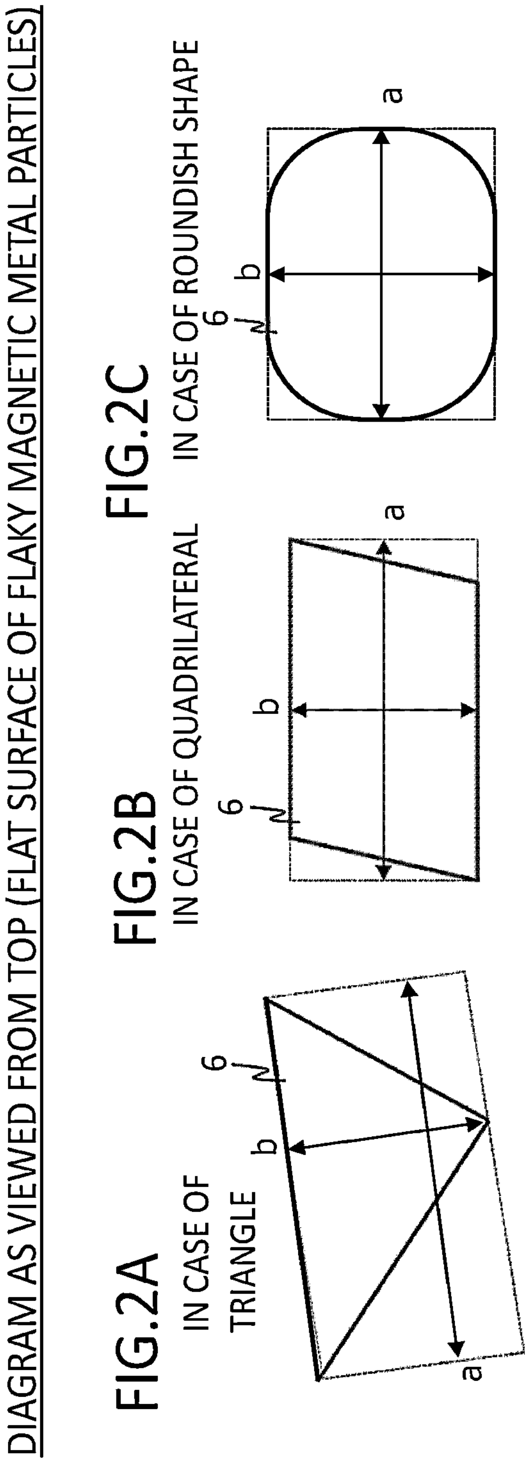
FIGS. 2A to 2C are conceptual diagrams for explaining a method for determining the maximum length and the minimum length in a flat surface of a flaky magnetic metal particle according to the first embodiment.

The average length of a flaky magnetic metal particle is defined by the formula: (a+b)/2, using the maximum length a and the minimum length b in the flat surface. The maximum length a and the minimum length b can be determined as follows. For example, among rectangles that circumscribe the flat surface, a rectangle having the smallest area is considered. Then, the length of the long side of the rectangle is designated as the maximum length a, and the length of the short side is designated as the minimum length b. FIGS. 2A to 2C are conceptual diagrams for explaining a method for determining the maximum length and the minimum length in the flat surface of a flaky magnetic metal particle according to the first embodiment. FIGS. 2A to 2C are schematic diagrams illustrating the maximum length a and the minimum length b determined by the above-described method by taking several flaky magnetic metal particles as examples. The maximum length a and the minimum length b can be determined, similarly to the case of the average thickness, by observing the flaky magnetic metal particles by TEM, SEM, or with an optical microscope or the like. Furthermore, it is also possible to determine the maximum length a and the minimum length b by performing an image analysis of microscopic photographs with a computer. For all of them, it is preferable to determine the maximum length and the minimum length for twenty or more flaky magnetic metal particles as the objects of measurement. Furthermore, it is preferable to determine the maximum length and the minimum length for as many flaky magnetic metal particles as possible as the objects of measurement, because average information can be obtained. Furthermore, in a case in which it is not possible to observe twenty or more flaky magnetic metal particles, it is preferable that an observation of as many flaky magnetic metal particles as possible is made, and average values obtained for those metal particles are employed. Furthermore, in this case, since it is preferable to determine the maximum length and the minimum length as average values as far as possible, it is preferable to perform an observation or an image analysis in a state in which the flaky magnetic metal particles are uniformly dispersed (in a state in which a plurality of flaky magnetic metal particles having different maximum lengths and minimum lengths is dispersed in a manner as random as possible). For example, it is preferable that an observation or an image analysis is carried out by sufficiently stirring a plurality of flaky magnetic metal particles and adhering the flaky magnetic metal particles onto a tape in that stirred state, or by dropping a plurality of flaky magnetic metal particles from above to fall down and adhering the particles onto a tape.

Figure 3:
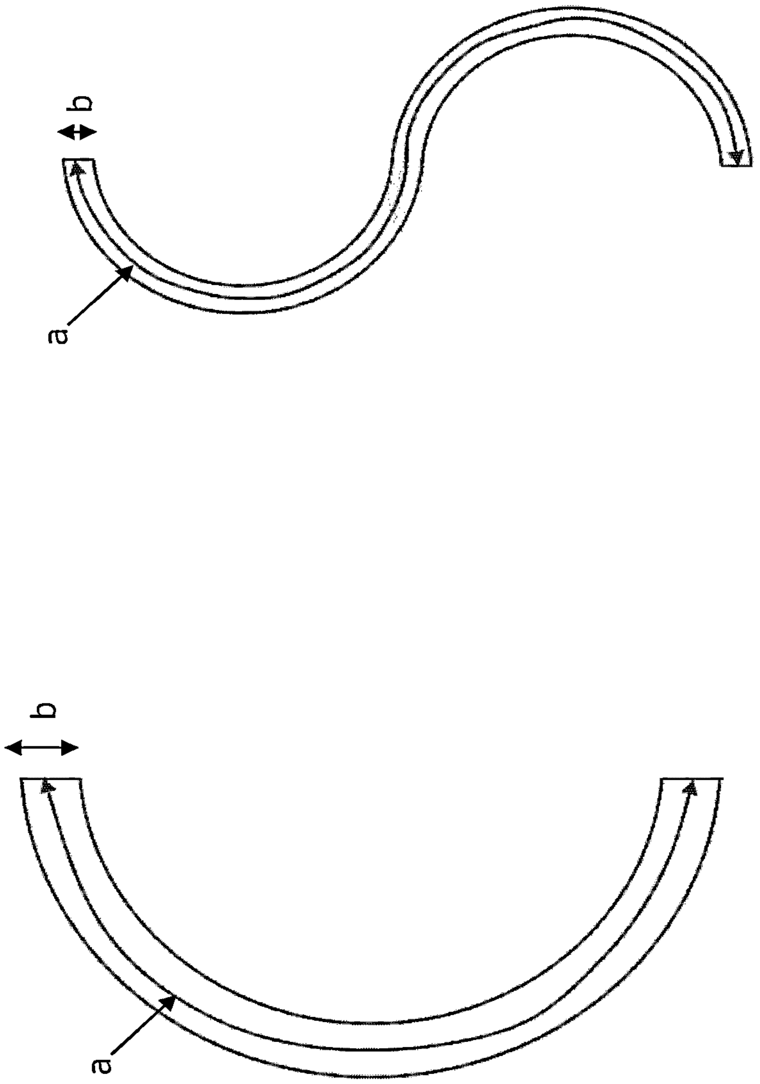
FIG. 3 is a conceptual diagram for explaining another example of the method for determining the maximum length and the minimum length in a flat surface of a flaky magnetic metal particle according to the first embodiment.

However, depending on the flaky magnetic metal particles, there are occasions in which when the maximum length a and the minimum length b are determined by the method described above, the method may become a method for determination without any regard to the essence. FIG. 3 is a conceptual diagram for explaining another example of the method for determining the maximum length and the minimum length in a flat surface of a flaky magnetic metal particle according to the first embodiment. For example, in a case similar to FIG. 3, the flaky magnetic metal particles are in a state of being elongatedly curved state; however, in this case, the maximum length and the minimum length of the flaky magnetic metal particles are essentially the lengths of a and b illustrated in FIGS. 2A to 2C. As such, the method for determining the maximum length a and the minimum length b cannot be decided completely uniformly, and basically, there is no problem with a method of "considering a rectangle having the smallest area among the rectangles circumscribing the flat surface, and designating the length of the long side of the rectangle as the maximum length a and the length of the short side as b". However, depending on the shape of the particles, in a case in which the essence is disregarded in this method, the maximum length a and the minimum length b are determined as the maximum length a and the minimum length b, for which the essence is considered, according to the circumstances. The thickness t is defined as the length in a direction perpendicular to the flat surface. The ratio A of the average length within the flat surface with respect to the thickness is defined by the formula: $A=((a+b)/2)/t$, using the maximum length a, minimum length b, and thickness t.

The average value of the ratio of the average length in the flat surface of the flaky magnetic metal particles with respect to a thickness in each of the flaky magnetic metal particles is preferably from 5 to 10,000. This is because the magnetic permeability increases according to the ratio. Furthermore, it is because since the ferromagnetic resonance frequency can be increased, the ferromagnetic resonance loss can be reduced.

Regarding the ratio of the average length in the flat surface with respect to the thickness, an average value is employed. Preferably, it is preferable to employ an average value calculated for twenty or more flaky magnetic metal particles. It is also preferable to determine the average value by taking as many flaky magnetic metal particles as possible as the objects of measurement, because average information can be obtained. In a case in which an observation of twenty or more flaky magnetic metal particles cannot be made, it is preferable that an observation is made for as many flaky magnetic metal particles as possible, and an average value calculated for those particles is employed. In addition, for example, in a case in which there are particle Pa, particle Pb, and particle Pc, and the thicknesses of the particles are referred to as Ta, Tb, and Tc, respectively, while the average lengths in the flat surface are referred to as La, Lb, and Lc, respectively, the average thickness is calculated by the formula: $(Ta+Tb+Tc)/3$, and the average value of the ratio of the average length in the flat surface with respect to the thickness is calculated by the formula: $(La/Ta+Lb/Tb+Lc/Tc)/3$.

It is preferable that the flaky magnetic metal particles have the difference in coercivity on the basis of direction within the flat surface. It is more preferable that the proportion of the difference in coercivity on the basis of direction within the flat surface is larger, and it is preferable that the proportion is 1% or more. More preferably, the proportion of the difference in coercivity is 10% or more; even more preferably, the proportion of the difference in coercivity is 50% or more; and still more preferably, the proportion of the difference in coercivity is 100% or more. The proportion of the difference in coercivity as used herein is defined by the formula: $(Hc(max)-Hc(min))/Hc(min)\times 100(\%)$, using the maximum coercivity Hc(max) and the minimum coercivity Hc(min) in the flat surface. Furthermore, the coercivity can be evaluated using a vibrating sample magnetometer (VSM) or the like. In the case of having low coercivity, even a coercivity of 0.1 Oe or less can be measured by using a low magnetic field unit. In regard to the direction of the magnetic field to be measured, measurement is made by varying the direction in the flat surface.

Figure 4:
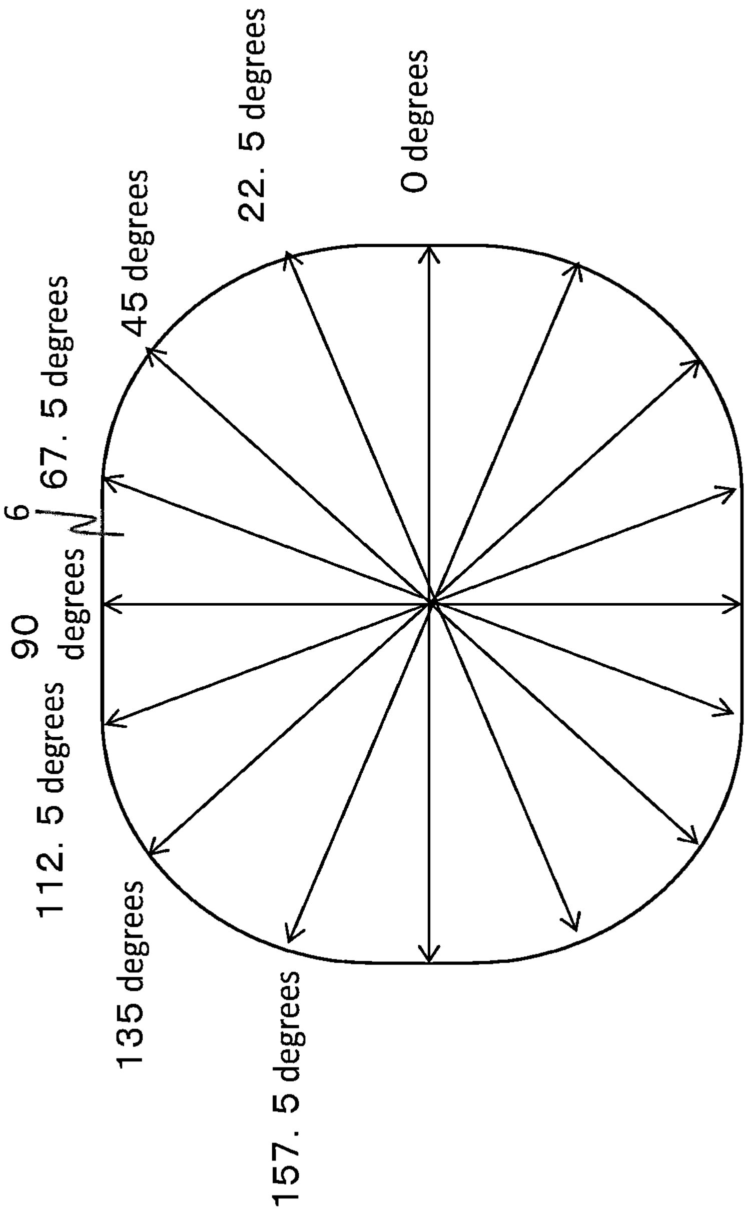
FIG. 4 is a schematic diagram illustrating the directions used when the coercivity is measured by varying the direction at an interval of 22.5° over an angle range of 360° in a flat surface of a flaky magnetic metal particle according to the first embodiment.

When the phrase "having the difference in coercivity" is used, it is implied that when a magnetic field is applied in the direction of 360° in the flat surface and the coercivity is measured, there exist a direction in which maximum coercivity is obtained, and a direction in which minimum coercivity is obtained. For example, when the coercivity is measured by varying the direction at an interval of 22.5° over an angle range of 360° in the flat surface, the difference in coercivity is obtained. In other words, in a case in which there are an angle at which the coercivity becomes larger and an angle at which the coercivity becomes smaller, the concept of "having the difference in coercivity" applies. FIG. 4 is a schematic diagram illustrating the directions used when the coercivity is measured by varying the direction at an interval of 22.5° over an angle range of 360° in the flat surface of a flaky magnetic metal particle according to the first embodiment. By having the difference in coercivity within the flat surface, the minimum coercivity value becomes smaller compared to the case of isotropy with almost no difference in coercivity, which is preferable. In regard to a material having magnetic anisotropy within the flat surface, there is the difference in the coercivity depending on the direction in the flat surface, and the minimum coercivity value becomes small compared to a material that is magnetically isotropic. As a result, the hysteresis loss is reduced, and the magnetic permeability is increased, which is preferable.

Coercivity may be discussed using the approximation formula: $Hc=\alpha Ha-NMs$ (Hc: coercivity, Ha: magnetocrystalline anisotropy, Ms: saturation magnetization, $\alpha$, N: values varying depending on the composition, texture, shape, or the like) in connection with magnetocrystalline anisotropy. That is, generally, there is a tendency that as the magnetocrystalline anisotropy increases, coercivity is likely to increase, and as the magnetocrystalline anisotropy decreases, coercivity is likely to decrease. However, the $\alpha$ value and the N value in the approximation formula are values that vary significantly depending on the composition, texture, or shape of the material, and even if the magnetocrystalline anisotropy is high, the coercivity may have a relatively small value (in the case in which the $\alpha$ value is small or the N value is large), or even if the magnetocrystalline anisotropy is small (in the case in which the $\alpha$ value is large or the N value is small), the coercivity may have a relatively large value. That is, magnetocrystalline anisotropy is a characteristic intrinsic to a substance, which is defined by the composition of the material; however, coercivity is a characteristic that is not defined only by the composition of the material but can greatly vary depending on the texture, shape, or the like. Furthermore, the magnetocrystalline anisotropy is not a factor that directly affects the hysteresis loss but is a factor that indirectly affects the hysteresis loss; however, coercivity is a factor that directly affects the loop area of a direct current magnetization curve (this area corresponds to the magnitude of the hysteresis loss). Therefore, coercivity is a factor that almost directly determines the magnitude of the hysteresis loss. That is, it can be said that unlike the magnetocrystalline anisotropy, coercivity is a very important factor that affects the hysteresis loss directly and significantly.

Furthermore, even when a flaky magnetic metal particle has magnetic anisotropy including magnetocrystalline anisotropy, it cannot be necessarily said that the difference in coercivity is exhibited depending on the direction of the flat surface of the flaky magnetic metal particle. It is because as described above, coercivity is not a value that is decided uniformly by the magnetocrystalline anisotropy but is a characteristic that varies anyhow depending on the composition, texture, or shape of the material. Also, as described above, the factor that affects the hysteresis loss directly and significantly is not the magnetic anisotropy but is rather coercivity. Thus, a condition that is highly preferable toward characteristics improvement is "having the difference in coercivity on the basis of direction within the flat surface". Thereby, the hysteresis loss is reduced, and the magnetic permeability is also increased, which is preferable.

The ratio a/b of the maximum length a with respect to the minimum length b in the flat surface is preferably 2 or greater on the average, more preferably 3 or greater, even more preferably 5 or greater, and still more preferably 10 or greater. It is preferable that the ratios a/b of the maximum length a with respect to the minimum length b in the flat surface include a ratio value of 2 or greater, more preferably 3 or greater, even more preferably 5 or greater, and still more preferably 10 or greater. Thereby, magnetic anisotropy can be induced easily, which is desirable. When magnetic anisotropy is induced, the difference in coercivity emerges within the flat surface, and the minimum coercivity value becomes smaller compared to magnetically isotropic materials. Thereby, the hysteresis loss is reduced, and the magnetic permeability is enhanced, which is preferable. More preferably, in regard to the flaky magnetic metal particles, it is desirable that either or both of a plurality of concavities and a plurality of convexities described below have their first directions arranged in the maximum length direction. In a case in which the flaky magnetic metal particles are converted into a pressed powder, since the ratio a/b of the flaky magnetic metal particles is large, the area (or area proportion) in which the flat surfaces of individual flaky magnetic metal particles overlap with one another becomes large, and the strength of the pressed powder body increases, which is preferable. Furthermore, when the ratio of the maximum length to the minimum length is larger, the magnetic moment is confined in a direction parallel to the flat surface, and magnetization is likely to proceed by rotation magnetization, which is preferable. In a case in which magnetization proceeds by rotation magnetization, since magnetization is likely to proceed reversibly, coercivity becomes small, and the hysteresis loss can be reduced thereby, which is preferable. On the other hand, from the viewpoint of strength improvement, it is preferable that the ratio a/b of the maximum length a to the minimum length b in the flat surface is, on the average, 1 or higher and lower than 2, and more preferably, 1 or higher and lower than 1.5. Thereby, fluidity or the packing property of the particles is enhanced, which is desirable. Furthermore, the strength in a direction perpendicular to the flat surface is increased compared to the case of having a large value of a/b, and it is preferable from the viewpoint of strength improvement of the flaky magnetic metal particles. Furthermore, when the particles are powder-compacted, there is less chance that the particles are powder-compacted in a bent state, and the stress to the particles is likely to be reduced. That is, strain is reduced, and this leads to reduction of the coercivity and the hysteresis loss. Also, since stress is reduced, thermal stability and mechanical characteristics such as strength and toughness are likely to be enhanced.

Furthermore, a particle having an angle in at least a portion of the contour shape of the flat surface is preferably used. For example, a contour shape such as a square or a rectangle, in other words, a contour shape having an angle of a corner of approximately 90°, is desirable. As a result, symmetry of the atomic arrangement is decreased at the corner parts, the electron orbits are confined, and therefore, magnetic anisotropy can be induced easily to the flat surface, which is desirable.

On the other hand, from the viewpoint of loss reduction or strength improvement, it is desirable that the contour shape of the flat surface is formed by a roundish curve. In an extreme example, it is desirable to employ a round contour shape such as a circle or an ellipse. As a result, abrasion resistance of the particles is enhanced, which is desirable. Furthermore, stress is not likely to be concentrated around the contour shape, the magnetic strain of the flaky magnetic metal particle is reduced, coercivity is decreased, and the hysteresis loss is reduced, which is desirable. Since stress concentration is reduced, thermal stability and mechanical characteristics such as strength and toughness are also likely to be enhanced, which is desirable.

It is desirable that the flaky magnetic metal particles have a magnetic metal phase containing Fe, Co, and Si. This case will be explained in detail below. In regard to the magnetic metal phase, the amount of Co with respect to the total amount of Fe and Co is preferably from 0.001 at % to 80 at %, more preferably from 1 at % to 60 at %, even more preferably from 5 at % to 40 at %, and still more preferably from 10 at % to 20 at %. This is preferable because appropriately high magnetic anisotropy can be induced easily thereby, and the above-described magnetic characteristics are enhanced. Furthermore, it is preferable because an Fe—Co system can readily realize high saturation magnetization. When the composition range of Fe and Co falls in the above-described range, even higher saturation magnetization can be realized, and thus it is preferable. Furthermore, the amount of Si with respect to the total amount of the magnetic metal phase is preferably from 0.001 at % to 30 at %, more preferably from 1 at % to 25 at %, and even more preferably from 5 at % to 20 at %. Thereby, the magnetocrystalline anisotropy acquires an appropriate magnitude, coercivity is also likely to be reduced, and low hysteresis loss and high magnetic permeability are likely to be realized, which is preferable.

In addition, in a case in which the magnetic metal phase is a system containing Fe, Co, and Si, and the amount of Co and the amount of Si are respectively in the above-described ranges, a particularly significant effect about the induced magnetic anisotropy as described above is exhibited. Compared to a monatomic system of Fe or Co only, or compared to a diatomic system of Fe and Si only or Fe and Co only, particularly in a triatomic system of Fe, Co and Si, appropriately high magnetic anisotropy can be induced easily, coercivity can become small, and thereby the hysteresis loss can be reduced, while the magnetic permeability can be increased, which is preferable. This significant effect is brought about particularly only when the composition of the system falls in the composition range described above. Furthermore, in regard to a triatomic system of Fe, Co, and Si, when the composition falls in the composition range described above, the thermal stability and oxidation resistance are also markedly enhanced, and it is preferable. Since the thermal stability and oxidation resistance are enhanced, the mechanical characteristics at high temperature are also enhanced, which is preferable. Furthermore, even for mechanical characteristics at room temperature, mechanical characteristics such as strength, hardness, and abrasion resistance are enhanced, which is preferable. On the occasion of synthesizing the flaky magnetic metal particles, in a case in which flaky magnetic metal particles are obtained by synthesizing a ribbon by a roll quenching method or the like and pulverizing this ribbon, when the magnetic metal phase is a triatomic system of Fe, Co, and Si, and the amount of Co and the amount of Si respectively fall in the ranges described above, the ribbon is likely to be pulverized particularly easily, and thereby, a state in which the flaky magnetic metal particles are not readily subjected to strain can be realized, which is preferable. When the flaky magnetic metal particles are not likely to be subjected to strain, coercivity is likely to be reduced, and low hysteresis loss and high magnetic permeability are likely to be realized, which is preferable. Furthermore, when strain is low, stability over time is increased, or thermal stability is increased, or excellent mechanical characteristics such as strength, hardness, and abrasion resistance are obtained, which is preferable.

The average crystal grain size of the magnetic metal phase is preferably 1 μm or more, more preferably 10 μm or more, even more preferably 50 μm or more, and still more preferably 100 μm or more. When the average crystal grain size of the magnetic metal phase becomes large, the proportion of the surface of the magnetic metal phase becomes small, and therefore, the number of pinning sites during magnetization is decreased, and thereby coercivity is decreased. Thus, the hysteresis loss is decreased, which is preferable. Furthermore, when the average crystal grain size of the magnetic metal phase becomes large in the above-described range, appropriately high magnetic anisotropy can be induced easily, and the above-mentioned magnetic characteristics are enhanced. Therefore, it is preferable.

Particularly, in a case in which the magnetic metal phase is system containing Fe, Co, and Si, and the amount of Co and the amount of Si are respectively in the above-mentioned ranges, while the average crystal grain size of the magnetic metal phase is in the above-mentioned range, appropriately high magnetic anisotropy can be induced easily, and the magnetic characteristics described above are noticeably enhanced, which is more preferable. Above all, particularly in a case in which the magnetic metal phase is a system containing Fe, Co, and Si, the amount of Co is from 5 at % to 40 at %, and more preferably from 10 at % to 20 at %, with respect to the total amount of Fe and Co, while the amount of Si is from 1 at % to 25 at %, and more preferably from 5 at % to 20 at %, with respect to the total amount of the magnetic metal phase, and the average crystal grain size of the magnetic metal phase is 10 μm or more, more preferably 50 μm or more, and even more preferably 100 μm or more, appropriately high magnetic anisotropy can be induced easily, and the above-described magnetic characteristics are particularly noticeably enhanced, which is more preferable.

It is also preferable that the magnetic metal phase has a portion having the crystal structure of the body-centered cubic structure (bcc). Thereby, appropriately high magnetic anisotropy can be induced easily, and the above-mentioned magnetic characteristics are enhanced. Therefore, it is preferable. Also with a "crystal structure of a mixed phase of bcc and face-centered cubic (fcc)" partially having the fcc crystal structure, appropriately high magnetic anisotropy can be induced easily, and the above-mentioned magnetic characteristics are enhanced, which is therefore preferable.

It is preferable that the flat surfaces of the flaky magnetic metal particle are crystallographically roughly oriented. The direction of orientation is preferably (110) plane orientation.

Thereby, appropriately high magnetic anisotropy can be induced easily, and the above-described magnetic characteristics are enhanced. Therefore, it is preferable. A more preferred direction of orientation is (110) [111] direction. Thereby, appropriately high magnetic anisotropy can be induced easily, and the above-described magnetic characteristics are enhanced, which is therefore preferable. The crystal plane of the flat surface of the flaky magnetic metal particles is such that the peak intensity ratio of a crystal plane other than the (110) (220) plane (for example, (200), (211), (310), or (222)) with respect to (110) as measured by X-ray diffractometry (XRD) is preferably 10% or less, more preferably 5% or less, and even more preferably 3% or less. Thereby, appropriately high magnetic anisotropy can be induced easily, and the above-described magnetic characteristics are enhanced, which is therefore preferable.

In order to have the flat surfaces of the flaky magnetic metal particles (110)-oriented, it is effective to select adequate heat treatment conditions. It is preferable to set the heat treatment temperature to be from 800° C. to 1,200° C., more preferably from 850° C. to 1,100° C., even more preferably from 900° C. to 1,000° C., and still more preferably from 920° C. to 980° C. (near 940° C. is preferred). When the heat treatment temperature is too low or too high, the (110) orientation will not proceed readily, and a heat treatment temperature in the above-described range is most preferred. Furthermore, the heat treatment time is preferably 10 minutes or longer, more preferably 1 hour or longer, and even more preferably about 4 hours. When the heat treatment time is too short or too long, the (110) orientation will not proceed readily, and a heat treatment time of about 4 hours is most preferred. The heat treatment atmosphere is preferably a vacuum atmosphere with a low oxygen concentration, an inert atmosphere, or a reducing atmosphere, and more preferably a reducing atmosphere such as $H_2$ (hydrogen), CO (carbon monoxide), or $CH_4$ (methane). Thereby, oxidation of the flaky magnetic metal particles is suppressed, and oxidized parts can be reduced, which is therefore preferable. When the heat treatment conditions described above are selected, the (110) orientation can proceed readily, and the peak intensity ratio of a crystal plane other than the (110) (220) plane (for example, (200), (211), (310), or (222)) with respect to the (110) plane as measured by X-ray diffractometry (XRD) can be 10% or less, more preferably 5% or less, and even more preferably 3% or less, for the first time. Furthermore, strain can also be appropriately removed, and a state in which oxidation is suppressed (brought to a reduced state) can also be realized, which is preferable.

It is preferable that the flaky magnetic metal particles have a magnetic metal phase including at least one first element selected from the group consisting of Fe, Co, and Ni, and additive elements. In the following description, this case will be explained in detail. It is more preferable that the additive elements include B and Hf. Furthermore, it is preferable that the additive elements are included in a total amount of from 0.002 at % to 80 at %, more preferably from 5 at % to 80 at %, even more preferably from 5 at % to 40 at %, and still more preferably from 10 at % to 40 at %, with respect to the total amount of the magnetic metal phase. Thereby, amorphization proceeds, magnetic anisotropy can be induced easily, and the above-described magnetic characteristics are enhanced. Therefore, it is preferable. Furthermore, it is preferable that Hf is included in an amount of from 0.001 at % to 40 at %, more preferably from 1 at % to 30 at %, even more preferably from 1 at % to 20 at %, still more preferably from 1 at % to 15 at %, and even more preferably from 1 at % to 10 at %, with respect to the total amount of the magnetic metal phase. Thereby, amorphization proceeds, magnetic anisotropy can be induced easily, and the above-described magnetic characteristics are enhanced. Therefore, it is preferable.

When the magnetic metal phase is a system including the first element as well as B and Hf as the additive elements, and the total amount of the additive elements and the amount of Hf are respectively in the ranges mentioned above, a particularly significant effect about the induced magnetic anisotropy is exhibited. This significant effect is particularly brought about only when the composition of the magnetic metal phase is in the above-mentioned composition range. Furthermore, compared to systems containing other additive elements, particularly in a system including Hf, amorphization proceeds readily with a small amount, magnetic anisotropy can be induced easily, and both of appropriately high magnetic anisotropy and high saturation magnetization is easily realized. Therefore, it is preferable. Furthermore, Hf has a high melting point, and when Hf is included in the magnetic metal phase in the amount range described above, thermal stability and oxidation resistance are markedly enhanced, which is preferable. Furthermore, since thermal stability and oxidation resistance are enhanced, mechanical characteristics at high temperature also enhanced, which is preferable. Also in regard to the mechanical characteristics at room temperature, mechanical characteristics such as strength, hardness, and abrasion resistance are enhanced, and thus it is preferable. Furthermore, when the flaky magnetic metal particles are synthesized, in a case in which flaky magnetic metal particles are obtained by synthesizing a ribbon by a roll quenching method or the like and pulverizing this ribbon, when the magnetic metal phase is a system including the first elements as well as B and Hf as the additive elements, and the total amount of the additive elements and the amount of Hf respectively fall in the ranges described above, particularly the ribbon can be pulverized relatively easily, and thereby, a state in which the flaky magnetic metal particles are not relatively readily subjected to strain can be realized. Thus, it is preferable. When the flaky magnetic metal particles are not readily subjected to strain, coercivity is likely to be reduced, and low hysteresis loss and high magnetic permeability are likely to be realized, which is preferable. Furthermore, when strain is reduced, stability over time can be increased, thermal stability can be increased, or excellent mechanical characteristics such as strength, hardness, and abrasion resistance can be obtained. Therefore, it is preferable.

In a case in which the magnetic metal phase is a system including the first element as well as B and Hf as the additive elements, and the total amount of the additive elements and the amount of Hf respectively fall in the ranges described above, excellent thermal stability is obtained, and therefore, it is possible to set the optimum heat treatment temperature for the flaky magnetic metal particles to a high level. That is, in regard to the method for producing flaky magnetic metal particles, it is preferable that a ribbon is synthesized, the ribbon thus obtained is pulverized by applying a heat treatment (may not be applied), and then the pulverization product is subjected to a heat treatment in order to eliminate strain (more preferably, a heat treatment in a magnetic field is preferred), and the heat treatment temperature at this time can be set to be relatively high. Thereby, strain can be relieved easily, and a material with reduced strain and low losses can be realized easily. For example, a material with low losses can be realized easily by performing a heat treatment at a temperature of 500° C. or higher (Loss reduction can be realized at a higher heat treatment temperature than that for other systems or compositions. For other systems or compositions, for example, a temperature of about 400° C. is an optimum heat treatment temperature).

Figure 5:
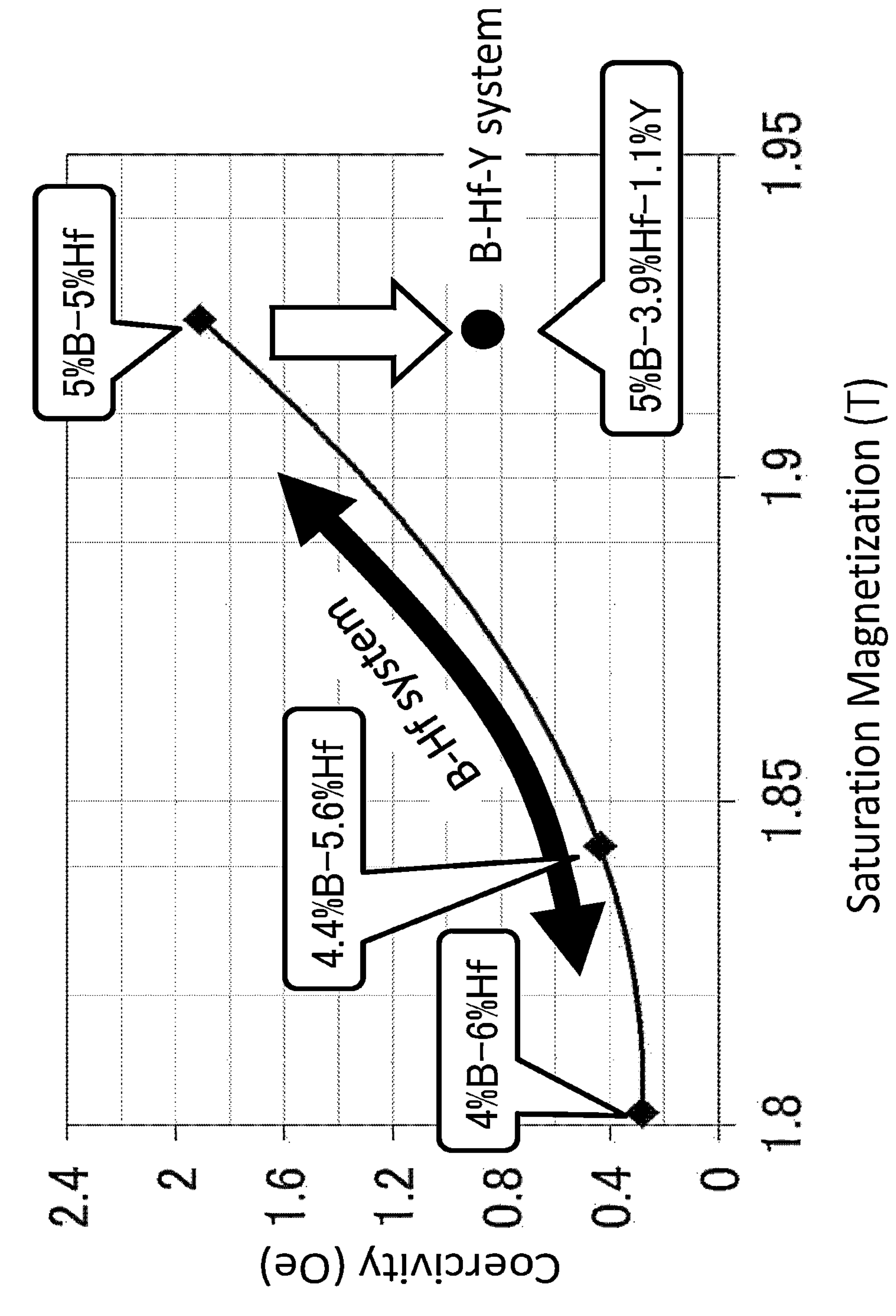
FIG. 5 is a graph illustrating the saturation magnetization and the coercivity of flaky magnetic metal particles having the composition: $(FeCo)_{90}(BHf)_{10}$ and flaky magnetic metal particles having the composition: $(FeCo)_{90}$ $(BHfY)_{10}$.

It is preferable that the additive elements further include one or more "other different elements", in addition to B and Hf. The "other different elements" are preferably C, Ta, W, P, N, Mg, Al, Si, Ca, Zr, Ti, Zn, Mn, Ba, Sr, Cr, Mo, Ag, Ga, Sc, V, Nb, Pb, Cu, In, Sn, and rare earth elements, and among these, rare earth elements are more preferred, while even more preferably, Y is preferred. As the "other different element" is included, diffusion of the elements included in the magnetic metal phase is effectively suppressed, amorphization proceeds, and magnetic anisotropy can be induced easily, which is therefore preferable (it is preferable because low coercivity, low hysteresis loss, and high magnetic permeability can be easily realized). Particularly, when the "other different element" has an atomic radius different from those of B and Hf, diffusion of the elements included in the magnetic metal phase is effectively suppressed. For example, since Y and the like have larger atomic radii than B and Hf, those elements can suppress the diffusion of the element included in the magnetic metal phase very effectively. In the following description, an appropriate composition range will be explained by taking the case of the "other different element" being Y, as an example. The amount of Y is preferably from 1 at % to 80 at %, more preferably from 2 at % to 60 at %, and even more preferably from 4 at % to 60 at %, with respect to the total amount of Hf and Y. Furthermore, it is preferable that Hf and Y are included in the magnetic metal phase in a total amount of Hf and Y of from 0.002 at % to 40 at %, more preferably from 1 at % to 30 at %, even more preferably from 1 at % to 20 at %, still more preferably from 1 at % to 15 at %, and even more preferably from 1 at % to 10 at %. Thereby, amorphization proceeds, magnetic anisotropy can be induced easily, and the magnetic characteristics described above are enhanced, which is therefore preferable. As the composition is included in the composition range described above, particularly, a more noticeable and significant effect about the induced magnetic anisotropy as described above is exhibited as compared to the case in which the additive elements are B and Hf only. This noticeable and significant effect is brought about only when the composition falls particularly in the composition range described above. Furthermore, amorphization can proceed easily with a small amount, magnetic anisotropy can be induced easily, and both the effect and high saturation magnetization can be realized easily, which is therefore preferable. In FIG. 5, this effect will be explained by employing a specific example. FIG. 5 is a graph illustrating the saturation magnetization and the coercivity of flaky magnetic metal particles having the composition: $(FeCo)_{90}(BHf)_{10}$ and the composition $(FeCo)_{90}(BHfY)_{10}$. From this diagram, it is understood that when Y is added to a system of FeCo—BHf to obtain a system of FeCo—BHfY, coercivity is noticeably decreased at the same saturation magnetization. That is, a balance between low coercivity (thereby, low hysteresis loss and high magnetic permeability can be realized) and high saturation magnetization can be realized more easily. FIG. 5 is just an example; however, when the composition of a system added with Y is appropriately selected, those characteristics that cannot be realized in the system of BHf can be realized for the first time. Furthermore, thermal stability and oxidation resistance are markedly enhanced, and thus it is preferable. Furthermore, since thermal stability or oxidation resistance is enhanced, mechanical characteristics at high temperature are also enhanced, which is preferable. Moreover, also with regard to the mechanical characteristics at room temperature, mechanical characteristics such as strength, hardness, and abrasion resistance are enhanced, which is preferable.

It is preferable that the average crystal grain size of the magnetic metal phase is 100 nm or less, more preferably 50 nm or less, even more preferably 20 nm or less, and still more preferably 10 nm or less. It is more preferable that the average crystal grain size is smaller, and the average crystal grain size is more preferably 5 nm or less, and even more preferably 2 nm or less. Thereby, magnetic anisotropy can be induced easily, and the above-described magnetic characteristics are enhanced, which is therefore preferable. Furthermore, when it is said that the crystal grain size is smaller, it is implied that the phase is closer to an amorphous state. Therefore, the electrical resistance becomes higher compared to highly crystalline materials, and thereby, the eddy current loss can be reduced easily, which is preferable. Furthermore, compared to highly crystalline materials, superior corrosion resistance and oxidation resistance are obtained, and therefore, it is preferable.

In a case in which the additive elements further include one or more "other different elements (for example, Y)" in addition to B and Hf, and the amount of the "other different element (for example, Y)" and the total amount of Hf and the "other different element (for example, Y)" are in the ranges described above, it is preferable because an average crystal grain size of 30 nm or less can be realized relatively easily. That is, since the phase becomes closer to amorphousness, electrical resistance becomes high compared to highly crystalline compositions, and thereby, the eddy current loss is reduced, which is therefore preferable. Furthermore, the magnetic metal phase is excellent in view of corrosion resistance and oxidation resistance, as compared to a highly crystalline magnetic metal phase, which is therefore preferable. Furthermore, it is preferable because anisotropy can be induced easily, and the above-mentioned magnetic characteristics are enhanced.

Particularly, in a case in which the magnetic metal phase is a system including the first element as well as B and Hf as the additive elements, and the total amount of the additive elements and the amount of Hf respectively fall in the above-described ranges, while the average crystal grain size of the magnetic metal phase is in the above-described range, enhancement of the magnetic characteristics caused by the induced magnetic anisotropy, an increase in the electrical resistance (reduction of eddy current loss) caused by amorphization, and noticeable enhancement of the effects of increased corrosion resistance and increased oxidation resistance are achieved. Thus, it is more preferable. Above all, in particular, in a case in which the magnetic metal phase is a system including the first element as well as B and Hf as the additive elements, the total amount of the additive elements is from 5 at % to 40 at %, and more preferably from 10 at % to 40 at %, with respect to the total amount of the magnetic metal phase, and the amount of Hf is from 1 at % to 20 at %, more preferably from 1 at % to 15 at %, and even more preferably from 1 at % to 10 at %, with respect to the total amount of the magnetic metal phase, while the average crystal grain size of the magnetic metal phase is 50 nm or less, more preferably 20 nm or less, and even more preferably 10 nm or less, enhancement of the magnetic characteristics caused by the induced magnetic anisotropy, increase in the electrical resistance (reduction of eddy current loss) caused by amorphization, and particularly noticeable enhancement of the effects of increased corrosion resistance and increased oxidation resistance are achieved. Thus, it is more preferable.

A crystal grain size of 100 nm or less can be calculated simply by Scherrer's formula based on XRD measurement, and the crystal grain size can also be determined by making an observation of a large number of magnetic metal phases by transmission electron microscopic (TEM) observation and averaging the particle sizes of the magnetic metal phases. In a case in which the crystal grain size is small, it is preferable to determine the crystal grain size by XRD measurement, and in a case in which the crystal grain size is large, it is preferable to determine the crystal grain size by TEM observation. However, it is preferable to select the measurement method according to the circumstances, or to use the two methods in combination and determine the crystal grain size in a comprehensive manner.

It is preferable that the flaky magnetic metal particles have high saturation magnetization, and the saturation magnetization is preferably 1 T or greater, more preferably 1.5 T or greater, even more preferably 1.8 T or greater, and still more preferably 2.0 T or greater. Thereby, magnetic saturation is suppressed, and magnetic characteristics can be exhibited sufficiently in the system, which is preferable. However, depending on the use application (for example, magnetic wedges of a motor), the flaky magnetic metal particles can be used sufficiently even in a case in which the saturation magnetization is relatively low, and it may be rather preferable that the flaky magnetic metal particles are specialized for low losses. Meanwhile, the magnetic wedges of a motor are lid-like objects for the slot parts into which coils are inserted. Usually, non-magnetic wedges are used; however, when magnetic wedges are employed, the sparseness or denseness of the magnetic flux density is moderated, the harmonic loss is reduced, and the motor efficiency is increased. At this time, it is preferable that saturation magnetization of the magnetic wedges is higher; however, even with relatively low saturation magnetization, sufficient effects are exhibited. Therefore, it is important to select the composition depending on the use application.

The lattice strain of the flaky magnetic metal particles is preferably from 0.01% to 10%, more preferably from 0.01% to 5%, even more preferably from 0.01% to 1%, and still more preferably from 0.01% to 0.5%. Thereby, appropriately high magnetic anisotropy can be induced easily, and the magnetic characteristics described above are enhanced, which is therefore preferable.

The lattice strain can be calculated by analyzing in detail the line widths obtainable by X-ray diffraction (XRD). That is, by drawing a Halder-Wagner plot or a Hall-Williamson plot, the extent of contribution made by expansion of the line width can be separated into the crystal grain size and the lattice strain. The lattice strain can be calculated thereby. A Halder-Wagner plot is preferable from the viewpoint of reliability. In regard to the Halder-Wagner plot, for example, N.C. Halder, C. N. J. Wagner, Acta Cryst., 20 (1966), 312-313 may be referred to. Here, a Halder-Wagner plot is represented by the following expression:

$$\frac{\beta^2}{\tan^2\theta} = \frac{K\lambda}{D}\frac{\beta}{\tan\theta\sin\theta} + 16\varepsilon^2,\ \varepsilon = \varepsilon_{max} = \frac{\sqrt{2\pi}}{2}\sqrt{\varepsilon^2} \quad \text{[Math. 1]}$$

($\beta$: integrated width, K: constant, $\lambda$: wavelength, D: crystal grain size, $\varepsilon^2$: lattice strain (root-mean-square))

That is, $\beta^2/\tan^2\theta$ is plotted on the vertical axis, and $\beta/\tan\theta\sin\theta$ is plotted on the horizontal axis. The crystal grain size D is calculated from the gradient of the approximation straight line of the plot, and the lattice strain $\varepsilon$ is calculated from the ordinate intercept. When the lattice strain obtained by a Halder-Wagner plot of the expression described above (lattice strain (root-mean-square)) is from 0.01% to 10%, more preferably from 0.01% to 5%, even more preferably from 0.01% to 1%, and still more preferably from 0.01% to 0.5%, appropriately high magnetic anisotropy can be induced easily, and the magnetic characteristics described above are enhanced, which is therefore preferable.

The lattice strain analysis described above is a technique that is effective in a case in which a plurality of peaks can be detected by XRD; however, in a case in which the peak intensities in XRD are weak, and there are few peaks that can be detected (for example, when only one peak is detected), it is difficult to perform an analysis. In such a case, it is preferable to calculate the lattice strain by the following procedure. First, the composition is determined by high-frequency inductively coupled plasma (ICP) emission spectroscopy, energy dispersive X-ray spectroscopy (EDX), or the like, and the composition ratio of three magnetic metal elements, namely, Fe, Co and Ni, is calculated (in a case in which there are only two magnetic metal elements, the composition ratio of two elements; in a case in which there is only one magnetic metal element, the composition ratio of one element (=100%)). Next, an ideal lattice spacing do is calculated from the composition of Fe—Co—Ni (refer to the values published in the literature, or the like. In some cases, an alloy having the composition is produced, and the lattice spacing is calculated by making a measurement). Subsequently, the amount of strain can be determined by determining the difference between the lattice spacing d of the peaks of an analyzed sample and the ideal lattice spacing do. That is, in this case, the amount of strain is calculated by the expression: $(d-d_0)/d_0\times100(\%)$. Thus, in regard to the analysis of the lattice strain, it is preferable to use the two above-described techniques appropriately depending on the state of peak intensity, and depending on cases, it is preferable to evaluate the lattice strain by using the two techniques in combination.

The lattice spacing in the flat surface varies depending on the direction, and the proportion of the difference between the maximum lattice spacing $d_{max}$ and the minimum lattice spacing $d_{min}$ ($=(d_{max}-d_{min})/d_{min}\times100(\%)$) is preferably from 0.01% to 10%, more preferably from 0.01% to 5%, even more preferably from 0.01% to 1%, and still more preferably from 0.01% to 0.5%. Thereby, appropriately high magnetic anisotropy can be induced easily, and the magnetic characteristics described above are enhanced, which is therefore preferable. Furthermore, the lattice spacing can be conveniently determined by an XRD analysis. When this XRD analysis is carried out while the direction is varied within a plane, the differences in the lattice constant depending on the direction can be determined.

In regard to crystallites of the flaky magnetic metal particles, it is preferable that either the crystallites are unidirectionally linked in a row within the flat surface, or the crystallites are rod-shaped and are unidirectionally oriented in the flat surface. Thereby, appropriately high magnetic anisotropy can be induced easily, and the magnetic characteristics described above are enhanced, which is therefore preferable.

It is preferable that the flat surface of a flaky magnetic metal particle has either or both of a plurality of concavities and a plurality of convexities, the concavities and the convexities being arranged in a first direction and each of the concavities and the convexities having a width of 0.1 μm or more, a length of 1 μm, and an aspect ratio of 2 or higher. Thereby, magnetic anisotropy is easily induced in the first direction, and the difference in coercivity on the basis of direction within the flat surface is increased, which is preferable. From this point of view, it is more preferable that the width is 1 μm or more and the length is 10 μm or more. The aspect ratio is preferably 5 or higher, and more preferably 10 or higher. Furthermore, by including such concavities or convexities, the adhesiveness between the flaky magnetic metal particles is enhanced at the time of synthesizing a pressed powder material by powder-compacting the flaky magnetic metal particles (the concavities or convexities bring an anchoring effect of attaching the particles to neighboring particles), and thereby, thermal stability and mechanical characteristics such as strength and hardness are enhanced. Therefore, it is preferable.

Figure 6:
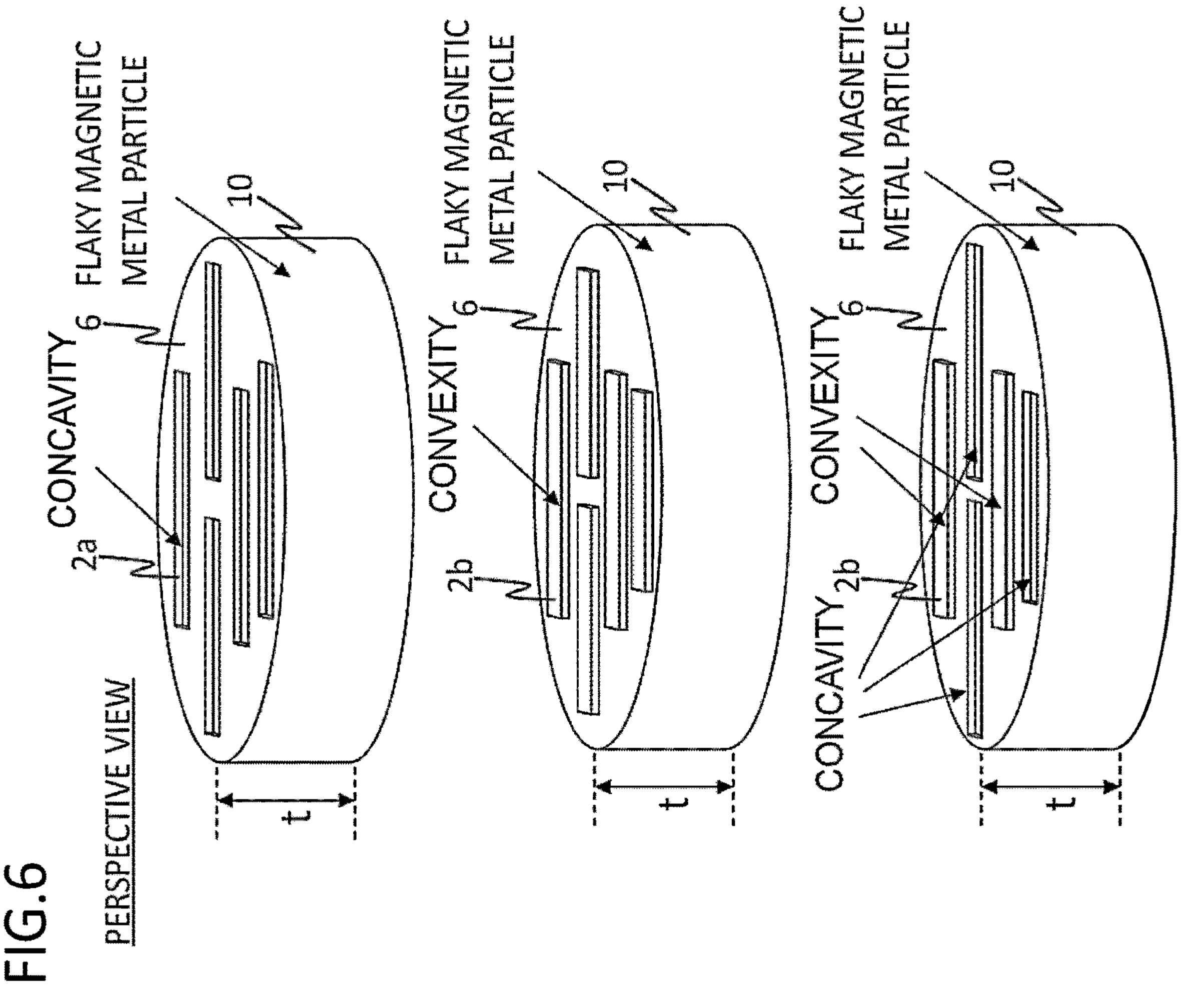
FIG. 6 is a schematic perspective view of flaky magnetic metal particles according to the first embodiment.
Figure 7:
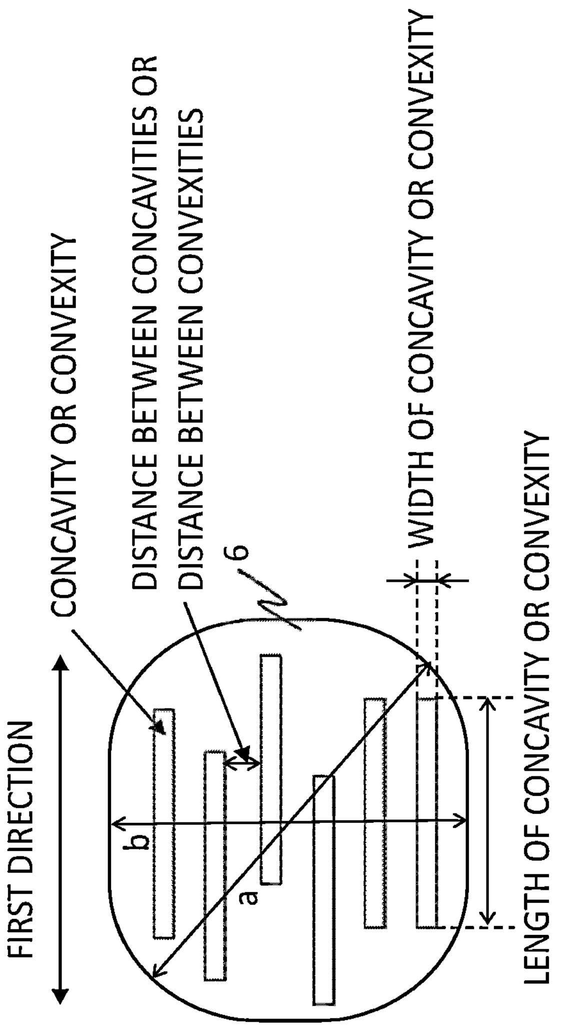
FIG. 7 is a schematic diagram of the flaky magnetic metal particles according to the first embodiment as viewed from the above.

FIG. 6 is a schematic perspective view of the flaky magnetic metal particles of a first embodiment. Meanwhile, in the upper diagram of FIG. 6, only concavities are provided, and in the middle diagram of FIG. 6, only convexities are provided; however, as shown in the lower diagram of FIG. 6, one flaky magnetic metal particle may have both concavities and convexities. FIG. 7 is a schematic diagram of a case in which a flaky magnetic metal particle of the present embodiment is viewed from above. The width and length of the concavities or convexities, and the distance between concavities or convexities are shown. One flaky magnetic metal particle may have both concavities and convexities. The aspect ratio of a concavity or a convexity is the ratio of the length of the major axis to the length of the minor axis. That is, when the length side of a concavity or a convexity is larger (longer) than the width, the aspect ratio is defined as the ratio of length to width, and when the width is larger (longer) than the length, the aspect ratio is defined as the ratio of width to length. As the aspect ratio is higher, the flaky magnetic metal particle is more likely to have magnetic uniaxial anisotropy (anisotropy), which is more preferable. FIG. 7 shows concavities 2*a*, convexities 2*b*, a flat surface 6, and flaky magnetic metal particles 10.

Furthermore, the phrase "(be) arranged in the first direction" implies that concavities or convexities are arranged such that the longer side between the length and the width of the concavities or the convexities is parallel to the first direction. Meanwhile, when concavities or convexities are arranged such that the longer side between the length and the width of the concavities or the convexities is within ±30° in a direction parallel to the first direction, it is said that the concavities or convexities are "arranged in the first direction". Thereby, the flaky magnetic metal particles are likely to have magnetic uniaxial anisotropy in the first direction by a shape magnetic anisotropy effect, which is preferable. It is preferable that the flaky magnetic metal particles have a magnetic anisotropy in one direction within the flat surface, and this will be described in detail. First, in a case in which the magnetic domain structure of the flaky magnetic metal particles is a multi-domain structure, the magnetization process proceeds by domain wall displacement; however, in this case, the coercivity in the easy axis direction within the flat surface becomes lower than that in the hard axis direction, and losses (hysteresis loss) are decreased. Furthermore, magnetic permeability in the easy axis direction becomes higher than that in the hard axis direction. Furthermore, compared to the case of flaky magnetic metal particles that are isotropic, particularly the coercivity in the easy axis direction becomes lower in the case of flaky magnetic metal particles having magnetic anisotropy, and as a result, losses become smaller, which is preferable. Also, magnetic permeability becomes high, and it is preferable. That is, when the flaky magnetic metal particles have magnetic anisotropy in a direction in the flat surface, magnetic characteristics are enhanced as compared to an isotropic material. Particularly, magnetic characteristics are superior in the easy axis direction in the flat surface than in the hard axis direction, which is preferable. Next, in a case in which the magnetic domain structure of the flaky magnetic metal particles is a single domain structure, the magnetization process proceeds by rotation magnetization; however, in this case, the coercivity in the hard axis direction in the flat surface becomes lower than that in the easy axis direction, and losses become small. In a case in which magnetization proceeds completely by rotation magnetization, the coercivity becomes zero, and the hysteresis loss becomes zero, which is preferable. Whether magnetization proceeds by domain wall displacement (domain wall displacement type) or by rotation magnetization (rotation magnetization type) can be determined on the basis of whether the magnetic domain structure becomes a multi-domain structure or a single domain structure. At this time, whether the magnetic domain structure becomes a multi-domain structure or a single domain structure is determined on the basis of the size (thickness or aspect ratio) of the flaky magnetic metal particles, composition, the condition of the magnetic interaction between particles, and the like. For example, as the thickness t of the flaky magnetic metal particles is smaller, the magnetic domain structure is more likely to become a single domain structure, and when the thickness is from 10 nm to 1 μm, and particularly when the thickness is from 10 nm to 100 nm, the magnetic domain structure is likely to become a single domain structure. Regarding the composition, in a composition having high magnetocrystalline anisotropy, even if the thickness is large, it tends to be easy to maintain a single domain structure. In a composition having low magnetocrystalline anisotropy, if the thickness is not small, it tends to be difficult to maintain a single domain structure. That is, the thickness of the borderline between being a single domain structure or a multi-domain structure varies depending also on the composition. Furthermore, when the flaky magnetic metal particles magnetically interact with neighboring particles, and the magnetic domain structure is stabilized, the magnetic domain structure is likely to become a single domain structure. The determination of whether the magnetization behavior is of the domain wall displacement type or of the rotation magnetization type can be made simply as follows. First, within a plane of the material (a plane that is parallel to the flat surface of a flaky magnetic metal particle), magnetization is analyzed by varying the direction in which a magnetic field is applied, and two directions in which the difference in the magnetization curve becomes the largest (at this time, the two directions are directions tilted by 90° from each other) are found out. Next, a comparison is made between the curves of the two directions, and thereby it can be determined whether the magnetization behavior is of the domain wall displacement type or the rotation magnetization type.

As described above, it is preferable that the flaky magnetic metal particles have magnetic anisotropy in one direction within the flat surface; however, more preferably, when the flaky magnetic metal particles have either or both of a plurality of concavities and a plurality of convexities, the concavities or convexities being arranged in a first direction, and each of the concavities and the convexities having a width of 0.1 μm or more, a length of 1 μm or more, and an aspect ratio of 2 or higher, magnetic anisotropy is more easily induced in the first direction, which is more preferable. From this point of view, a width of 1 μm or more and a length of 10 μm or more are more preferred. The aspect ratio is preferably 5 or higher, and more preferably 10 or higher. By having such concavities or convexities provided on the flaky magnetic metal particles, the adhesiveness between the flaky magnetic metal particles is enhanced at the time of synthesizing a pressed powder material by powder-compacting the flaky magnetic metal particles (the concavities or convexities bring an anchoring effect of attaching the particles to neighboring particles). As a result, mechanical characteristics such as strength and hardness, and thermal stability are enhanced, and therefore, it is preferable.

In regard to the flaky magnetic metal particles, it is preferable that the first directions of either or both of a plurality of concavities and a plurality of convexities are mostly arranged in the direction of the easy magnetization axis. That is, in a case in which there are a large number of directions of arrangement (=first directions) in the flat surface of a flaky magnetic metal particle, it is preferable that the direction of arrangement (=first direction) that accounts for the largest proportion in the large number of directions of arrangement (=first directions) coincides with the direction of the easy axis of the flaky magnetic metal particles. Since the length direction in which the concavities or convexities are arranged, namely, the first direction, is likely to become the easy magnetization axis as a result of the effect of shape magnetic anisotropy, when the flaky magnetic metal particles are oriented with respect to this direction as the easy magnetization axis, magnetic anisotropy can be easily induced, which is preferable.

In regard to either or both of a plurality of concavities and a plurality of convexities, it is desirable that five or more on the average of those are included in one flaky magnetic metal particle. Here, five or more concavities may be included, five or more convexities may be included, or the sum of the number of concavities and the number of convexities may be 5 or larger. More preferably, it is desirable that ten or more of concavities or convexities are included. It is also desirable that the average distance in the width direction between the respective concavities or convexities is from 0.1 μm to 100 μm. It is also desirable that a plurality of extraneous metal particles containing at least one first element selected from the group consisting of Fe, Co and Ni and having an average size of from 1 nm to 1 μm, are arranged along the concavities or convexities. Regarding the method for determining the average size of the extraneous metal particles, the average size is calculated by averaging the sizes of a plurality of extraneous metal particles arranged along the concavities or convexities, based on observation by TEM, SEM, an optical microscope, or the like. When these conditions are satisfied, magnetic anisotropy is easily induced in one direction, which is preferable. Furthermore, the adhesiveness between the flaky magnetic metal particles is enhanced when a pressed powder material is synthesized by powder-compacting the flaky magnetic metal particles (the concavities or convexities bring an anchoring effect of attaching the particles to neighboring particles), and thereby, mechanical characteristics such as strength and hardness, and thermal stability are enhanced, which is preferable.

It is desirable that each of the flaky magnetic metal particles further comprises a plurality of small magnetic metal particles, that is, five or more particles on the average, on the flat surface. The small magnetic metal particles contain at least one first element selected from the group consisting of Fe, Co, and Ni, and the average particle size is from 10 nm to 1 μm. More preferably, the small magnetic metal particles have a composition that is equal to that of the flaky magnetic metal particles. As the small magnetic metal particles are provided on the surface of the flat surface, or the small magnetic metal particles are integrated with the flaky magnetic metal particles, the surface of the flaky magnetic metal particles is brought to an artificially slightly damaged state. As a result, when the flaky magnetic metal particles are powder-compacted together with an intercalated phase that will be described below, adhesiveness is greatly enhanced. Thereby, thermal stability and mechanical characteristics such as strength and toughness can be easily enhanced. In order to exhibit such effects at the maximum level, it is desirable that the average particle size of the small magnetic metal particles is adjusted to be from 10 nm to 1 μm, and five or more small magnetic metal particles on the average are integrated with the surface, that is, the flat surface, of the flaky magnetic metal particles. When the small magnetic metal particles are unidirectionally arranged within the flat surface, magnetic anisotropy can be easily induced in the flat surface, and high magnetic permeability and low losses can be easily realized. Therefore, it is more preferable. The average particle size of the small magnetic metal particles is determined by observing the particles by TEM, SEM, an optical microscope, or the like.

The variation in the particle size distribution of the flaky magnetic metal particles can be defined by the coefficient of variation (CV value). That is, CV value (%)=[Standard deviation of particle size distribution (μm)/average particle size (μm)]×100. It can be said that as the CV value is smaller, a sharp particle size distribution with less variation in the particle size distribution is obtained. When the CV value defined as described above is from 0.1% to 60%, low coercivity, low hysteresis loss, high magnetic permeability, and high thermal stability can be realized, which is preferable. Furthermore, since the variation is small, it is also easy to realize a high yield. A more preferred range of the CV value is from 0.1% to 40%.

One effective method for providing the difference in coercivity on the basis of direction within the flat surface of a flaky magnetic metal particle is a method of subjecting the flaky magnetic metal particle to a heat treatment in a magnetic field. It is desirable to perform a heat treatment while a magnetic field is applied unidirectionally within the flat surface. Before performing the heat treatment in a magnetic field, it is desirable to find the easy axis direction within the flat surface (find the direction in which coercivity is lowest), and to perform the heat treatment while applying a magnetic field in that direction. It is more preferable if the magnetic field to be applied is larger; however, it is preferable to apply a magnetic field of 1 kOe or greater, and it is more preferable to apply a magnetic field of 10 kOe or greater. As a result, magnetic anisotropy can be exhibited in the flat surfaces of the flaky magnetic metal particles, the difference in coercivity on the basis of direction can be provided, and excellent magnetic characteristics can be realized. Therefore, it is preferable. The heat treatment is preferably carried out at a temperature of from 50° C. to 800° C. Regarding the atmosphere for the heat treatment, a vacuum atmosphere at a low oxygen concentration, an inert atmosphere, or a reducing atmosphere is desirable. More desirably, a reducing atmosphere of $H_2$ (hydrogen), CO (carbon monoxide), $CH_4$ (methane), or the like is preferred. The reason for this is that even if the flaky magnetic metal particles have been oxidized, the oxidized metal can be reduced and restored into simple metal by subjecting the metal particles to a heat treatment in a reducing atmosphere. As a result, flaky magnetic metal particles that have been oxidized and have lowered saturation magnetization can be reduced, and thereby saturation magnetization can also be restored. When crystallization of the flaky magnetic metal particles proceeds noticeably due to the heat treatment, characteristics are deteriorated (coercivity increases, and magnetic permeability decreases). Therefore, it is preferable to select the conditions so as to suppress excessive crystallization.

Furthermore, when flaky magnetic metal particles are synthesized, in a case in which the flaky magnetic metal particles are obtained by synthesizing a ribbon by a roll quenching method or the like and pulverizing this ribbon, either or both of a plurality of concavities and a plurality of convexities may be easily arranged in the first direction at the time of ribbon synthesis (concavities or convexities can be easily attached in the direction of rotation of the roll). As a result, the flaky magnetic metal particles can easily have the difference in coercivity on the basis of direction within the flat surface, which is preferable. That is, the direction in which either or both of a plurality of concavities and a plurality of convexities are arranged in the first direction with the flat surface, is likely to become the direction of the easy magnetization axis, and the flat surface can be effectively provided with the difference in coercivity on the basis of direction, which is preferable.

According to the present embodiment, flaky magnetic metal particles having excellent magnetic characteristics such as low magnetic loss can be provided.

Second Embodiment

The flaky magnetic metal particles of the present embodiment are different from the particles of the first embodiment in that at least a portion of the surface of the flaky magnetic metal particles is covered with a coating layer that has a thickness of from 0.1 nm to 1 μm and contains at least one second element selected from the group consisting of oxygen (O), carbon (C), nitrogen (N), and fluorine (F).

In addition, any matters overlapping with the contents of the first embodiment will not be described repeatedly.

Figure 8A:
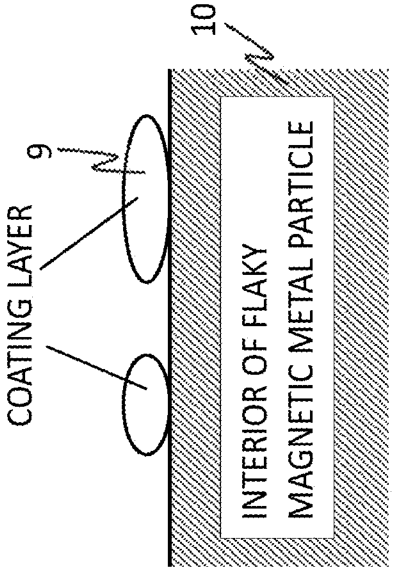
FIGS. 8A and 8B are schematic diagrams of flaky magnetic metal particles according to a second embodiment.
Figure 8B:
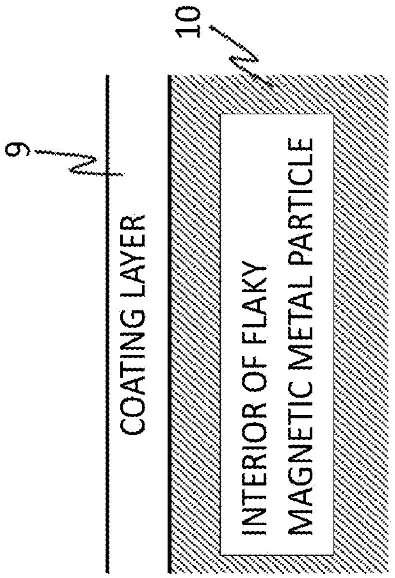

FIGS. 8A and 8B are schematic diagrams of the flaky magnetic metal particles of a second embodiment. The diagrams show a coating layer 9.

It is more preferable that the coating layer contains at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, and also contains at least one second element selected from the group consisting of oxygen (O), carbon (C), nitrogen (N), and fluorine (N). The non-magnetic metal is particularly preferably Al or Si, from the viewpoint of thermal stability. In a case in which the flaky magnetic metal particles contain at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, it is more preferable that the coating layer contains at least one non-magnetic metal that is the same as the non-magnetic metal as one of the constituent components of the flaky magnetic metal particles. Among oxygen (O), carbon (C), nitrogen (N), and fluorine (F), it is preferable that the coating layer contains oxygen (O), and it is preferable that coating layer contains an oxide or a composite oxide. This is from the viewpoints of the ease of forming the coating layer, oxidation resistance, and thermal stability. As a result, the adhesiveness between the flaky magnetic metal particles and the coating layer can be enhanced, and the thermal stability and oxidation resistance of the pressed powder material that will be described below can be enhanced. The coating layer can not only enhance the thermal stability and oxidation resistance of the flaky magnetic metal particles, but can also enhance the electrical resistance of the flaky magnetic metal particles. By increasing the electrical resistance, the eddy current loss can be suppressed, and the frequency characteristics of the magnetic permeability can be enhanced. Therefore, it is preferable that the coating layer 14 has high electrical resistance, and for example, it is preferable that the coating layer 14 has an electrical resistance value of 1 mΩ·cm or greater.

Furthermore, the presence of the coating layer is preferable also from the viewpoint of magnetic characteristics. In regard to the flaky magnetic metal particles, since the size of the thickness is small relative to the size of the flat surface, the metal particles may be regarded as a pseudo-thin film. At this time, a product obtained by forming the coating layer on the surface of the flaky magnetic metal particles and integrating the coating layer with the particles may be considered to have a pseudo-laminated thin film structure, and the magnetic domain structure is stabilized in terms of energy. As a result, coercivity can be reduced (hysteresis loss is reduced thereby), which is preferable. At this time, the magnetic permeability also becomes high, and it is preferable. From such a viewpoint, it is more preferable that the coating layer is non-magnetic (magnetic domain structure is easily stabilized).

From the viewpoints of thermal stability, oxidation resistance, and electrical resistance, it is more preferable as the thickness of the coating layer is larger. However, if the thickness of the coating layer is too large, the saturation magnetization becomes small, and the magnetic permeability also becomes small, which is not preferable. Furthermore, also from the viewpoint of magnetic characteristics, if the thickness is too large, the "effect by which the magnetic domain structure is stabilized, and a decrease in coercivity, a decrease in losses, and an increase in magnetic permeability are brought about" is reduced. In consideration of the above-described matters, a preferred thickness of the coating layer is from 0.1 nm to 1 μm, and more preferably from 0.1 nm to 100 nm.

Thus, according to the present embodiment, flaky magnetic metal particles having excellent characteristics such as high magnetic permeability, low losses, excellent mechanical characteristics, and high thermal stability can be provided.

Third Embodiment

A pressed powder material of the present embodiment is a pressed powder material comprising a plurality of flaky magnetic metal particles, each flaky magnetic metal particle having a flat surface and a magnetic metal phase containing Fe, Co, and Si, having a Co amount of from 0.001 at % to 80 at % with respect to the total amount of Fe and Co, and having an amount of Si of from 0.001 at % to 30 at % with respect to the total amount of the magnetic metal phase, the average thickness of the flaky magnetic metal particles being from 10 nm to 100 μm, and the average value of the ratio of the average length within the flat surface with respect to a thickness in each of the flaky magnetic metal particles being from 5 to 10,000; and an intercalated phase existing between the flaky magnetic metal particles and including at least one second element selected from the group consisting of oxygen (O), carbon (C), nitrogen (N), and fluorine (F), wherein in the pressed powder material, the flat surfaces are oriented to be parallel to a plane of the pressed powder material, and the pressed powder material has the difference in coercivity on the basis of direction within the plane.

The pressed powder material of the present embodiment is a pressed powder material comprising a plurality of flaky magnetic metal particles, each flaky magnetic metal particle having a flat surface and a magnetic metal phase including at least one first element selected from the group consisting of Fe, Co, and Ni as well as additive elements, the additive elements including B and Hf, the additive elements being included in a total amount of from 0.002 at % to 80 at % with respect to the total amount of the magnetic metal phase, the average thickness of the flaky magnetic metal particles being from 10 nm to 100 μm, and the average value of the ratio of the average length in the flat surface with respect to a thickness in each of the flaky magnetic metal particles being from 5 to 10,000; and an intercalated phase existing between the flaky magnetic metal particles and including at least one second element selected from the group consisting of oxygen (O), carbon (C), nitrogen (N), and fluorine (F), wherein in the pressed powder material, the flat surfaces are oriented to be parallel to a plane of the pressed powder material, and the pressed powder material has the difference in coercivity on the basis of direction within the plane.

In regard to the composition, the average crystal grain size, and the crystal orientation (approximate (110) orientation) of the magnetic metal phase, it is preferable that the requirements described in the first embodiment are satisfied; however, since the requirements overlap in this embodiment, further description will not be repeated herein.

It is preferable that saturation magnetization of the pressed powder material is high, and the saturation magnetization is preferably 0.2 T or higher, more preferably 0.5 T or higher, even more preferably 1.0 T or higher, still more preferably 1.8 T or higher, and even more preferably 2.0 T or higher. Thereby, magnetization saturation is suppressed, and the magnetic characteristics can be sufficiently exhibited on the system, which is preferable. However, depending on the use application (for example, magnetic wedges of a motor), the pressed powder material can be used sufficiently even in a case in which saturation magnetization is relatively low, and it is preferable that the pressed powder material is rather specialized for low losses. Therefore, it is important to select the composition according to the use applications.

Figure 9:
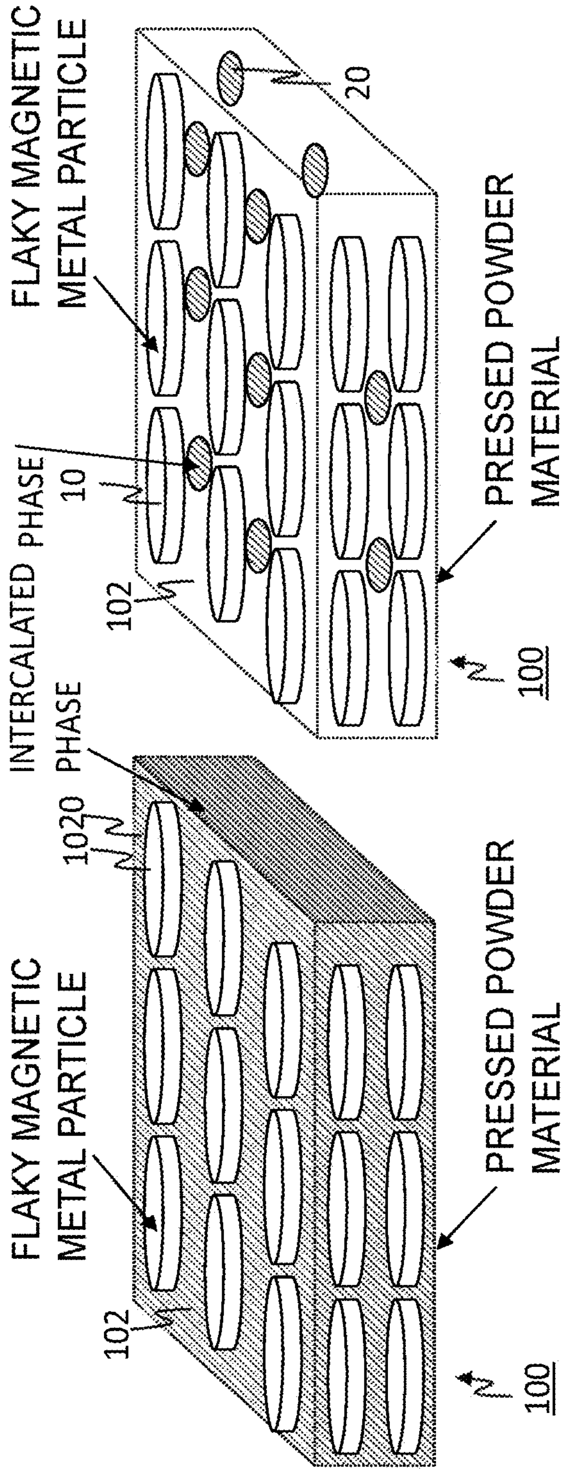
FIG. 9 is a schematic diagram of a pressed powder material according to a third embodiment.

FIG. 9 is a schematic diagram of a pressed powder material of a third embodiment. The diagram shows an intercalated phase 20, a pressed powder material 100, and a plane 102 of the pressed powder material. The diagram shown in the right-hand side of FIG. 9 is a schematic diagram produced by removing hatching from the diagram shown in the left-hand side of FIG. 9 in order to make the intercalated phase easily recognizable.

Figure 10:
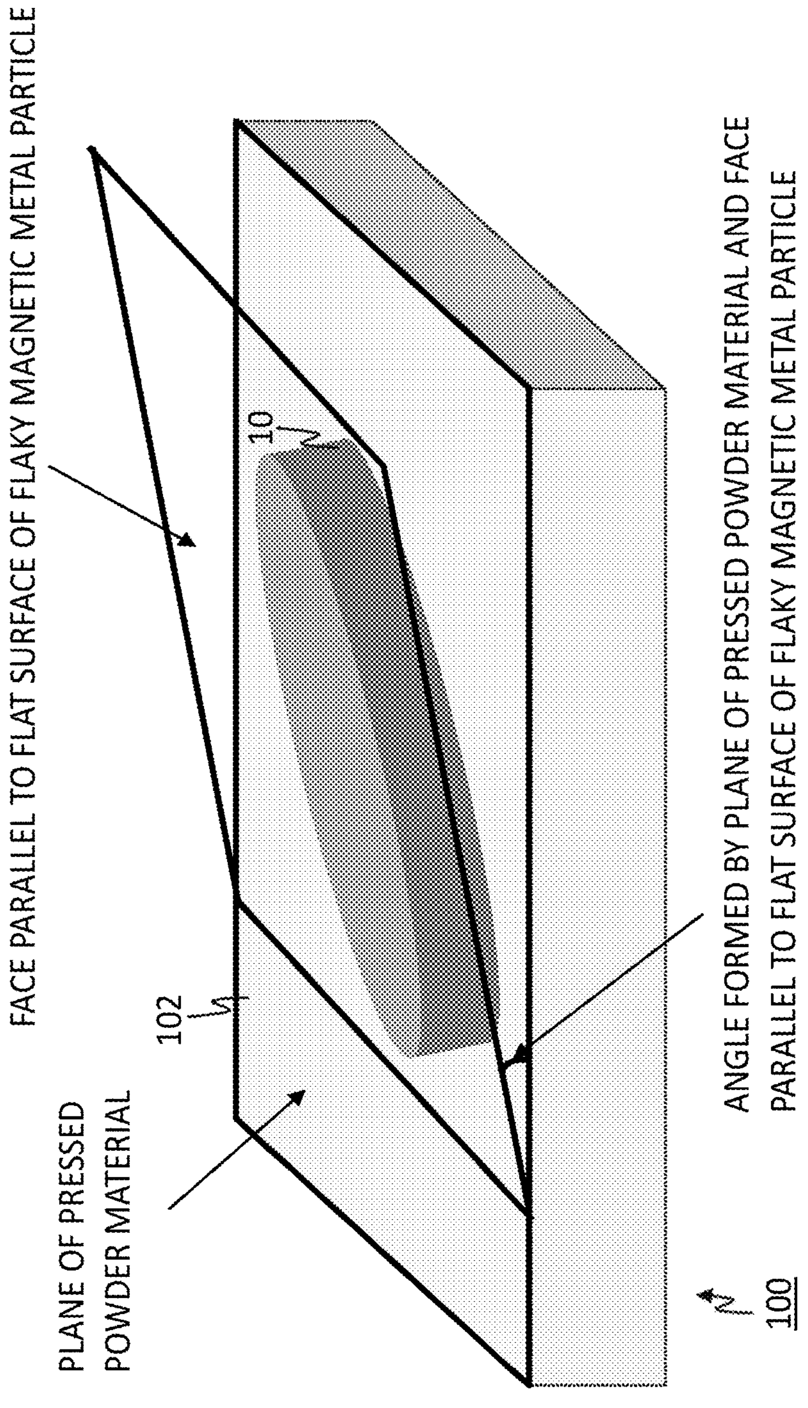
FIG. 10 is a schematic diagram illustrating the angle formed by a face parallel to the flat surface of a flaky magnetic metal particle and a plane of a pressed powder material, according to the third embodiment.

As the angle formed by a face parallel to the flat surface of a flaky magnetic metal particle and a plane of the pressed powder material is closer to 0°, it is defined that the flaky magnetic metal particle is oriented. FIG. 10 is a schematic diagram illustrating the angle formed by a face parallel to the flat surface of a flaky magnetic metal particle and a plane of the pressed powder material in the third embodiment. The above-mentioned angle is determined for a large number, that is, ten or more, of flaky magnetic metal particles, and it is desirable that the average value of the angles is preferably from 0° to 45°, more preferably from 0° to 30°, and even more preferably from 0° to 10°. That is, in regard to a pressed powder material, it is preferable that the flat surfaces of the flaky magnetic metal particles are oriented into a layered form such that the flat surfaces are parallel to one another or approximately parallel to one another. Thereby, the eddy current loss of the pressed powder material can be reduced, which is preferable. Furthermore, since the diamagnetic field can be made small, the magnetic permeability of the pressed powder material can be made high, which is preferable. Furthermore, since the ferromagnetic resonance frequency can be made high, the ferromagnetic resonance loss can be made small, which is preferable. Furthermore, such a laminated structure is preferable because the magnetic domain structure is stabilized, and low magnetic loss can be realized.

In a case in which coercivity is measured by varying the direction within the above-mentioned plane of a pressed powder material (within the plane parallel to the flat surface of a flaky magnetic metal particle), coercivity is measured by, for example, varying the direction at an interval of 22.5° over the angle of 360° within the plane.

By having the difference in coercivity within the above-mentioned plane of a pressed powder material, the minimum coercivity value becomes small compared to an isotropic case where there is almost no difference in coercivity, and thus it is preferable. A material having magnetic anisotropy within the plane has differences in coercivity depending on the direction in the plane, and the minimum coercivity value becomes small compared to a magnetically isotropic material. As a result, the hysteresis loss is reduced, and the magnetic permeability is increased, which is preferable.

In the above-mentioned plane of a pressed powder material (in the plane parallel to the flat surface of a flaky magnetic metal particle), it is more preferable as the proportion of the difference in coercivity is larger, and the proportion is preferably 1% or greater. More preferably, the proportion of the difference in coercivity is 10% or greater; even more preferably, the proportion of the difference in coercivity is 50% or greater; and still more preferably, the proportion of the difference in coercivity is 100% or greater. The proportion of the difference in coercivity as used herein is defined by the formula: $(Hc(max)-Hc(min))/Hc(min)\times 100(\%)$, by using the maximum coercivity, Hc(max), and the minimum coercivity, Hc(min), within a flat surface.

Coercivity can be evaluated conveniently by using a vibrating sample magnetometer (VSM) or the like. When the coercivity is low, even a coercivity of 0.1 Oe or less can be measured using a low magnetic field unit. Measurement is made by varying the direction within the above-mentioned plane of a pressed powder material (in the plane parallel to the flat surface of a flaky magnetic metal particle) with respect to the direction of the magnetic field to be measured.

When coercivity is calculated, a value obtained by dividing the difference between the magnetic fields at two points that intersect with abscissa (magnetic fields H1 and H2 where magnetization is zero) by 2 can be employed (that is, coercivity can be calculated by the formula: $\text{coercivity}=|H2-H1|/2$).

From the viewpoint of induced magnetic anisotropy, it is preferable that the magnetic metal particles are arranged so as to have the maximum length directions aligned. Whether the maximum length directions are aligned is determined by making an observation of the magnetic metal particles included in the pressed powder material by TEM or SEM or with an optical microscope or the like, determining the angle formed by the maximum length direction and an arbitrarily determined reference line, and judging the state according to the degree of variation. Preferably, it is preferable to determine the average degree of variation for twenty or more flaky magnetic metal particles; however, in a case in which an observation of twenty or more flaky magnetic metal particles cannot be made, it is preferable that an observation of as many flaky magnetic metal particles as possible is made, and an average degree of variation is determined for those particles. According to the present specification, it is said that the maximum length directions are aligned when the degree of variation is in the range of ±30°. It is more preferable that the degree of variation is in the range of ±20°, and it is even more preferable that the degree of variation is in the range of ±10°. As a result, magnetic anisotropy can be easily induced to the pressed powder material, which is desirable. More preferably, it is desirable that the first directions of either or both of a plurality of concavities and a plurality of convexities in the flat surface are arranged in the maximum length direction. Significant magnetic anisotropy can be induced thereby, and thus it is desirable.

In regard to the pressed powder material, it is preferable that the "proportion of arrangement" at which an approximate first direction is arranged in a second direction is 30% or higher. The "proportion of arrangement" is more desirably 50% or higher, and even more desirably 75% or higher. As a result, the magnetic anisotropy becomes appropriately high, and the magnetic characteristics are enhanced as described above, which is preferable. First, for all of the flaky magnetic metal particles to be evaluated in advance, the direction in which the direction of arrangement of the concavities or convexities carried by various flaky magnetic metal particles accounts for the largest proportion is defined as a first direction. The direction in which the largest number of the first directions of the various flaky magnetic metal particles will be arranged in the pressed powder material as a whole is defined as a second direction. Next, directions obtained by dividing the angle of 360° into angles at an interval of 45° with respect to the second direction are determined. Next, the first directions of the various flaky magnetic metal particles are sorted according to the direction of angle to which the first directions are arranged most closely, and that direction is defined as the "approximate first direction". That is, the first directions are sorted into four classes, that is, the direction of 0°, the direction of 45°, the direction of 90°, and the direction of 135°. The proportion in which the approximate first directions are arranged in the same direction with respect to the second direction is defined as the "proportion of arrangement". When this "proportion of arrangement" is evaluated, four consecutive neighboring flaky magnetic metal particles are selected, and the four particles are evaluated. This is carried out repeatedly for at least three or more times (the more the better; for example, five or more times is desirable, and ten or more times is more desirable), and thereby, the average value is employed as the proportion of arrangement. Meanwhile, flaky magnetic metal particles in which the directions of the concavities or the convexities cannot be determined are excluded from the evaluation, and an evaluation of the flaky magnetic metal particles immediately adjacent thereto is performed. For example, in many of flaky magnetic metal particles obtained by pulverizing a ribbon synthesized with a single roll quenching apparatus, concavities or convexities attach only on one of the flat surfaces, and the other flat surface does not have any concavities or convexities attached thereto. When such flaky magnetic metal particles are observed by SEM, the situation in which the flat surface without any concavities or convexities attached thereto is shown on the image of observation may also occur at a probability of about 50% (in this case, too, actually there may be concavities or convexities attached to the flat surface on the rear side; however, these flaky magnetic metal particles have been excluded from the evaluation).

Furthermore, it is preferable that the largest number of the approximate first directions is arranged in the direction of the easy magnetization axis of the pressed powder material. That is, it is preferable that the easy magnetization axis of the pressed powder material is parallel to the second direction. Since the length direction in which the concavities or convexities are arranged is likely to become the easy magnetization axis due to the effect of shape magnetic anisotropy, it is preferable to align the directions by taking this direction as the easy magnetization axis, since magnetic anisotropy is easily induced.

It is preferable that a portion of the intercalated phase is attached along the first direction. In other words, it is preferable that a portion of the intercalated phase is attached along the direction of the concavities or convexities on the flat surfaces of the flaky magnetic metal particles. Thereby, magnetic anisotropy can be easily induced unidirectionally, which is preferable. Such attachment of the intercalated phase is preferable because the adhesiveness between the flaky magnetic metal particles is enhanced, and consequently, mechanical characteristics such as strength and hardness and thermal stability are enhanced. It is also preferable that the intercalated phase includes a particulate phase. As a result, the adhesiveness between the flaky magnetic metal particles is maintained in an adequate state appropriately, strain is reduced (since there is a particulate intercalated phase between the flaky magnetic metal particles, the stress applied to the flaky magnetic metal particles is relieved), and coercivity can be easily reduced (hysteresis loss is reduced, and magnetic permeability is increased), which is preferable.

It is preferable that the intercalated phase is included in an amount of from 0.01 wt % to 80 wt %, more preferably from 0.1 wt % to 60 wt %, and even more preferably from 0.1 wt % to 40 wt %, with respect to the total amount of the pressed powder material. If the proportion of the intercalated phase is too large, the proportion of the flaky magnetic metal particles that have the role of exhibiting magnetic properties becomes small, and thereby, the saturation magnetization or magnetic permeability of the pressed powder material is lowered, which is not preferable. In contrast, if the proportion of the intercalated phase is too small, a bonding strength between the flaky magnetic metal particles and the intercalated phase is weakened, and it is not preferable from the viewpoints of thermal stability and mechanical characteristics such as strength and toughness. The proportion of the intercalated phase that is optimal from the viewpoints of magnetic characteristics such as saturation magnetization and magnetic permeability, thermal stability, and mechanical characteristics, is from 0.01 wt % to 80 wt %, more preferably from 0.1 wt % to 60 wt %, and even more preferably from 0.1 wt % to 40 wt %, with respect to the total amount of the pressed powder material.

Furthermore, it is preferable that the proportion of lattice mismatch between the intercalated phase and the flaky magnetic metal particles is from 0.1% to 50%. Thereby, appropriately high magnetic anisotropy can be easily induced, and the above-mentioned magnetic characteristics are enhanced, which is preferable. In order to set the lattice mismatch to the range described above, the lattice mismatch can be realized by selecting the combination of the composition of the intercalated phase and the composition of the flaky magnetic metal particles 10. For example, Ni of the fcc structure has a lattice constant of 3.52 Å, and MgO of the NaCl type structure has a lattice constant of 4.21 Å. Thus, the lattice mismatch of the two is (4.21-3.52)/3.52×100=20%. That is, the lattice mismatch can be set to 20% by employing Ni of the fcc structure as the main composition of the flaky magnetic metal particles and employing MgO for the intercalated phase 20. As such, the lattice mismatch can be set to the range described above by selecting the combination of the main composition of the flaky magnetic metal particles and the main composition of the intercalated phase.

The intercalated phase contains at least one second element selected from the group consisting of oxygen (O), carbon (C), nitrogen (N), and fluorine (F). It is because the electrical resistance can be increased thereby. It is preferable that the electrical resistivity of the intercalated phase is higher than the electrical resistivity of the flaky magnetic metal particles. It is because the eddy current loss of the flaky magnetic metal particles can be reduced thereby. Since the intercalated phase exists so as to surround the flaky magnetic metal particles, the oxidation resistance and thermal stability of the flaky magnetic metal particles can be enhanced, which is preferable. Above all, it is more preferable that the intercalated phase contains oxygen from the viewpoint of having high oxidation resistance and high thermal stability. Since the intercalated phase also plays a role of mechanically adhering flaky magnetic metal particles to neighboring flaky magnetic metal particles, it is preferable also from the viewpoint of high strength.

The intercalated phase may satisfy at least one of the following three conditions: "being an eutectic oxide", "containing a resin", and "containing at least one magnetic metal selected from Fe, Co, and Ni". This will be described below.

First, the first "case in which the intercalated phase is an eutectic oxide" will be described. In this case, the intercalated phase contains an eutectic oxide containing at least two tertiary elements selected from the group consisting of B (boron), Si (silicon), Cr (chromium), Mo (molybdenum), Nb (niobium), Li (lithium), Ba (barium), Zn (zinc), La (lanthanum), P (phosphorus), Al (aluminum), Ge (germanium), W (tungsten), Na (sodium), Ti (titanium), As (arsenic), V (vanadium), Ca (calcium), Bi (bismuth), Pb (lead), Te (tellurium), and Sn (tin). Particularly, it is preferable that the intercalated phase contains an eutectic system containing at least two elements from among B, Bi, Si, Zn, and Pb. As a result, the adhesiveness between the flaky magnetic metal particles and the intercalated phase becomes strong (bonding strength increases), and thermal stability and mechanical characteristics such as strength and toughness can be easily enhanced.

Furthermore, the eutectic oxide preferably has a softening point of from 200° C. to 600° C., and more preferably from 400° C. to 500° C. Even more preferably, the eutectic oxide is preferably an eutectic oxide containing at least two elements from among B, Bi, Si, Zn and Pb, and having a softening point of from 400° C. to 500° C. Thereby, the bonding strength between the flaky magnetic metal particles and the eutectic oxide becomes strong, and the thermal stability and mechanical characteristics such as strength and toughness can be easily enhanced. When the flaky magnetic metal particles are integrated with the eutectic oxide, the two components are integrated while performing a heat treatment at a temperature near the softening point of the eutectic oxide, and preferably a temperature slightly higher than the softening point. Then, the adhesiveness between the flaky magnetic metal particles and the eutectic oxide increases, and mechanical characteristics can be enhanced. Generally, as the temperature of the heat treatment is higher to a certain extent, the adhesiveness between the flaky magnetic metal particles and the eutectic oxide increases, and the mechanical characteristics are enhanced. However, if the temperature of the heat treatment is too high, the coefficient of thermal expansion may be increased, and consequently, the adhesiveness between the flaky magnetic metal particles and the eutectic oxide may be decreased on the contrary (when the difference between the coefficient of thermal expansion of the flaky magnetic metal particles and the coefficient of thermal expansion of the eutectic oxide becomes large, the adhesiveness may be further decreased). Furthermore, in a case in which the crystallinity of the flaky magnetic metal particles is non-crystalline or amorphous, if the temperature of the heat treatment is high, crystallization proceeds, and coercivity increases. Therefore, it is not preferable. For this reason, in order to achieve a balance between the mechanical characteristics and the coercivity characteristics, it is preferable to adjust the softening point of the eutectic oxide to be from 200° C. to 600° C., and more preferably from 400° C. to 500° C., and to integrate the flaky magnetic metal particles and the eutectic oxide while performing a heat treatment at a temperature near the softening point of the eutectic oxide, and preferably at a temperature slightly higher than the softening point. Furthermore, regarding the temperature at which the integrated material is actually used in a device or a system, it is preferable to set the use temperature of the integrated material to be lower than the softening point.

Furthermore, it is desirable that the eutectic oxide has a glass transition temperature. Furthermore, it is desirable that the eutectic oxide has a coefficient of thermal expansion of from $0.5\times10^{-6}$/° C. to $40\times10^{-6}$/° C. Thereby, the bonding strength between the flaky magnetic metal particles 10 and the eutectic oxide becomes strong, and the thermal stability and the mechanical characteristics such as strength and toughness can be easily enhanced.

Furthermore, it is more preferable that the eutectic oxide includes at least one or more eutectic particles that are in a particulate form (preferably a spherical form) having a particle size of from 10 nm to 10 μm. These eutectic particles contain a material that is the same as the eutectic oxide but is not in a particulate form. In a pressed powder material, pores may also exist in some part, and thus, it can be easily observed that a portion of the eutectic oxide exists in a particulate form, and preferably in a spherical form. Even in a case in which there are no pores, the interface of the particulate form or spherical form can be easily discriminated. The particle size of the eutectic particles is more preferably from 10 nm to 1 μm, and even more preferably from 10 nm to 100 nm. As a result, when stress is appropriately relieved during the heat treatment while the adhesiveness between the flaky magnetic metal particles is maintained, the strain applied to the flaky magnetic metal particles can be reduced, and coercivity can be reduced. Thereby, the hysteresis loss is also reduced, and the magnetic permeability is increased. Meanwhile, the particle size of the eutectic particles can be measured by making an observation by TEM or SEM. In the scanning electron microscopic photograph of FIG. 28 described above, it is understood that there is a plurality of spherical eutectic particles formed from the intercalated phase.

Furthermore, it is preferable that the intercalated phase has a softening point that is higher than the softening point of the eutectic oxide, and it is more preferable that the intercalated phase has a softening point higher than 600° C. and further contains intermediate intercalated particles containing at least one element selected from the group consisting of oxygen (O), carbon (C), nitrogen (N), and fluorine (F). When the intermediate intercalated particles exist between the flaky magnetic metal particles, on the occasion in which the pressed powder material is exposed to high temperature, the flaky magnetic metal particles can be prevented from being thermally fused with one another and undergoing deterioration of characteristics. That is, it is desirable that the intermediate intercalated particles exist mainly for the purpose of providing thermal stability. Furthermore, when the softening point of the intermediate intercalated particles is higher than the softening point of the eutectic oxide, and more preferably, the softening point is 600° C. or higher, thermal stability can be further increased.

It is preferable that the intermediate intercalated particles contain at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, and contain at least one element selected from the group consisting of O (oxygen), C (carbon), N (nitrogen) and F (fluorine). More preferably, from the viewpoints of high oxidation resistance and high thermal stability, an oxide or composite oxide containing oxygen is more preferred. Particularly, oxides such as aluminum oxide ($Al_2O_3$), silicon dioxide ($SiO_2$), titanium oxide ($TiO_2$), and zirconium oxide ($ZrO_2$); and composite oxides such as Al—Si—O are preferred from the viewpoint of high oxidation resistance and high thermal stability.

Regarding the method for producing a pressed powder material containing intermediate intercalated particles, for example, a method of mixing the flaky magnetic metal particles and the intermediate intercalated particles (aluminum oxide ($Al_2O_3$) particles, silicon dioxide ($SiO_2$) particles, titanium oxide ($TiO_2$) particles, zirconium oxide ($ZrO_2$) particles, and the like) using a ball mill or the like to obtain a dispersed state, and then integrating the flaky magnetic metal particles and the intermediate intercalated particles by press molding or the like, may be used. The method of dispersing the particles is not particularly limited as long as it is a method capable of appropriately dispersing particles.

Next, the second "case in which the intercalated phase contains a resin" will be described. In this case, the resin is not particularly limited, and a polyester-based resin, a polyethylene-based resin, a polystyrene-based resin, a polyvinyl chloride-based resin, a polyvinyl butyral resin, a polyvinyl alcohol resin, a polybutadiene-based resin, a TEFLON (registered trademark)-based resin, a polyurethane resin, a cellulose-based resin, an ABS resin, a nitrile-butadiene-based rubber, a styrene-butadiene-based rubber, a silicone resin, other synthetic rubbers, natural rubber, an epoxy resin, a phenolic resin, an allyl resin, a polybenzimidazole resin, an amide-based resin, a polyimide-based resin, a polyamide-imide resin, or copolymers of those resins are used. Particularly, in order to realize high thermal stability, it is preferable that the intercalated phase includes a silicone resin or a polyimide resin, both of which have high heat resistance. As a result, the bonding strength between the flaky magnetic metal particles and the intercalated phase becomes strong, and thermal stability and mechanical characteristics such as strength and toughness can be easily enhanced.

Regarding the resin, it is preferable that the weight reduction percentage after heating for 3,000 hours at 180° C. in an air atmosphere is 5% or less, more preferably 3% or less, even more preferably 1% or less, and still more preferably 0.1% or less. Furthermore, the weight reduction percentage after heating for 200 hours at 220° C. in an air atmosphere is preferably 5% or less, more preferably 3% or less, even more preferably 1% or less, and still more preferably 0.1% or less. Furthermore, the weight reduction percentage after heating for 200 hours at 250° C. in an air atmosphere is preferably 5% or less, more preferably 3% or less, even more preferably 1% or less, and still more preferably 0.1% or less. An evaluation of these weight reduction percentages is carried out using a material in an unused state. An unused state refers to a state that can be used after molding, and is a state that has not been exposed to heat (for example, heat at a temperature of 40° C. or higher), chemicals, sunlight (ultraviolet radiation), or the like from the unused state. The weight reduction percentage is calculated by the following formula from the masses obtained before and after heating: weight reduction percentage (%)=[Mass (g) before heating−mass (g) after heating]/mass (g) before heating×100. It is also preferable that the strength after heating for 20,000 hours at 180° C. in an air atmosphere is a half or more of the strength before heating. It is more preferable that the strength after heating for 20,000 hours at 220° C. in an air atmosphere is a half or more of the strength before heating. Furthermore, it is preferable that the resin satisfies the area division H defined by the Japanese Industrial Standards (JIS). Particularly, it is preferable that the resin satisfies the heat resistance condition of enduring a maximum temperature of 180° C. More preferably, it is preferable that the resin satisfies the area division H defined by the Japanese National Railways Standards (JRE). Particularly, it is preferable that the resin satisfies the heat resistance condition of enduring a temperature increase of 180° C. with respect to the ambient temperature (standard: 25° C., maximum: 40° C.). Examples of a resin preferable for these conditions include a polysulfone, a polyether sulfone, polyphenylene sulfide, polyether ether ketone, an aromatic polyimide, an aromatic polyamide, an aromatic polyamideimide, polybenzoxazole, a fluororesin, a silicone resin, and a liquid crystal polymer. These resins have high intermolecular cohesive power, and therefore, the resins have high heat resistance, which is preferable. Among them, an aromatic polyimide and polybenzoxazole have higher heat resistance and are preferable, because the proportions occupied by rigid units in the molecule are high. Furthermore, it is preferable that the resin is a thermoplastic resin. The specifications about the weight reduction percentage upon heating, the specifications about strength, and the specifications about resin type as described above are respectively effective for increasing the heat resistance of the resin. Due to these, when a pressed powder material comprising a plurality of flaky magnetic metal particles and an intercalated phase (herein, a resin) is formed, the heat resistance of the pressed powder material is increased (thermal stability is increased), and mechanical characteristics such as strength and toughness after being exposed to a high temperature (for example, 200° C. or 250° C. described above) or while being under a high temperature (for example, 200° C. or 250° C. described above) are likely to be enhanced, which is preferable. Also, since a large amount of the intercalated phase exists so as to surround the periphery of the flaky magnetic metal particles even after heating, the pressed powder material has excellent oxidation resistance and does not easily undergo deterioration of the magnetic characteristics caused by oxidation of the flaky magnetic metal particles, which is preferable.

Furthermore, in regard to the pressed powder material, it is preferable that the weight reduction percentage after heating for 3,000 hours at 180° C. is 5% or less, more preferably 3% or less, even more preferably 1% or less, and still more preferably 0.1% or less. Furthermore, the pressed powder material is such that the weight reduction percentage after heating for 3,000 hours at 220° C. is preferably 5% or less, more preferably 3% or less, even more preferably 1% or less, and still more preferably 0.1% or less. Furthermore, the weight reduction percentage of the pressed powder material after heating for 200 hours at 250° C. in an air atmosphere is preferably 5% or less, more preferably 3% or less, even more preferably 1% or less, and still more preferably 0.1% or less. The evaluation of the weight reduction percentage is similar to the case of the resin as described above. Furthermore, preferably, it is preferable that the strength of the pressed powder material after heating for 20,000 hours at 180° C. in an air atmosphere is a half or more of the strength before heating. It is more preferable that the strength of the pressed powder material after heating for 20,000 hours at 220° C. in an air atmosphere is a half or more of the strength before heating. Furthermore, it is preferable that the pressed powder material satisfies the area division H defined by the Japanese Industrial Standards (JIS). Particularly, it is preferable that the pressed powder material satisfies the heat resistance condition of enduring a maximum temperature of 180° C. More preferably, it is preferable that the pressed powder material satisfies the area division H defined by the Japanese National Railways Standards (JRE). Particularly, it is preferable that the pressed powder material satisfies the heat resistance condition of enduring a temperature increase of 180° C. with respect to the ambient temperature (standard: 25° C., maximum: 40° C.). The specifications about the weight reduction percentage upon heating, the specifications about strength, and the specifications about resin type as described above are respectively effective for increasing the heat resistance of the pressed powder material, and a material having high reliability can be realized. Since the heat resistance of the pressed powder material is increased (thermal stability is increased), and mechanical characteristics such as strength and toughness after being exposed to a high temperature (for example, 200° C. or 250° C. described above) or while being under a high temperature (for example, 200° C. or 250° C. described above) are likely to be enhanced, which is preferable. Also, since a large amount of the intercalated phase exists so as to surround the periphery of the flaky magnetic metal particles even after heating, the pressed powder material has excellent oxidation resistance and does not easily undergo deterioration of the magnetic characteristics caused by oxidation of the flaky magnetic metal particles, which is preferable.

Furthermore, it is preferable that the pressed powder material includes a crystalline resin that does not have a glass transition point up to the thermal decomposition temperature. It is also preferable that the pressed powder material includes a resin having a glass transition temperature of 180° C. or higher, and it is more preferable that the pressed powder material includes a resin having a glass transition temperature of 220° C. or higher. It is even more preferable that the pressed powder material includes a resin having a glass transition temperature of 250° C. or higher. Generally, the flaky magnetic metal particles have a larger crystal grain size as the temperature of the heat treatment is higher. Therefore, in a case in which there is a need to make the crystal grain size of the flaky magnetic metal particles small, it is preferable that the glass transition temperature of the resin used is not too high, and specifically, it is preferable that the glass transition temperature is 600° C. or lower. Furthermore, it is preferable that the crystalline resin that does not have a glass transition point up to the thermal decomposition temperature includes a resin having a glass transition temperature of 180° C. or higher, and it is more preferable that the crystalline resin includes a resin having a glass transition temperature of 220° C. or higher. Specifically, it is preferable that the crystalline resin includes a polyimide having a glass transition temperature of 180° C. or higher, it is more preferable that the crystalline resin includes a polyimide having a glass transition temperature of 220° C. or higher, and it is even more preferable that the crystalline resin includes a thermoplastic polyimide. As a result, fusion of the resin to the magnetic metal particles is likely to occur, and the resin can be suitably used particularly for powder-compacting molding. The thermoplastic polyimide is preferably a polyimide having an imide bond in the polymer chain of a thermoplastic aromatic polyimide, a thermoplastic aromatic polyamideimide, a thermoplastic aromatic polyetherimide, a thermoplastic aromatic polyesterimide, a thermoplastic aromatic polyimidesiloxane, or the like. Among them, when the glass transition temperature is 250° C. or higher, superior heat resistance is obtained, and thus it is preferable.

An aromatic polyimide and polybenzoxazole exhibit high heat resistance since an aromatic ring and a heterocyclic ring are directly bonded to each other and adopt a planar structure, and those planar structures are immobilized by π-π stacking. Thereby, the glass transition temperature can be increased, and thermal stability can be enhanced. Furthermore, the glass transition temperature can be easily adjusted to a desired glass transition point by appropriately introducing a curved unit such as an ether bond into the molecular structure, and thus it is preferable. Above all, when the benzene ring structure of a unit derived from an acid anhydride that constitutes the imide polymer is any one of a biphenyl structure, a triphenyl structure, and a tetraphenyl structure, it is preferable from the viewpoint of strength. Since the symmetric structure between imide groups, which affects heat resistance, is not damaged, and the orientation property also extends over a long distance, the material strength is also increased. An aromatic polyimide structure preferable for this is represented by the following Chemical Formula (1). In other words, the polyimide resin of the present embodiment includes a repeating unit represented by the following Chemical Formula (1):

[Chemical Formula 1]

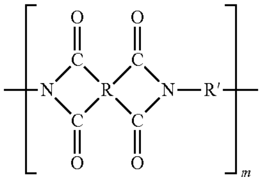

In Chemical Formula (1), R represents any one of a biphenyl structure, a triphenyl structure, and a tetraphenyl structure; and R' represents a structure having at least one or more aromatic rings in the structure.

When the characteristics (weight reduction percentage, resin type, glass transition temperature, molecular structure, and the like) of an intercalated phase (herein, a resin), which is a constituent component of the pressed powder material, are determined from the pressed powder material, only a portion of resin is cut out from the pressed powder material, and evaluation of various characteristics is carried out. In a case in which it cannot be determined by visual inspection whether the portion is formed from a resin or not, the resin and the magnetic metal particles are distinguished by using an elemental analysis based on EDX, or the like.

When the content of the resin contained in the pressed powder material as a whole is larger, the space between the polymer wetting (covering) a flaky magnetic metal particle and the polymer wetting (covering) an adjacent flaky magnetic metal particle can be filled with a polymer without difficulty, and thus mechanical characteristics such as strength are enhanced. Furthermore, the electrical resistivity is also increased, and the eddy current loss of the pressed powder material can be reduced, which is preferable. Meanwhile, as the content of the resin is larger, the proportion of the flaky magnetic metal particles is decreased. Therefore, the saturation magnetization of the pressed powder material decreases, and the magnetic permeability is also decreased, which is not preferable. In order to realize a well-balanced material in comprehensive consideration of mechanical characteristics such as strength, and characteristics such as electrical resistivity, eddy current loss, saturation magnetization, and magnetic permeability, it is preferable to adjust the content of the resin in the entire pressed powder material to 93 wt % or less, more preferably to 86 wt % or less, even more preferably to from 2 wt % to 67 wt %, and still more preferably to from 2 wt % to 43 wt %. Furthermore, the content of the flaky magnetic metal particles is preferably 7 wt % or more, more preferably 14 wt % or more, even more preferably from 33 wt % to 98 wt %, and still more preferably from 57 wt % to 98 wt %. The flaky magnetic metal particles are such that when the particle size decreases, the surface area increases, and the amount of the resin required is dramatically increased. Therefore, it is preferable that the flaky magnetic metal particles have appropriately large particle size. As a result, the pressed powder material can be subjected to high saturation magnetization, the magnetic permeability can be made high, and this is advantageous for miniaturization and power output increase of a system.

Next, the third "case in which the intercalated phase contains at least one magnetic metal selected from Fe, Co, and Ni and has magnetic properties" will be described. In this case, it is preferable because, as the intercalated phase has magnetic properties, the flaky magnetic metal particles can readily interact magnetically with neighboring particles, and the magnetic permeability is increased. Furthermore, since the magnetic domain structure is stabilized, the frequency characteristics of the magnetic permeability are also enhanced, which is preferable. Meanwhile, the term "magnetic properties" as used herein means ferromagnetism, ferrimagnetism, feeble magnetism, antiferromagnetism, or the like. Particularly, in the case of ferromagnetism and ferrimagnetism, the magnetic interaction is stronger, and it is preferable. In regard to the issue of whether the intercalated phase has magnetic properties, an evaluation can be made using a vibrating sample magnetometer (VSM) or the like. In regard to the fact that the intercalated phase contains at least one magnetic metal selected from Fe, Co and Ni and has magnetic properties, an investigation can be performed conveniently by using EDX or the like.

Thus, three conditions of the intercalated phase have been described, and it is preferable that at least one of these three conditions is satisfied; however, it is still acceptable that two or more, or all of the three conditions are satisfied. The "case in which the intercalated phase is an eutectic oxide" (first case) exhibits slightly inferior mechanical characteristics such as strength as compared to a case in which the intercalated phase is a resin (second case); however, on the other hand, the first case is highly excellent from the viewpoint that strain can be easily relieved, and particularly, lowering of coercivity can easily occur, which is preferable (as a result, low hysteresis loss and high magnetic permeability can be easily realized, which is preferable). Furthermore, eutectic oxides have higher heat resistance compared to resins in many cases, and eutectic oxides also have excellent thermal stability, which is preferable. In contrast, the "case in which the intercalated phase contains a resin" (second case) has a defect that since the adhesiveness between the flaky magnetic metal particles and the resin is high, stress is likely to be applied (strain is likely to enter), and as a result, coercivity tends to increase. However, since a resin is highly excellent, particularly in view of mechanical characteristics such as strength, a resin is preferable. The "case in which the intercalated phase contains at least one magnetic metal selected from Fe, Co, and Ni and has magnetic properties" (third case) is preferable because the flaky magnetic metal particles can easily interact magnetically with neighboring particles, and particularly because the intercalated phase becomes highly excellent in view of high magnetic permeability and low coercivity (therefore, low hysteresis loss). An intercalated phase that achieves a good balance can be produced by using the three conditions appropriately, or by combining some of the three conditions, based on the above-described advantages and disadvantages.

In regard to the flaky magnetic metal particles included in the pressed powder material, it is desirable that the particles satisfy the requirements described in the first and second embodiments. Here, description of overlapping matters will not be repeated.

In regard to the pressed powder material, it is preferable that the flat surfaces of the flaky magnetic metal particles described above are oriented in a layered form so as to be parallel to each other. The eddy current loss of the pressed powder material can be reduced thereby, and thus, it is preferable. Furthermore, since the diamagnetic field can be made small, the magnetic permeability of the pressed powder material can be made high, which is preferable. Also, since the ferromagnetic resonance frequency can be made high, the ferromagnetic resonance loss can be made small, which is preferable. Such a laminated structure is preferable because the magnetic domain structure is stabilized, and low magnetic loss can be realized. Here, as the angle formed by a plane parallel to the flat surface of a flaky magnetic metal particle and a plane of the pressed powder material is closer to 0°, it is defined that the flaky magnetic metal particles are oriented. Specifically, the aforementioned angle is determined for a large number of flaky magnetic metal particles 10, that is, ten or more particles, and it is desirable that the average value is preferably from 0° to 45°, more preferably from 0° to 30°, and even more preferably from 0° to 10°.

The pressed powder material may have a laminated type structure composed of a magnetic layer containing the flaky magnetic metal particles, and an intermediate layer containing any of O, C, and N. In regard to the magnetic layer, it is preferable that the flaky magnetic metal particles are oriented (oriented such that the flat surfaces are parallel to one another). Furthermore, it is preferable that the magnetic permeability of the intermediate layer is made smaller than the magnetic permeability of the magnetic layer. Through these countermeasures, a pseudo thin film laminated structure can be realized, and the magnetic permeability in the layer direction can be made high, which is preferable. In regard to such a structure, since the ferromagnetic resonance frequency can be made high, the ferromagnetic resonance loss can be made small, which is preferable. Furthermore, such a laminated structure is preferable because the magnetic domain structure is stabilized, and low magnetic loss can be realized. In order to further enhance these effects, it is more preferable to make the magnetic permeability of the intermediate layer smaller than the magnetic permeability of the intercalated phase (intercalated phase within the magnetic layer). Thereby, the magnetic permeability in the layer direction can be made even higher in a pseudo thin film laminated structure, and therefore, it is preferable. Also, since the ferromagnetic resonance frequency can be made even higher, the ferromagnetic resonance loss can be made small, which is preferable.

Thus, according to the present embodiment, a pressed powder material having excellent magnetic characteristics such as low magnetic loss can be provided.

Fourth Embodiment

Figure 11:
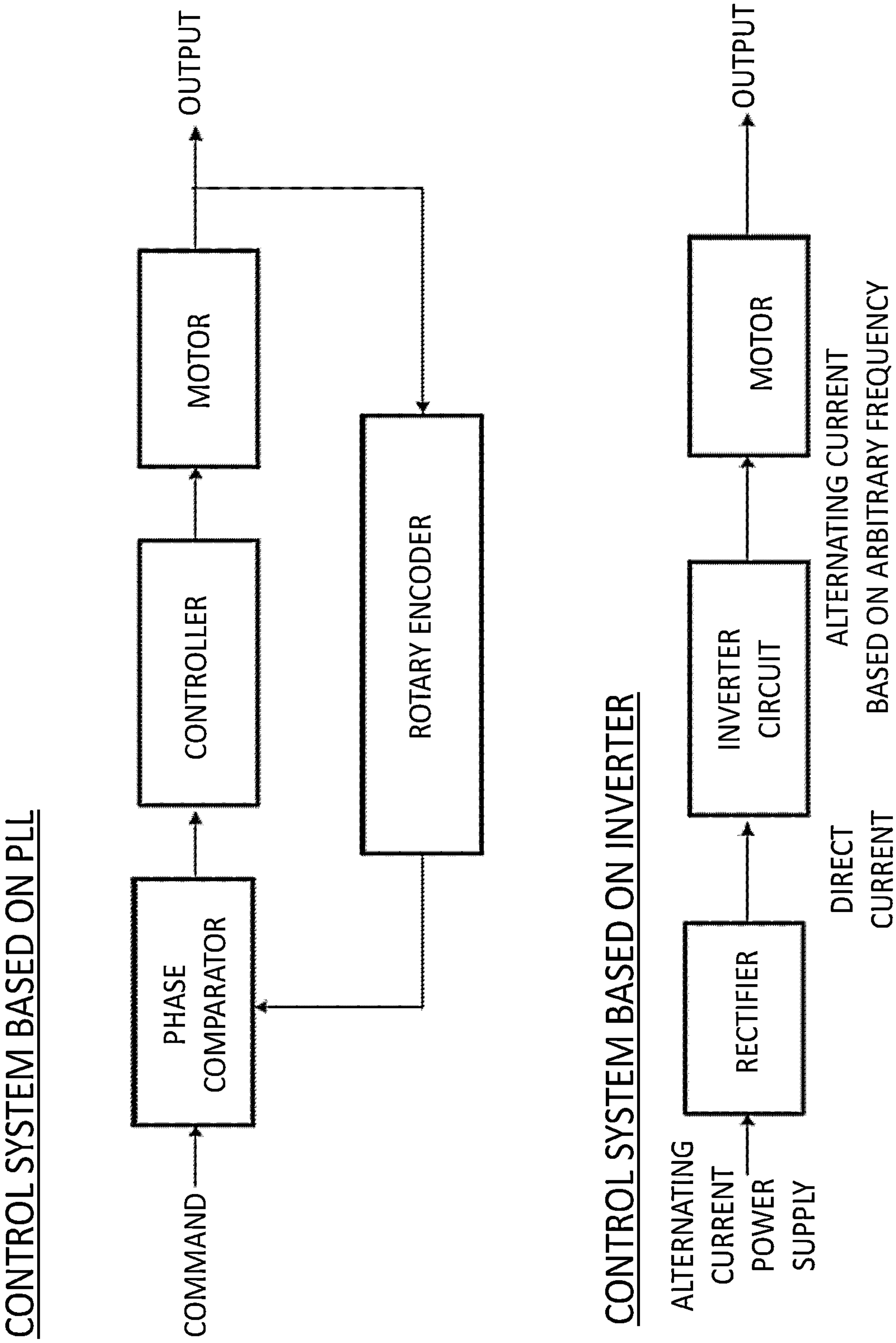
FIG. 11 is a conceptual diagram of a motor system according to a fourth embodiment.

The system and the device apparatus of the present embodiment have the pressed powder material of the third embodiment. Therefore, any matters overlapping with the contents of the first to third embodiments will not be described repeatedly. Examples of the component parts of the pressed powder material included in these system and device apparatus include cores for rotating electric machines such as various motors and generators (for example, motors and generators), potential transformers, inductors, transformers, choke coils, and filters; and magnetic wedges for a rotating electric machine. FIG. 11 is a conceptual diagram of a motor system according to the fourth embodiment. A motor system is an example of the rotating electric machine system. A motor system is one system including a control system for controlling the rotational frequency or the electric power (output power) of a motor. Regarding the mode for controlling the rotational frequency of a motor, there are control methods that are based on control by a bridge servo circuit, proportional current control, voltage comparison control, frequency synchronization control, and phase locked loop (PLL) control. As an example, a control method based on PLL is illustrated in FIG. 11. A motor system that controls the rotational frequency of a motor based on PLL comprises a motor; a rotary encoder that converts the amount of mechanical displacement of the rotation of the motor into electrical signals and detects the rotational frequency of the motor; a phase comparator that compares the rotational frequency of the motor given by a certain command, with the rotational frequency of the motor detected by the rotary encoder, and outputs the difference of those rotational frequencies; and a controller that controls the motor so as to make the difference of the rotational frequencies small. On the other hand, examples of the method for controlling the electric power of the motor include control methods that are based on pulse width modulation (PWM) control, pulse amplitude modulation (PAM) control, vector control, pulse control, bipolar drive, pedestal control, and resistance control. Other examples of the control method include control methods based on microstep drive control, multiphase drive control, inverter control, and switching control. As an example, a control method using an inverter is illustrated in FIG. 11. A motor system that controls the electric power of the motor using an inverter comprises an alternating current power supply; a rectifier that converts the output of the alternating current power supply to a direct current; an inverter circuit that converts the direct current to an alternating current based on an arbitrary frequency; and a motor that is controlled by this alternating current.

Figure 12:
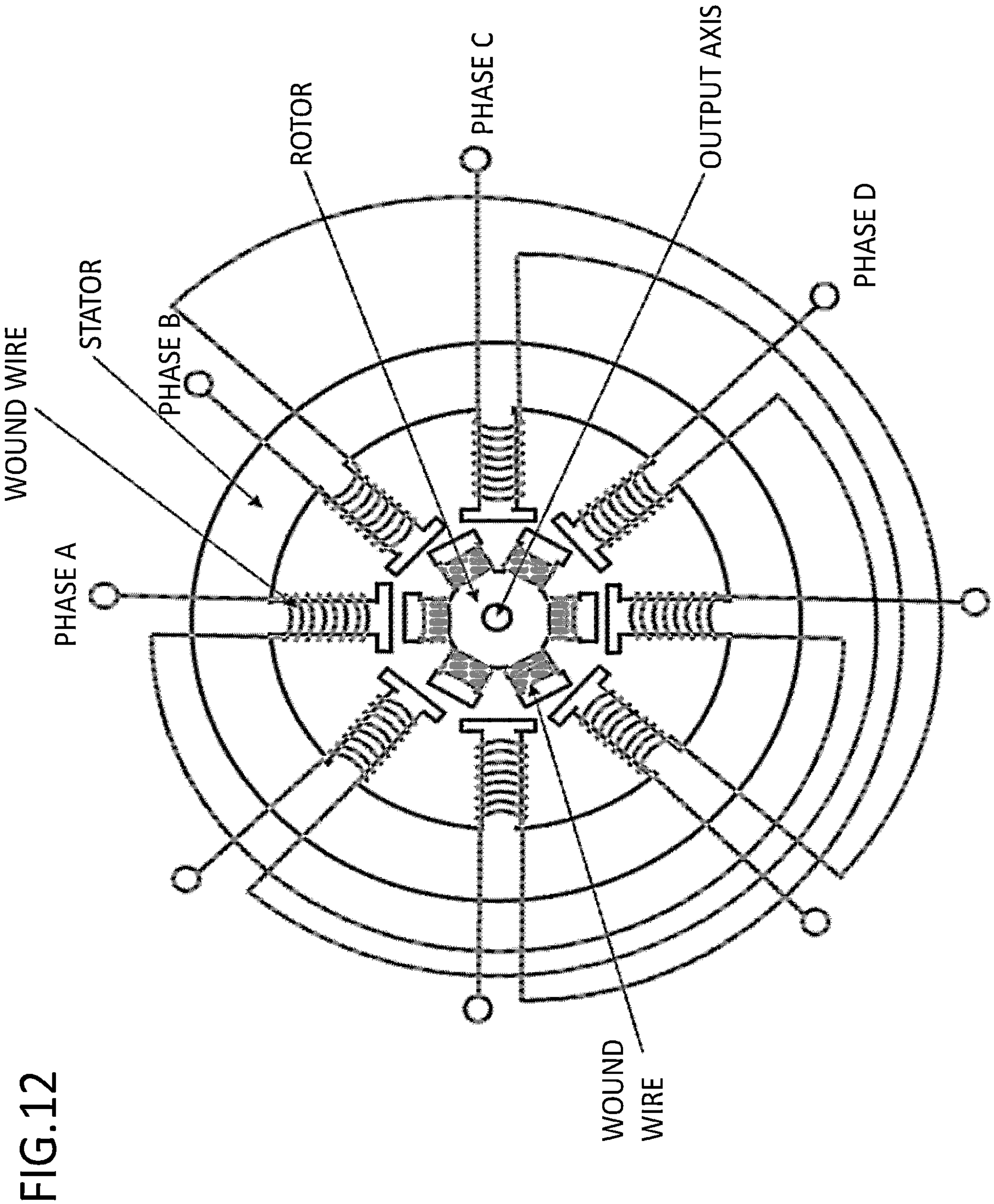
FIG. 12 is a conceptual diagram of a motor according to the fourth embodiment.

FIG. 12 shows a conceptual diagram of a motor according to the fourth embodiment. A motor 200 is an example of the rotating electric machine. In the motor 200, a first stator (magneto stator) and a second rotor (rotator) are disposed. The diagram illustrates an inner rotor type motor in which a rotor is disposed on the inner side of a stator; however, an outer rotor type in which the rotor is disposed on the outer side of the stator may also be used.

Figure 13:
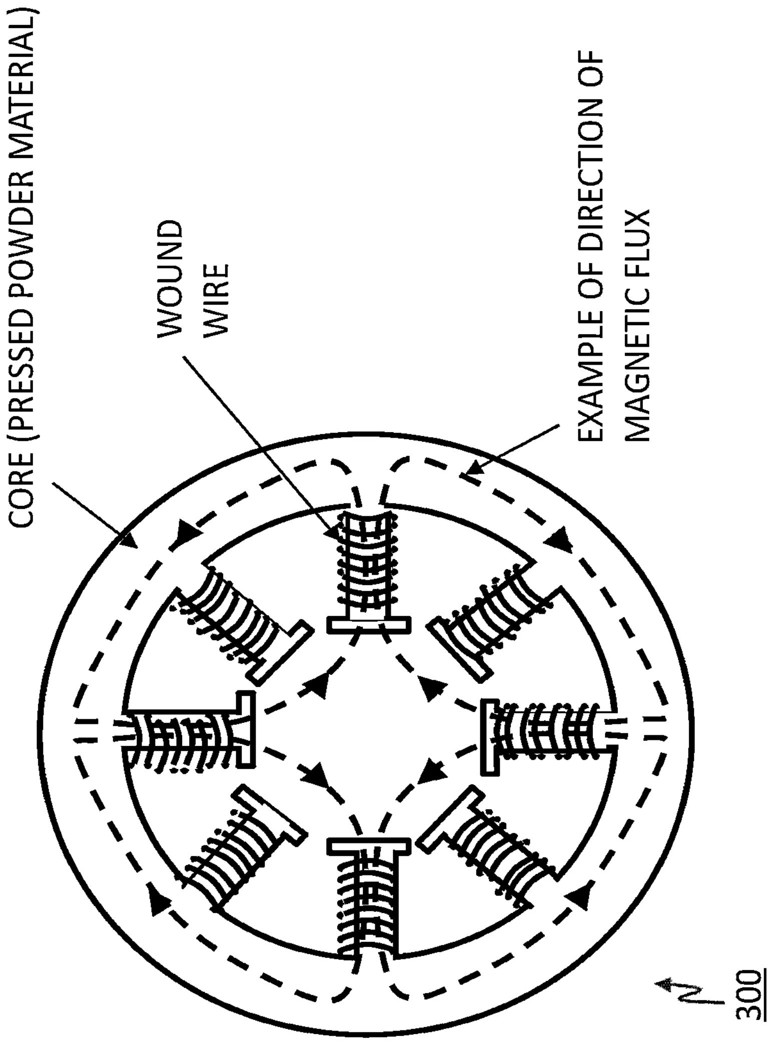
FIG. 13 is a conceptual diagram of a motor core (stator) according to the fourth embodiment.
Figure 14:
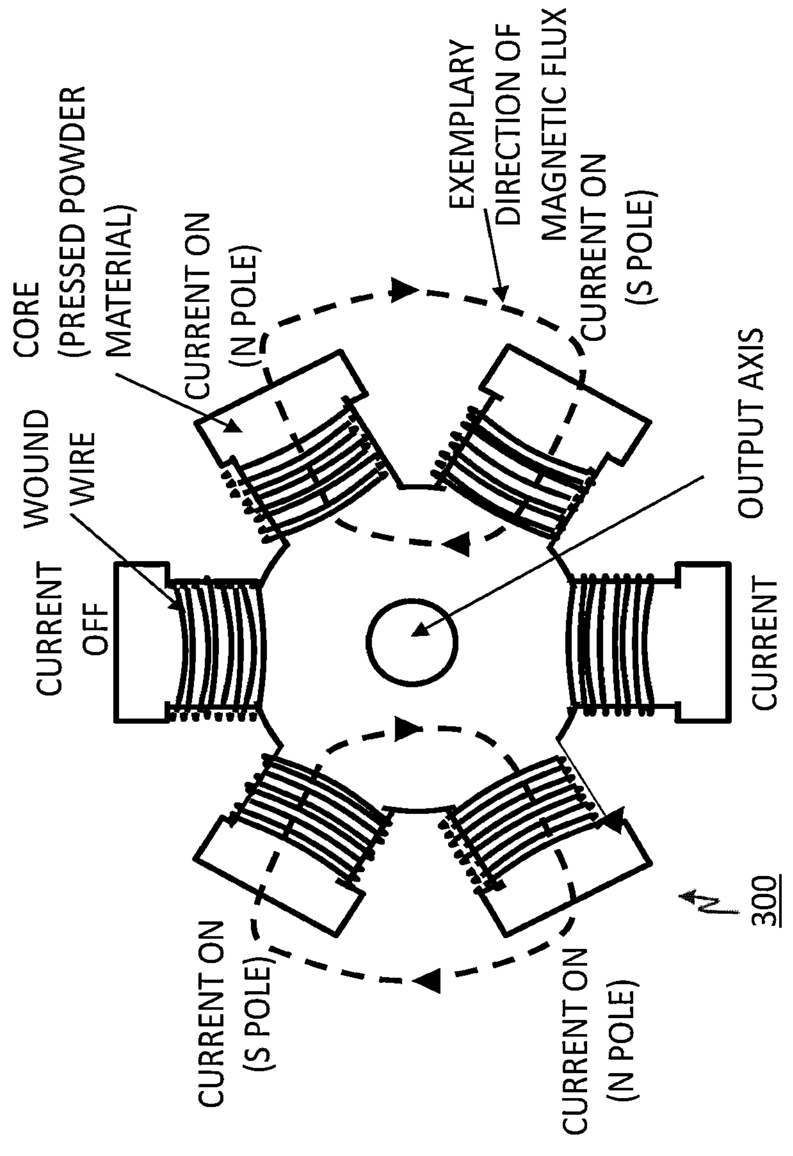
FIG. 14 is a conceptual diagram of a motor core (rotor) according to the fourth embodiment.

FIG. 13 shows a conceptual diagram of a motor core (stator) according to the fourth embodiment. FIG. 14 is a conceptual diagram of a motor core (rotor) according to the fourth embodiment. Regarding the motor core 300 (core of a motor), the cores of a stator and a rotor correspond to the motor core. This will be described below. FIG. 13 is an exemplary conceptual cross-sectional diagram of a first stator. The first stator has a core and coils. The coils are wound around some of the protrusions of the core, which are provided on the inner side of the core. In this core, the pressed powder material of the third embodiment can be disposed. FIG. 14 is an exemplary conceptual cross-sectional diagram of the first rotor. The first rotor has a core and coils. The coils are wound around some of the protrusions of the core, which are provided on the outer side of the core. In this core, the pressed powder material of the third embodiment can be disposed.

FIG. 13 and FIG. 14 are intended only for illustrative purposes to describe examples of motors, and the applications of the pressed powder material are not limited to these. The pressed powder material can be applied to all kinds of motors as cores for making it easy to lead the magnetic flux.

Figure 15:
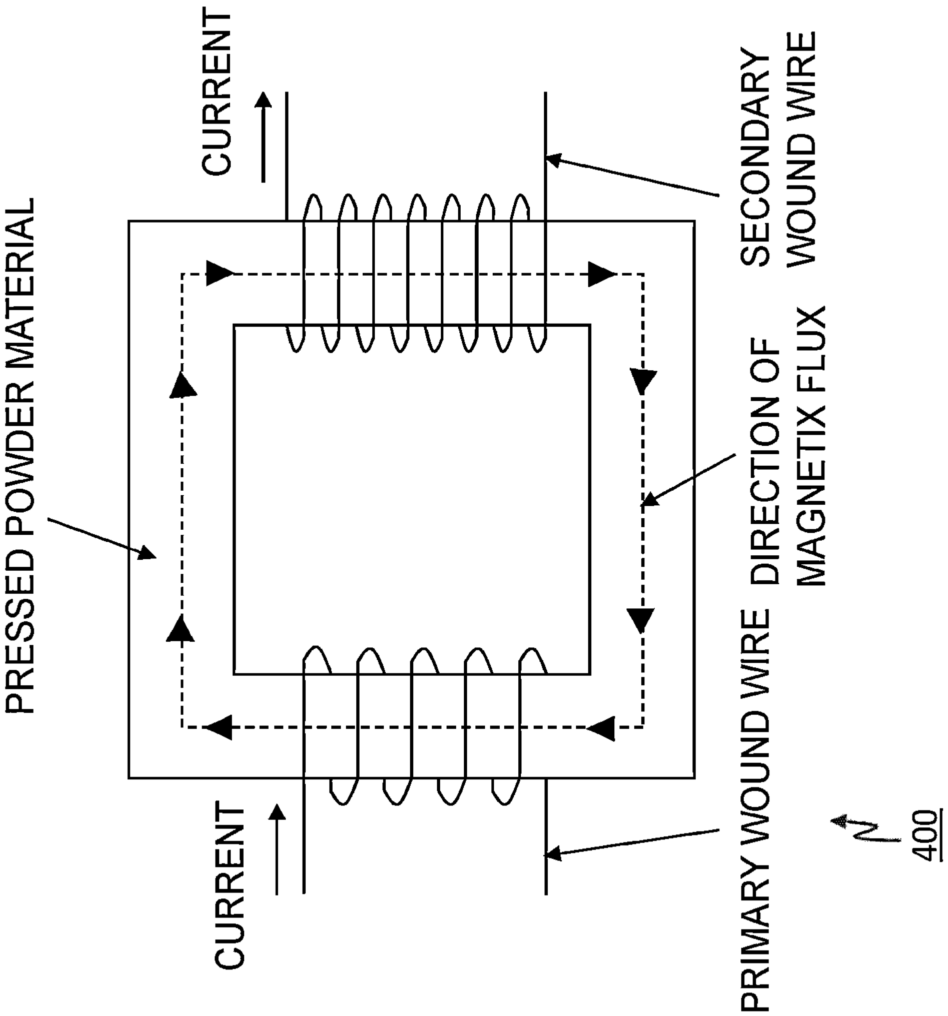
FIG. 15 is a conceptual diagram of a potential transformer according to the fourth embodiment.
Figure 16:
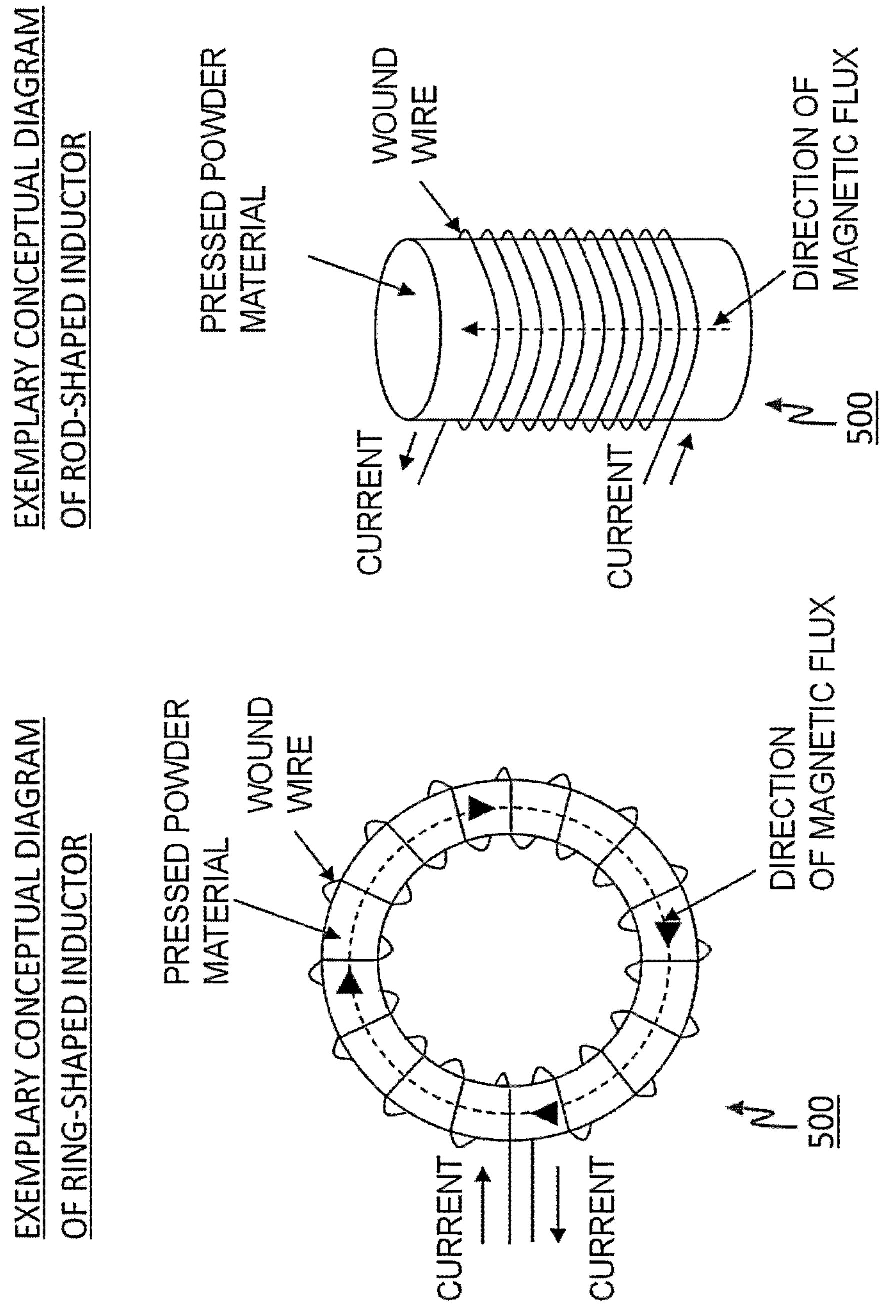
FIG. 16 is a conceptual diagram of inductors (ring-shaped inductor and rod-shaped inductor) according to the fourth embodiment.
Figure 17:
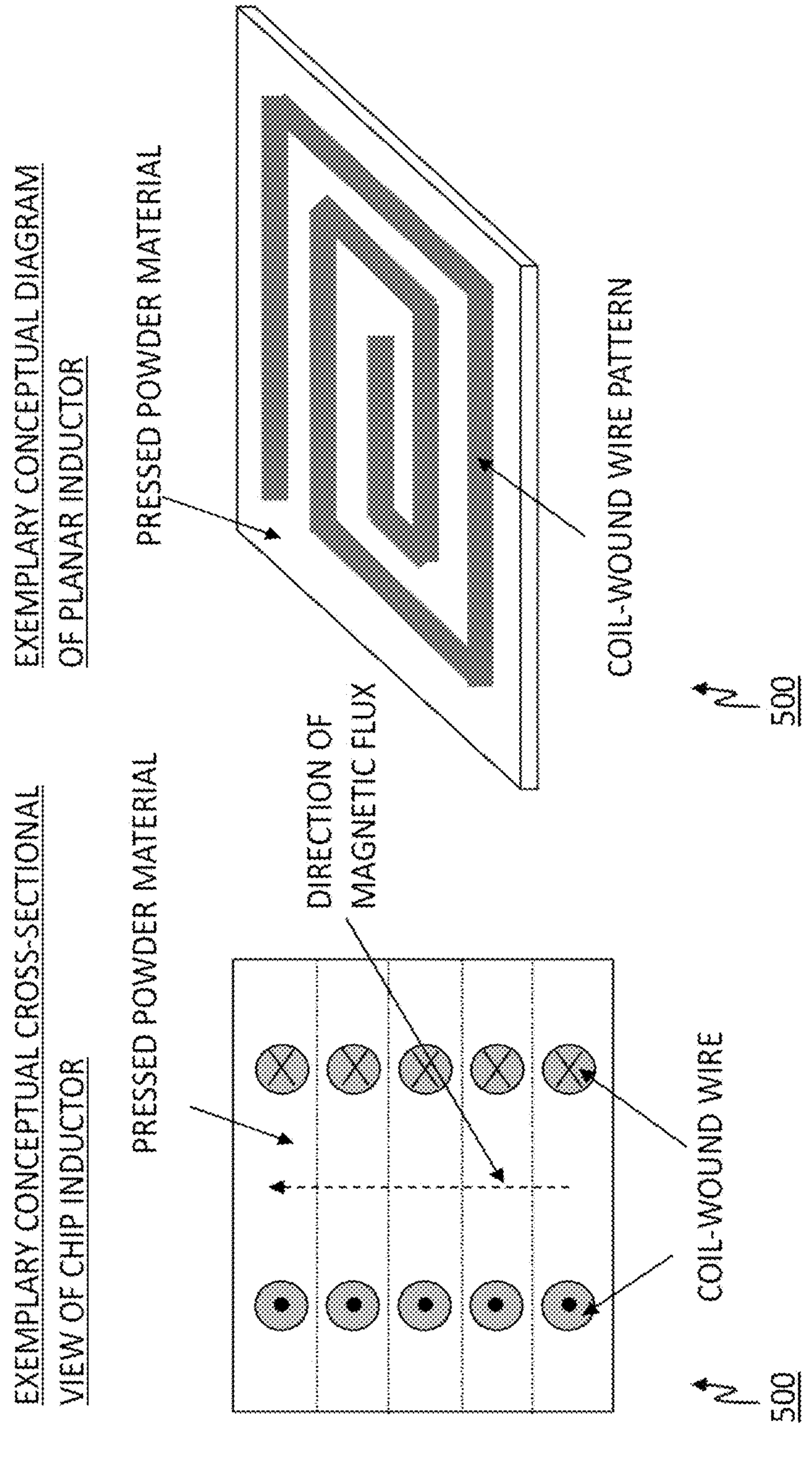
FIG. 17 is a conceptual diagram of inductors (chip inductor and planar inductor) according to the fourth embodiment.

Furthermore, FIG. 15 is a conceptual diagram of a potential transformer according to the fourth embodiment. FIG. 16 is a conceptual diagram of inductors (ring-shaped inductor and rod-shaped inductor) according to the fourth embodiment. FIG. 17 is a conceptual diagram of inductors (chip inductor and planar inductor) according to the fourth embodiment. These diagrams are also intended only for illustrative purposes. Also for the potential transformer 400 and the inductor 500, similarly to the motor core, the pressed powder materials can be applied to all kinds of potential transformers and inductors in order to make it easy to lead the magnetic flux, or to utilize high magnetic permeability.

Figure 18:
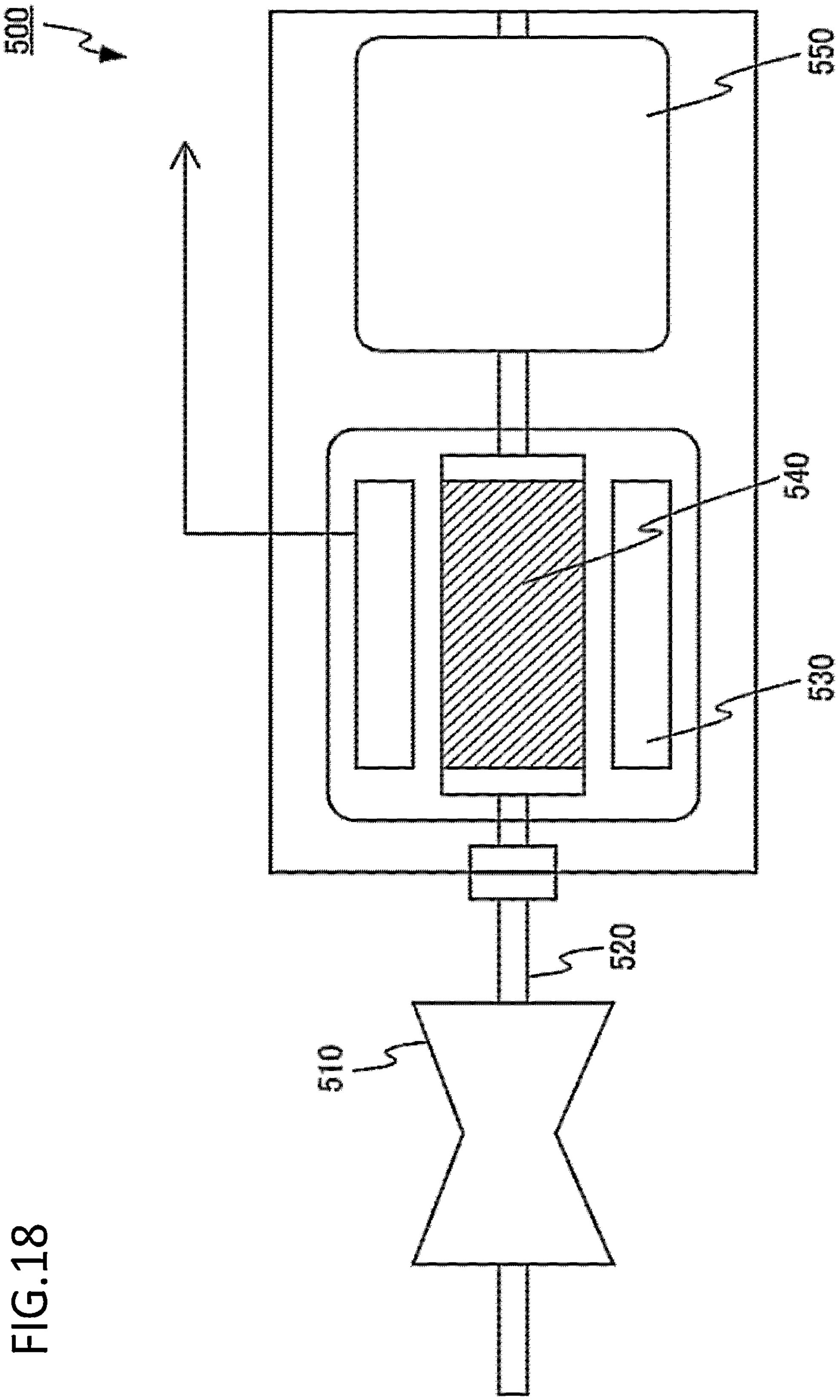
FIG. 18 is a conceptual diagram of a generator according to the fourth embodiment.

FIG. 18 is a conceptual diagram of a generator 500 according to the fourth embodiment. The generator 500 is an example of the rotating electric machine. The generator 500 comprises either or both of a second stator (magneto stator) 530 that uses the pressed powder material of the first, second, or third embodiment as the core; and a second rotor (rotator) 540 that uses the pressed powder material of the first, second, or third embodiment as the core. In the diagram, the second rotor (rotator) 540 is disposed on the inner side of the second stator 530; however, the second rotor may also be disposed on the outer side of the second stator. The second rotor 540 is connected to a turbine 510 provided at an end of the generator 500 through a shaft 520. The turbine 510 is rotated by, for example, a fluid supplied from the outside, which is not shown in the diagram. Meanwhile, instead of the turbine that is rotated by a fluid, the shaft can also be rotated by transferring dynamic rotation of the regenerative energy of an automobile or the like. Various known configurations can be employed for the second stator 530 and the second rotor 540.

The shaft is in contact with a commutator (not shown in the diagram) that is disposed on the opposite side of the turbine with respect to the second rotor. The electromotive force generated by rotation of the second rotor is transmitted, as the electric power of the generator, after undergoing a voltage increase to the system voltage by means of an isolated phase bus that is not shown in the diagram, and a main transformer that is not shown in the diagram. Meanwhile, in the second rotor, an electrostatic charge is generated due to an axial current resulting from the static electricity from the turbine or from power generation. Therefore, the generator comprises a brush intended for discharging the electrostatic charge of the second rotor.

The rotating electric machine of the present embodiment can be preferably used in railway vehicles. For example, the rotating electric machine can be preferably used in the motor 200 that drives a railway vehicle, or the generator 500 that generates electricity for driving a railway vehicle.

Figure 19:
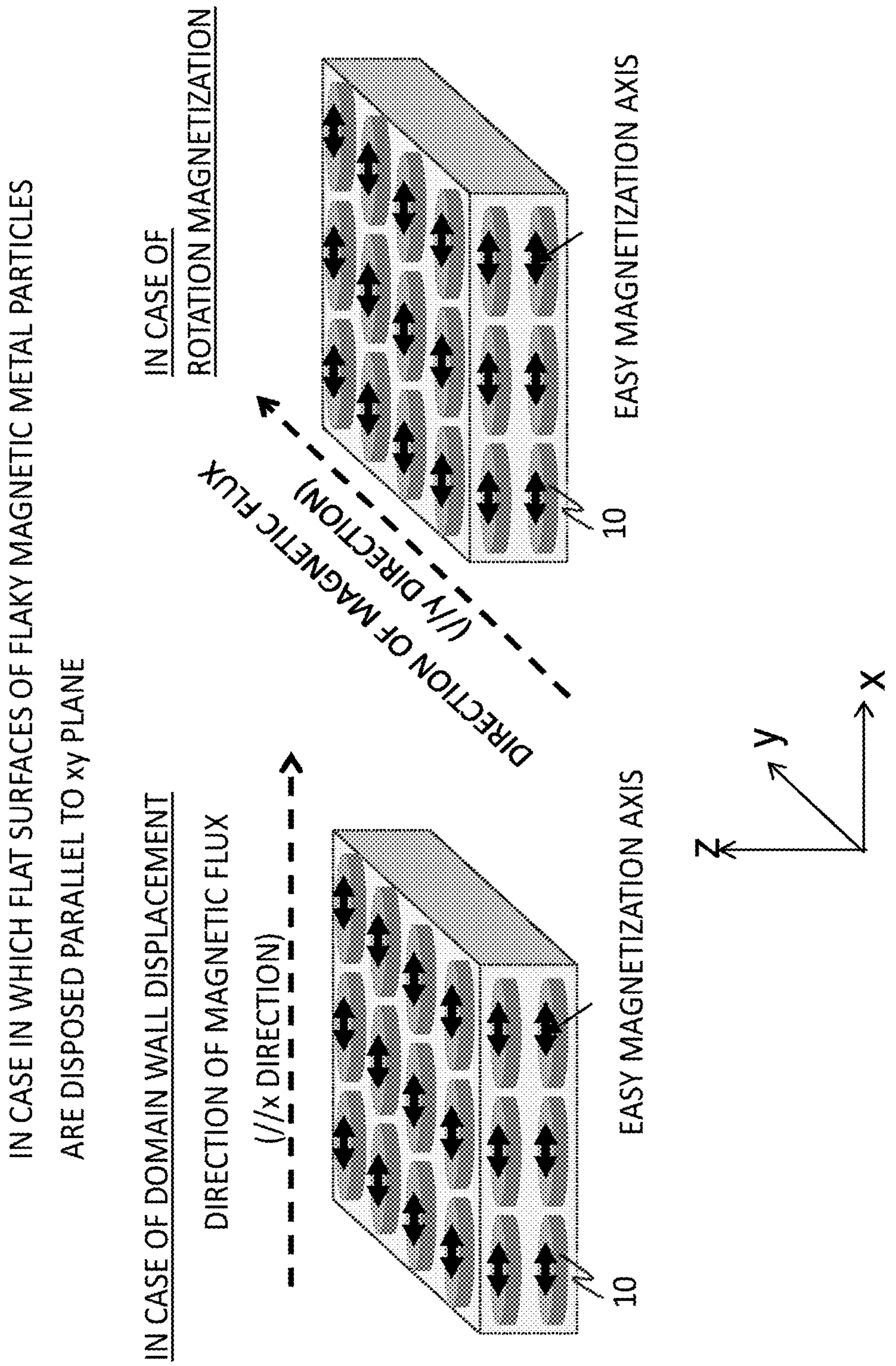
FIG. 19 is a conceptual diagram illustrating the relation between the direction of the magnetic flux and the direction of arrangement of the pressed powder material.

Furthermore, FIG. 19 is a conceptual diagram showing the relation between the direction of the magnetic flux and the direction of disposition of a pressed powder material. First, for both of the domain wall displacement type and the rotation magnetization type, it is preferable that the flat surfaces of the flaky magnetic metal particles included in a pressed powder material are disposed in a direction in which the flat surfaces are parallel to one another as far as possible are aligned in a layered form, with respect to the direction of the magnetic flux. This is because the eddy current loss can be reduced by making the cross-sectional area of the flaky magnetic metal particles that penetrate through the magnetic flux, as small as possible. Furthermore, in regard to the domain wall displacement type, it is preferable that the easy magnetization axis (direction of the arrow) in the flat surface of a flaky magnetic metal particle is disposed parallel to the direction of the magnetic flux. Thereby, the system can be used in a direction in which coercivity is further decreased, and therefore, the hysteresis loss can be reduced, which is preferable. Furthermore, the magnetic permeability is also made high, and it is preferable. In contrast, in regard to the rotation magnetization type, it is preferable that the easy magnetization axis (direction of the arrow) in the flat surface of a flaky magnetic metal particle is disposed perpendicularly to the direction of the magnetic flux. Thereby, the system can be used in a direction in which coercivity is further decreased, and therefore, the hysteresis loss can be reduced, which is preferable. That is, it is preferable to understand the magnetization characteristics of a pressed powder material, determine whether the pressed powder material is of the domain wall displacement type or the rotation magnetization type (method for determination is as described above), and then dispose the pressed powder material as shown in FIG. 13. In a case in which the direction of the magnetic flux is complicated, it may be difficult to dispose the pressed powder material perfectly as shown in FIG. 13; however, it is preferable to dispose the pressed powder material as shown in FIG. 13 as far as possible. It is desirable that the method for disposition described above is applied to all of the systems and device apparatuses of the present embodiment (for example, cores for rotating electric machines such as various motors and generators (for example, motors and generators), potential transformers, inductors, transformers, choke coils, and filters; and magnetic wedges for a rotating electric machine).

In order for a pressed powder material to be applied to these systems and device apparatuses, the pressed powder material is allowed to be subjected to various kinds of processing. For example, in the case of a sintered body, the pressed powder material is subjected to mechanical processing such as polishing or cutting; and in the case of a powder, the pressed powder material is mixed with a resin such as an epoxy resin or polybutadiene. If necessary, the pressed powder material is further subjected to a surface treatment. Also, if necessary, a coil treatment is carried out.

When the system and device apparatus of the present embodiment are used, a motor system, a motor, a potential transformer, a transformer, an inductor, and a generator, all having excellent characteristics (high efficiency and low losses), can be realized.

EXAMPLES

Hereinafter, the invention will be described in more detail by comparing Examples 1 to 20 with Comparative Examples 1 to 13. For the flaky magnetic metal particles obtainable by Examples and Comparative Examples described below, a summary of the average thickness t of the flaky magnetic metal particles, the average value A of the ratio of the average length in the flat surface to a thickness in each of the flaky magnetic metal particles, the proportion (%) of the difference in coercivity within the flat surface of the flaky magnetic metal particles, and the proportion (%) of the difference in coercivity within a plane of the pressed powder material is presented in Table 1.

Example 1

First, a ribbon of Fe—Co—Si (Co/(Fe+Co)=10 at %, Si/(Fe+Co+Si)=12 at %) is produced using a single roll quenching apparatus. Next, the ribbon thus obtained is subjected to a heat treatment at 300° C. in a $H_2$ atmosphere. Next, this ribbon is pulverized using a mixer apparatus and is subjected to a heat treatment in a magnetic field at 1,000° C. in a $H_2$ atmosphere, and thus flaky magnetic metal particles are obtained. The average thickness t of the flaky magnetic metal particles thus obtained is 10 μm, the average value A of the ratio of the average length in the flat surface with respect to a thickness in each of the flaky magnetic metal particles is 20, and the flat surface has a rectangular contour shape in which the average value of the ratio a/b of the maximum length to the minimum length is 1.6. Furthermore, the crystal grain size of the magnetic metal phase is about 50 μm. The flaky magnetic metal particles thus obtained are mixed with an inorganic oxide intercalated phase ($B_2O_3$—$Bi_2O_3$—ZnO), the mixture is subjected to molding in a magnetic field (the flaky particles are oriented), and the mixture is subjected to a heat treatment in a magnetic field. Thus, a pressed powder material is obtained. In the heat treatment in a magnetic field, a magnetic field is applied in the direction of the easy magnetization axis, and a heat treatment is carried out.

Example 2

A pressed powder material is obtained in almost the same manner as in Example 1, except that the composition is changed to Fe—Co—Si (Co/(Fe+Co)=80 at %), Si/(Fe+Co+Si)=12 at %).

Example 3

A pressed powder material is obtained in almost the same manner as in Example 1, except that the composition is changed to Fe—Co—Si(Co/(Fe+Co)=0.001 at %), Si/(Fe+Co+Si)=12 at %).

Example 4

A pressed powder material is obtained in almost the same manner as in Example 1, except that the composition is changed to Fe—Co—Si(Co/(Fe+Co)=10 at %), Si/(Fe+Co+Si)=30 at %).

Example 5

A pressed powder material is obtained in almost the same manner as in Example 1, except that the composition is changed to Fe—Co—Si (Co/(Fe+Co)=10 at %), Si/(Fe+Co+Si)=0.001 at %).

Example 6

In regard to Example 1, the ribbon pieces are collected and subjected to pulverization and rolling at about 1,000 rpm in an Ar atmosphere by means of beads mill using $ZrO_2$ balls and a $ZrO_2$ vessel. Thus, the ribbon pieces are converted to a flaky powder. Operations of pulverization, rolling, and heat treatment are repeated, and thereby a treatment is carried out so as to obtain a predetermined size and a predetermined structure. The procedure except for those is almost the same as the procedure of Example 1. The average thickness of the flaky magnetic metal particles thus obtained is 10 nm, and the average value of the ratio of the average length in the flat surface with respect to a thickness in each of the flaky magnetic metal particles is 200.

Example 7

A pressed powder material is obtained in almost the same manner as in Example 6, except that the average thickness of the flaky magnetic metal particles is adjusted to 1 μm, and the average value of the ratio of the average length in the flat surface with respect to a thickness in each of the flaky magnetic metal particles is adjusted to 100.

Example 8

A pressed powder material is obtained in almost the same manner as in Example 6, except that the average thickness of the flaky magnetic metal particles is adjusted to 100 μm, and the average value of the ratio of the average length in the flat surface with respect to a thickness in each of the flaky magnetic metal particles is adjusted to 5.

Example 9

A pressed powder material is obtained in almost the same manner as in Example 6, except that the average thickness of the flaky magnetic metal particles is adjusted to 10 nm, and the average value of the ratio of the average length in the flat surface with respect to a thickness in each of the flaky magnetic metal particles is adjusted to 1,000.

Example 10

A pressed powder material is obtained in almost the same manner as in Example 6, except that the average thickness of the flaky magnetic metal particles is adjusted to 10 nm, and the average value of the ratio of the average length in the flat surface with respect to a thickness in each of the flaky magnetic metal particles is adjusted to 10,000.

Example 11

A pressed powder material is obtained in almost the same manner as in Example 1, except that flaky magnetic metal particles obtained by controlling the quenching conditions at the time of ribbon synthesis, subjecting the ribbon thus obtained to a heat treatment at 300° C. in a $H_2$ atmosphere, subsequently pulverizing the heat-treated ribbon using a mixer apparatus, and subjecting the pulverization product to a heat treatment in a magnetic field at 940° C. for 4 hours in a $H_2$ atmosphere, are subjected to approximate (110) orientation. All crystal planes except the (110) plane have a peak intensity ratio of 3% or less with respect to the (110) plane.

Example 12

A pressed powder material is obtained in almost the same manner as in Example 1, except that the composition is changed to Fe—Co—B—Hf (Co/(Fe+Co)=30 at %, (B+Hf)/(Fe+Co+B+Hf)=10 at %, Hf/(Fe+Co+B+Hf)=6 at %), and the temperature of the heat treatment in a magnetic field is changed to 500° C. The crystal grain size of the magnetic metal phase is about 15 nm.

Example 13

A pressed powder material is obtained in almost the same manner as in Example 12, except that the composition is changed to Fe—Co—B—Hf (Co/(Fe+Co)=30 at %, (B+Hf)/(Fe+Co+B+Hf)=80 at %, Hf/(Fe+Co+B+Hf)=6 at %). The crystal grain size of the magnetic metal phase is about 15 nm.

Example 14

A pressed powder material is obtained in almost the same manner as in Example 12, except that the composition is changed to Fe—Co—B—Hf (Co/(Fe+Co)=30 at %, (B+Hf)/(Fe+Co+B+Hf)=0.002 at %, Hf/(Fe+Co+B+Hf)=0.001 at %). The crystal grain size of the magnetic metal phase is about 1 μm.

Example 15

A pressed powder material is obtained in almost the same manner as in Example 12, except that the composition is changed to Fe—Co—B—Hf (Co/(Fe+Co)=30 at %, (B+Hf)/(Fe+Co+B+Hf)=80 at %, Hf/(Fe+Co+B+Hf)=40 at %). The crystal grain size of the magnetic metal phase is about 15 nm.

Example 16

A pressed powder material is obtained in almost the same manner as in Example 12, except that the composition is changed to Fe—Co—B—Hf—Y (Co/(Fe+Co)=30 at %, (B+Hf+Y)/(Fe+Co+B+Hf+Y)=10 at %, Y/(Hf+Y)=1 at %, (Hf+Y)/(Fe+Co+B+Hf+Y)=6 at %). The crystal grain size of the magnetic metal phase is about 12 nm.

Example 17

A pressed powder material is obtained in almost the same manner as in Example 12, except that the composition is changed to Fe—Co—B—Hf—Y (Co/(Fe+Co)=30 at %, (B+Hf+Y)/(Fe+Co+B+Hf+Y)=10 at %, Y/(Hf+Y)=20 at %, (Hf+Y)/(Fe+Co+B+Hf+Y)=6 at %). The crystal grain size of the magnetic metal phase is about 12 nm.

Example 18

A pressed powder material is obtained in almost the same manner as in Example 12, except that the composition is changed to Fe—Co—B—Hf—Y (Co/(Fe+Co)=30 at %, (B+Hf+Y)/(Fe+Co+B+Hf+Y)=10 at %, Y/(Hf+Y)=80 at %, (Hf+Y)/(Fe+Co+B+Hf+Y)=6 at %). The crystal grain size of the magnetic metal phase is about 12 nm.

Example 19

A pressed powder material is obtained in almost the same manner as in Example 12, except that the composition is changed to Fe—Co—B—Hf—Y (Co/(Fe+Co)=30 at %, (B+Hf+Y)/(Fe+Co+B+Hf+Y)=60 at %, Y/(Hf+Y)=50 at %, (Hf+Y)/(Fe+Co+B+Hf+Y)=0.002 at %). The crystal grain size of the magnetic metal phase is about 11 nm.

Example 20

A pressed powder material is obtained in almost the same manner as in Example 12, except that the composition is changed to Fe—Co—B—Hf—Y (Co/(Fe+Co)=30 at %, (B+Hf+Y)/(Fe+Co+B+Hf+Y)=60 at %, Y/(Hf+Y)=50 at %, (Hf+Y)/(Fe+Co+B+Hf+Y)=40 at %). The crystal grain size of the magnetic metal phase is about 11 nm.

Comparative Example 1

Commercially available Fe—Si—Cr—Ni flaky particles are used. The thickness of the flaky magnetic metal particles is about 400 nm, and the aspect ratio is about 100. A pressed powder material is obtained by mixing the flaky magnetic metal particles with an intercalated phase and molding the mixture (molding in a magnetic field and a heat treatment in a magnetic field are not carried out).

Comparative Example 2

A pressed powder material is obtained in almost the same manner as in Example 1, except that the composition is changed to Fe—Si (amount of Co=0 at %, Si/(Fe+Si)=12 at %).

Comparative Example 3

A pressed powder material is obtained in almost the same manner as in Example 1, except that the composition is changed to Fe—Co—Si (Co/(Fe+Co)=90 at %, Si/(Fe+Co+Si)=12 at %).

Comparative Example 4

A pressed powder material is obtained in almost the same manner as in Example 1, except that the composition is changed to Fe—Co (Co/(Fe+Co)=10 at %, amount of Si=0 at %).

Comparative Example 5

A pressed powder material is obtained in almost the same manner as in Example 1, except that the composition is changed to Fe—Co—Si (Co/(Fe+Co)=10 at %, Si/(Fe+Co+Si)=40 at %).

Comparative Example 6

A pressed powder material is obtained in almost the same manner as in Example 12, except that the composition is changed to Fe—Co—B—Hf (Co/(Fe+Co)=30 at %, (B+Hf)/(Fe+Co+B+Hf)=90 at %, Hf/(Fe+Co+B+Hf)=6 at %). The crystal grain size of the magnetic metal phase is about 20 nm.

Comparative Example 7

A pressed powder material is obtained in almost the same manner as in Example 12, except that the composition is changed to Fe—Co (Co/(Fe+Co)=30 at %, amount of B=0 at %, amount of Hf=0 at %). The crystal grain size of the magnetic metal phase is about 2 μm.

Comparative Example 8

A pressed powder material is obtained in almost the same manner as in Example 12, except that the composition is changed to Fe—Co—B (Co/(Fe+Co)=30 at %, B/(Fe+Co+B)=10 at %, amount of Hf=0 at %). The crystal grain size of the magnetic metal phase is about 20 nm.

Comparative Example 9

A pressed powder material is obtained in almost the same manner as in Example 12, except that the composition is changed to Fe—Co—B—Hf (Co/(Fe+Co)=30 at %, (B+Hf)/(Fe+Co+B+Hf)=80 at %, Hf/(Fe+Co+B+Hf)=50 at %). The crystal grain size of the magnetic metal phase is about 20 nm.

Comparative Example 10

A pressed powder material is obtained in almost the same manner as in Example 12, except that flaky magnetic metal particles are obtained by changing the composition to Fe—Co—B—Zr (Co/(Fe+Co)=30 at %, (B+Zr)/(Fe+Co+B+Zr)=10 at %, Zr/(Fe+Co+B+Zr)=6 at %), subjecting a ribbon thus obtained to a heat treatment at 300° C. in a $H_2$ atmosphere, subsequently pulverizing this ribbon using a mixer apparatus, and subjecting the pulverization product to a heat treatment in a magnetic field at 400° C. in a $H_2$ atmosphere (the heat treatment is performed at a temperature that is lower by 100° C. than the heat treatment temperature of Example 12). The crystal grain size of the magnetic metal phase is about 20 nm.

Comparative Example 11

A pressed powder material is obtained in almost the same manner as in Example 12, except that the composition is changed to Fe—Co—B—Hf—Y (Co/(Fe+Co)=30 at %, (B+Hf+Y)/(Fe+Co+B+Hf+Y)=10 at %, Y/(Hf+Y)=90 at %, (Hf+Y)/(Fe+Co+B+Hf+Y)=6 at %). The crystal grain size of the magnetic metal phase is about 20 nm.

Comparative Example 12

A pressed powder material is obtained in almost the same manner as in Example 12, except that the composition is changed to Fe—Co—B(—Hf—Y) (Hf and Y are absent. Co/(Fe+Co)=30 at %, (B+Hf+Y)/(Fe+Co+B+Hf+Y)=60 at %, (Hf+Y)/(Fe+Co+B+Hf+Y)=0 at %). The crystal grain size of the magnetic metal phase is about 40 nm.

Comparative Example 13

A pressed powder material is obtained in almost the same manner as in Example 12, except that the composition is changed to Fe—Co—B—Hf—Y (Co/(Fe+Co)=30 at %, (B+Hf+Y)/(Fe+Co+B+Hf+Y)=60 at %, Y/(Hf+Y)=50 at %, (Hf+Y)/(Fe+Co+B+Hf+Y)=50 at %). The crystal grain size of the magnetic metal phase is about 50 nm.

Next, for the materials for evaluation of Examples 1 to 15 and Comparative Examples 1 to 10, the core loss, the proportion of change over time in the real part of magnetic permeability (μ'), the proportion of oxidation over time, the strength ratio, the hardness ratio, and the high-temperature strength ratio are evaluated by the following methods. The evaluation results are presented in Table 2.

(1) Core loss: The core loss under the operating conditions of 100 Hz and 1 T is measured using a B—H analyzer. In a case in which the core loss cannot be directly measured under the conditions of 100 Hz and 1 T, the dependency on frequency and the dependency on the magnetic flux density of the core loss are measured, and the core loss at 100 Hz and 1 T is estimated from the data (then, this estimated value is employed).

(2) Proportion of change over time in real part of magnetic permeability, μ': The real part of magnetic permeability, μ', of a ring-shaped sample is measured at 100 Hz using an impedance analyzer. Subsequently, the sample for evaluation is heated in air at a temperature of 100° C. for 100 hours, and then the real part of magnetic permeability, μ', is measured again. Thus, the change over time (real part of magnetic permeability, μ', after standing for 100 hours/real part of magnetic permeability, μ', before standing) is determined.

(3) Proportion of oxidation over time: The proportion of oxidation obtainable when a sample for evaluation is heated in air at a temperature of 100° C. for 100 hours is determined.

(4) Strength ratio: The transverse strength at room temperature of a sample for evaluation is measured, and the strength ratio is expressed as the ratio of this transverse strength with respect to the transverse strength at room temperature of the sample of Comparative Example 1 (=transverse strength at room temperature of sample for evaluation/transverse strength at room temperature of sample of Comparative Example 1).

(5) Hardness ratio: The hardness at room temperature of a sample for evaluation is measured, and the hardness ratio is expressed as the ratio of this hardness with respect to the hardness at room temperature of the sample of Comparative Example 1 (=hardness at room temperature of sample for evaluation/hardness at room temperature of sample of Comparative Example 1).

(6) High-temperature strength ratio: The transverse strength at 100° C. in air of a sample for evaluation is measured, and the high-temperature strength ratio is expressed as the ratio of this transverse strength with respect to the transverse strength at 100° C. in air of the sample of Comparative Example 1 (=transverse strength at 100° C. of sample for evaluation/transverse strength at 100° C. of sample of Comparative Example 1).

TABLE 1

| | t | A | Proportion (%) of difference in coercivity within flat surface of flaky magnetic metal particles | Proportion (%) of difference in coercivity within flat surface of pressed powder material | Remarks |
|---|---|---|---|---|---|
| Example 1 | 10 μm | 20 | 65 | 55 | FeCoSi system |
| Example 2 | 10 μm | 20 | 60 | 53 | FeCoSi system |
| Example 3 | 10 μm | 20 | 58 | 50 | FeCoSi system |
| Example 4 | 10 μm | 20 | 60 | 52 | FeCoSi system |
| Example 5 | 10 μm | 20 | 55 | 50 | FeCoSi system |
| Example 6 | 10 nm | 200 | 60 | 52 | FeCoSi system |
| Example 7 | 1 μm | 100 | 62 | 50 | FeCoSi system |
| Example 8 | 100 μm | 5 | 60 | 50 | FeCoSi system |
| Example 9 | 10 nm | 1000 | 61 | 51 | FeCoSi system |
| Example 10 | 10 nm | 10000 | 62 | 50 | FeCoSi system |
| Example 11 | 10 μm | 20 | 80 | 70 | FeCoSi system, (110) orientation |
| Example 12 | 10 μm | 20 | 102 | 93 | FeCoBHf system |
| Example 13 | 10 μm | 20 | 110 | 98 | FeCoBHf system |
| Example 14 | 10 μm | 20 | 60 | 50 | FeCoBHf system |
| Example 15 | 10 μm | 20 | 110 | 96 | FeCoBHf system |
| Example 16 | 10 μm | 20 | 160 | 135 | FeCoBHfY system |
| Example 17 | 10 μm | 20 | 175 | 146 | FeCoBHfY system |
| Example 18 | 10 μm | 20 | 162 | 138 | FeCoBHfY system |
| Example 19 | 10 μm | 20 | 150 | 120 | FeCoBHfY system |
| Example 20 | 10 μm | 20 | 160 | 142 | FeCoBHfY system |
| Comparative Example 1 | 400 nm | 100 | ≒ 0 | ≒ 0 | — |
| Comparative Example 2 | 10 μm | 20 | 20 | 10 | FeSi system |
| Comparative Example 3 | 10 μm | 20 | 23 | 11 | FeCoSi system |
| Comparative Example 4 | 10 μm | 20 | 20 | 10 | FeCo system |
| Comparative Example 5 | 10 μm | 20 | 24 | 12 | FeCoSi system |
| Comparative Example 6 | 10 μm | 20 | 40 | 32 | FeCoBHf system |
| Comparative Example 7 | 10 μm | 20 | 10 | 6 | FeCo system |
| Comparative Example 8 | 10 μm | 20 | 20 | 15 | FeCoB system |
| Comparative Example 9 | 10 μm | 20 | 40 | 30 | FeCoBHf system |
| Comparative Example 10 | 10 μm | 20 | 40 | 32 | FeCoBZr system |
| Comparative Example 11 | 10 μm | 20 | 120 | 110 | FeCoBHfY system |
| Comparative Example 12 | 10 μm | 20 | 55 | 45 | FeCoB system |
| Comparative Example 13 | 10 μm | 20 | 45 | 40 | FeCoBHfY system |

TABLE 2

| | Core loss ($kW/m^3$) 100 Hz, 1 T | Proportion (%) of change over time in μ' | Proportion (%) of oxidation over time | Strength ratio | Hardness ratio | High-temperature strength ratio |
|---|---|---|---|---|---|---|
| Example 1 | 40 | 97 | ≒0 | 1.6 | 1.5 | 1.6 |
| Example 2 | 43 | 96 | ≒0 | 1.5 | 1.6 | 1.5 |
| Example 3 | 42 | 96 | ≒0 | 1.5 | 1.5 | 1.6 |
| Example 4 | 44 | 96 | ≒0 | 1.6 | 1.6 | 1.5 |
| Example 5 | 60 | 95 | ≒0 | 1.4 | 1.4 | 1.4 |
| Example 6 | 42 | 96 | ≒0 | 1.5 | 1.5 | 1.6 |
| Example 7 | 44 | 96 | ≒0 | 1.6 | 1.5 | 1.6 |
| Example 8 | 40 | 97 | ≒0 | 1.5 | 1.6 | 1.5 |
| Example 9 | 45 | 96 | ≒0 | 1.5 | 1.6 | 1.5 |
| Example 10 | 40 | 97 | ≒0 | 1.6 | 1.5 | 1.5 |
| Example 11 | 30 | 97 | ≒0 | 1.6 | 1.6 | 1.6 |
| Example 12 | 30 | 96 | ≒0 | 1.5 | 1.5 | 1.6 |
| Example 13 | 30 | 96 | ≒0 | 1.6 | 1.6 | 1.5 |
| Example 14 | 60 | 95 | ≒0 | 1.4 | 1.4 | 1.4 |
| Example 15 | 30 | 96 | ≒0 | 1.5 | 1.6 | 1.5 |
| Example 16 | 17 | 98 | ≒0 | 1.8 | 1.8 | 1.8 |
| Example 17 | 15 | 98 | ≒0 | 1.9 | 1.9 | 1.9 |
| Example 18 | 16 | 98 | ≒0 | 1.8 | 1.8 | 1.8 |
| Example 19 | 19 | 98 | ≒0 | 1.8 | 1.8 | 1.8 |
| Example 20 | 17 | 98 | ≒0 | 1.8 | 1.8 | 1.8 |
| Comparative Example 1 | 500 | 88 | 1 | — | — | — |
| Comparative Example 2 | 150 | 88 | 1.2 | 1.1 | 1.1 | 1.1 |
| Comparative Example 3 | 90 | 90 | 1 | 1.2 | 1.2 | 1.1 |
| Comparative Example 4 | 150 | 87 | 1.5 | 1.1 | 1.1 | 1.1 |
| Comparative Example 5 | 90 | 90 | 1 | 1.2 | 1.1 | 1.2 |
| Comparative Example 6 | 80 | 91 | 1 | 1.2 | 1.2 | 1.1 |
| Comparative Example 7 | 200 | 87 | 1.5 | 1.1 | 1.1 | 1.1 |
| Comparative Example 8 | 100 | 88 | 1.4 | 1.1 | 1.1 | 1.1 |
| Comparative Example 9 | 75 | 92 | 1 | 1.2 | 1.1 | 1.1 |
| Comparative Example 10 | 80 | 91 | 1 | 1.2 | 1.1 | 1.2 |
| Comparative Example 11 | 25 | 97 | ≒0 | 1.7 | 1.7 | 1.7 |
| Comparative Example 12 | 70 | 92 | 1 | 1.2 | 1.2 | 1.2 |
| Comparative Example 13 | 80 | 91 | 1 | 1.1 | 1.1 | 1.1 |

As is obvious from Table 1, the flaky magnetic metal particles according to Examples 1 to 20 have an average thickness of from 10 nm to 100 μm and an average value of the ratio of the average length within the flat surface with respect to thickness of from 5 to 10,000. Furthermore, the flaky magnetic metal particles have the difference in coercivity depending on the direction within the flat surface of a flaky magnetic metal particle, and also have the difference in coercivity depending on the direction within a plane of the pressed powder material. Examples 1 to 11 are Fe—Co—Si systems, and Examples 12 to 15 are Fe—Co—B—Hf systems. Furthermore, Examples 16 to 20 are Fe—Co—B—Hf—Y systems. In Example 11, the magnetic metal phase is approximately (110)-oriented. Examples 1 to 11 have an average crystal grain size of 1 μm or greater. Examples 12, 13, and 15 to 20 have an average crystal grain size of 100 nm or less (also, 30 nm or less), and these Examples are smaller than Comparative Examples 6 to 13. Particularly, the average crystal grain sizes of Examples 16 to 20 (Fe—Co—B—Hf—Y systems) are smaller than the average crystal grain sizes of Examples 12 to 15 (Fe—Co—B—Hf systems), and are 30 nm or less.

As is obvious from Table 2, it is understood that the pressed powder materials that use the flaky magnetic metal particles of Examples 1 to 20 are excellent in terms of the core loss, the proportion of change over time in μ', the proportion of oxidation over time, the strength ratio, the hardness ratio, and the high-temperature strength ratio, compared to the pressed powder material of Comparative Example 1. That is, it is understood that the pressed powder materials have excellent magnetic characteristics, thermal stability, oxidation resistance, mechanical characteristics (strength and hardness), and high-temperature mechanical characteristics (high-temperature strength). Furthermore, it is understood that pressed powder materials that use the flaky magnetic metal particles of Examples 1 to 11 are excellent in terms of the core loss, the proportion of change over time in μ', the proportion of oxidation over time, the strength ratio, the hardness ratio, and the high-temperature strength ratio, compared to the pressed powder materials of Comparative Examples 2 to 5. Furthermore, it is understood that the pressed powder materials that use the flaky magnetic metal particles of Examples 12 to 15 are excellent in terms of the core loss, the proportion of change over time in μ', the proportion of oxidation over time, the strength ratio, the hardness ratio, and the high-temperature strength ratio, even compared to the pressed powder materials of Comparative Examples 6 to 10. That is, it is understood that only in a case in which the magnetic metal phase is a system containing Fe, Co, and Si, and the amount of Co and the amount of Si are respectively in the ranges described in the claims, a noticeable effect about the induced magnetic anisotropy is obtained, and thereby, excellent characteristics (core loss, proportion of change over time in μ', proportion of oxidation over time, strength ratio, hardness ratio, and high-temperature strength ratio) are obtained. Similarly, it is understood that only in a case in which the magnetic metal phase is a system containing the first element as well as B and Hf as the additive elements, and the total amount of the additive elements and the amount of Hf are respectively in the ranges described in the claims, a noticeable effect about the induced magnetic anisotropy is obtained, and thereby, excellent characteristics (core loss, proportion of change over time in μ', proportion of oxidation over time, strength ratio, hardness ratio, and high-temperature strength ratio) are obtained. Furthermore, it is understood that a pressed powder material that uses the flaky magnetic metal particles of Example 12 is excellent in terms of the core loss, the proportion of change over time in μ', the proportion of oxidation over time, the strength ratio, the hardness ratio, and the high-temperature strength ratio, compared to the pressed powder material of Comparative Example 10, and in regard to these characteristics, an Fe—Co—B—Hf system is considered to be preferable rather than an Fe—Co—B—Zr system (although it is definitely certain that an Fe—Co—B—Zr system is also preferable). Furthermore, when Examples 16 to 20 (Fe—Co—B—Hf—Y systems) are compared with Examples 12 to 15 (Fe—Co—B—Hf systems without Y), Comparative Example 12 (Fe—Co—B system without Hf and Y), and Comparative Examples 11 to 13 (Fe—Co—B—Hf—Y systems; however, the composition ranges are not in the range described in the claims), it is understood that those Examples are excellent in terms of the core loss, the proportion of change over time in μ', the proportion of oxidation over time, the strength ratio, the hardness ratio, and the high-temperature strength ratio. That is, it is understood that those Examples are excellent in terms of magnetic characteristics, thermal stability, oxidation resistance, mechanical characteristics (strength and hardness), and high-temperature mechanical characteristics (high-temperature strength). That is, it is understood that the magnetic metal phase is a system including the first element and B, Hf, and Y as the additive elements; only in a case in which the amount of Y and the total amount of Y and Hf are respectively within the ranges described in the claims, a noticeable effect about the induced magnetic anisotropy is obtained; and thereby, excellent characteristics (core loss, proportion of change over time in μ', proportion of oxidation over time, strength ratio, hardness ratio, and high-temperature strength ratio) are obtained. Furthermore, since the materials of the Examples are pressed powder materials, the materials can be applied to complicated shapes.

While certain embodiments have been described, these embodiments have been presented by way of example only, and are not intended to limit the scope of the inventions. Indeed, flaky magnetic metal particles, a pressed powder material, and a rotating electric machine described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

What is claimed is:

1. A pressed powder material, comprising:

a plurality of flaky magnetic metal particles, each flaky magnetic metal particle having a flat surface and a magnetic metal phase containing iron (Fe), cobalt (Co), and silicon (Si), an amount of Co being from 0.001 at% to 80 at% with respect to the total amount of Fe and Co, an amount of Si being from 0.001 at% to 30 at% with respect to the total amount of the magnetic metal phase, and has an average crystal grain size of 1 μm or more, or at least one first element selected from the group consisting of iron (Fe), cobalt (Co), and nickel (Ni), and additive elements, the additive elements including boron (B) and hafnium (Hf), the additive elements being included in a total amount of from 0.002 at% to 80 at% with respect to the total amount of the magnetic metal phase, and has an average crystal grain size of 100 nm or less, the flaky magnetic metal particles having an average thickness of from 10 nm to 100 μm, and an average value of a ratio of an average length in the flat surface with respect to a thickness in each of the flaky magnetic metal particles being from 5 to 10,000; and an intercalated phase existing between the flaky magnetic metal particles and containing at least one second element selected from the group consisting of oxygen (O), carbon (C), nitrogen (N), and fluorine (F), wherein in the pressed powder material, the flat surfaces are oriented to be parallel to a plane of the pressed powder material, and the pressed powder material has a difference in coercivity on a basis of direction within the plane.

2. The pressed powder material according to claim 1, wherein a proportion of the difference in coercivity on the basis of direction within the plane is 1% or more.

3. The pressed powder material according to claim 1, wherein, when the magnetic metal phase contains at least one first element selected from the group consisting of iron (Fe), cobalt (Co), and nickel (Ni), and the additive elements, the additive elements including boron (B) and hafnium (Hf), the additive elements being included in a total amount of from 0.002 at % to 80 at % with respect to the total amount of the magnetic metal phase, and has an average crystal grain size of 100 nm or less, Hf is included in an amount of from 0.001 at % to 40 at % with respect to the total amount of the magnetic metal phase.

4. The pressed powder material according to claim 1, wherein, when the magnetic metal phase contains at least one first element selected from the group consisting of iron (Fe), cobalt (Co), and nickel (Ni), and the additive elements, the additive elements including boron (B) and hafnium (Hf), the additive elements being included in a total amount of from 0.002 at % to 80 at % with respect to the total amount of the magnetic metal phase, and has an average crystal grain size of 100 nm or less, the additive elements further include yttrium (Y).

5. The pressed powder material according to claim 4, wherein Y is included in an amount of from 1 at % to 80 at % with respect to the total amount of Hf and Y.

6. The pressed powder material according to claim 4, wherein the total amount of Hf and Y is from 0.002 at % to 40 at % with respect to the total amount of the magnetic metal phase.

7. A rotating electric machine, comprising the pressed powder material according to claim 1.

* * * * *